United States Patent
Koga

(10) Patent No.: US 10,338,360 B2
(45) Date of Patent: Jul. 2, 2019

(54) ZOOM LENS SYSTEM

(71) Applicant: RICOH IMAGING COMPANY, LTD., Tokyo (JP)

(72) Inventor: Tomoya Koga, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 89 days.

(21) Appl. No.: 15/432,108

(22) Filed: Feb. 14, 2017

(65) Prior Publication Data

US 2017/0329112 A1 Nov. 16, 2017

(30) Foreign Application Priority Data

May 16, 2016 (JP) .................................. 2016-098112
Feb. 8, 2017 (JP) .................................. 2017-020845

(51) Int. Cl.
*G02B 15/14* (2006.01)
*G02B 15/173* (2006.01)

(52) U.S. Cl.
CPC .................................. *G02B 15/173* (2013.01)

(58) Field of Classification Search
CPC .... H05K 999/99; G02B 13/009; G02B 15/14; G02B 15/15; G02B 15/155; G02B 15/16;
(Continued)

(56) References Cited

U.S. PATENT DOCUMENTS 6,775,071 B1 8/2004 Suzuki et al.
2004/0174612 A1 9/2004 Suzuki et al.
(Continued)

FOREIGN PATENT DOCUMENTS

JP  11-352401   12/1999
JP  2004-264714  9/2004
(Continued)

OTHER PUBLICATIONS

Ohara, Inc.:S-LAL61. Ohara. Web Nov. 11, 2007 <http://www.ohara-inc.co.jp/en/product/optical/list> (Wayback Machine).*
(Continued)

*Primary Examiner* — William R Alexander
*Assistant Examiner* — Henry A Duong
(74) *Attorney, Agent, or Firm* — Greenblum & Bernstein, P.L.C.

(57) ABSTRACT

A zoom lens system includes a positive first lens group, a negative second lens group, a positive intermediate lens group, and a negative image-side lens group. Upon zooming from the short to long focal length extremities, a distance between the first and second lens groups increases, and a distance between the second and intermediate lens groups decreases. The image-side lens group consists of two lens elements. The following conditions are satisfied:

$-6.0<f1/f2<-4.3,$ $-5.4<f1/fIMG<-3.9,$ and $0.3<D2/fw<3.0,$ f1, f2 and fIMG designate the focal lengths of the first, second and the image-side lens groups, respectively, D2 designates a distance between the second lens group and the intermediate lens group, at the short focal length extremity, fw designates the focal length of the zoom lens system at the short focal length extremity.

22 Claims, 47 Drawing Sheets

(58) Field of Classification Search
CPC .. G02B 15/161; G02B 15/163; G02B 15/167; G02B 15/17; G02B 15/173; G02B 15/177; G02B 15/20; G02B 15/22; G02B 15/24; G02B 15/26; G02B 15/28
USPC .......................................................... 359/684
See application file for complete search history.

(56) References Cited

U.S. PATENT DOCUMENTS

| | | | |
|---|---|---|---|
| 2008/0112063 | A1 | 5/2008 | Hatada |
| 2011/0102905 | A1 | 5/2011 | Harada |
| 2011/0242675 | A1 | 10/2011 | Sugita |
| 2012/0019931 | A1 | 1/2012 | Ogata et al. |
| 2013/0094097 | A1 | 4/2013 | Sugita |
| 2014/0022647 | A1 | 1/2014 | Ogata et al. |
| 2014/0211029 | A1 | 7/2014 | Okumura |
| 2014/0333821 | A1 | 11/2014 | Hagiwara |
| 2015/0370041 | A1* | 12/2015 | Noda ................ G02B 9/00 359/683 |

FOREIGN PATENT DOCUMENTS

| | | |
|---|---|---|
| JP | 2008-122775 | 5/2008 |
| JP | 2011-99924 | 5/2011 |
| JP | 2011-180218 | 9/2011 |
| JP | 2011-209347 | 10/2011 |
| JP | 2011-215218 | 10/2011 |
| JP | 2012-27261 | 2/2012 |
| JP | 2014-89385 | 5/2014 |
| JP | 2014-145960 | 8/2014 |
| JP | 2014-219616 | 11/2014 |
| JP | 2014-228734 | 12/2014 |
| JP | 2015-102619 | 6/2015 |

OTHER PUBLICATIONS

U.S. Appl. No. 15/422,777 to Tomoya Koga, filed Feb. 2, 2017.

* cited by examiner

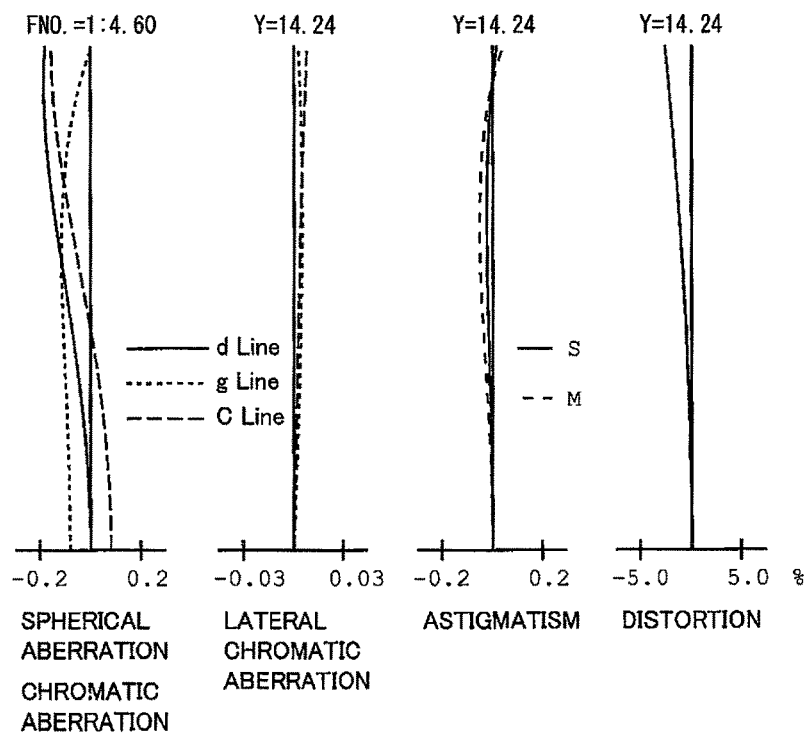
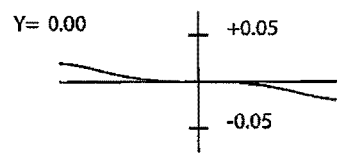
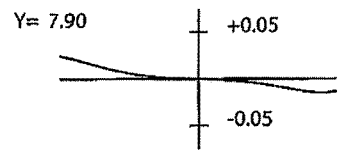
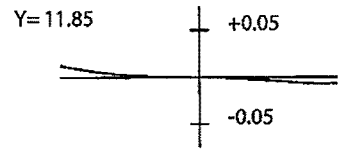
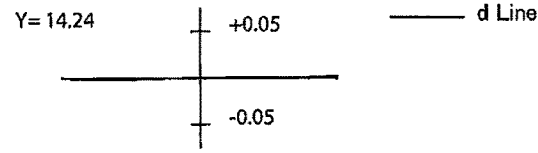

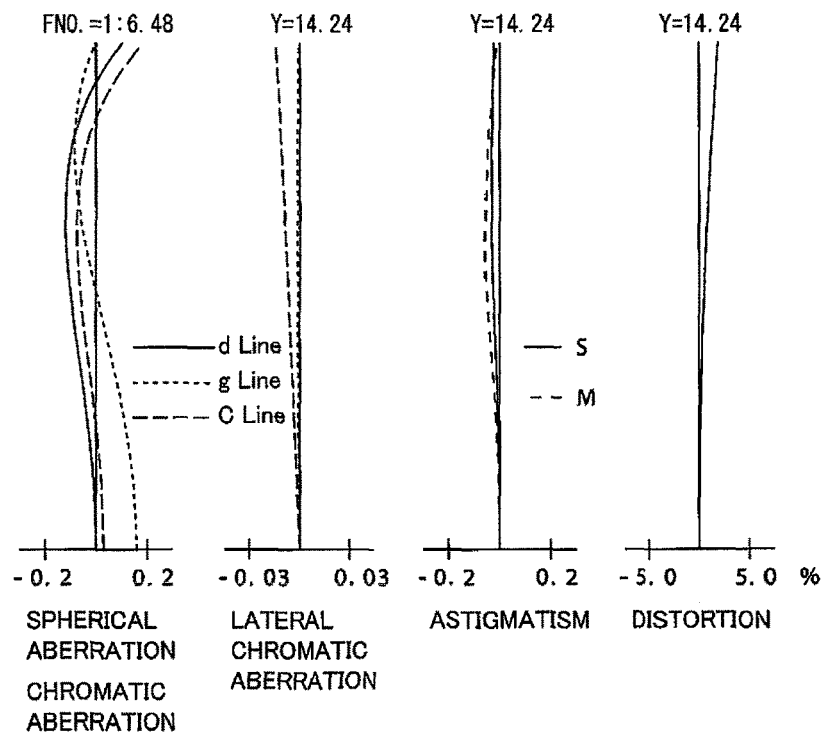
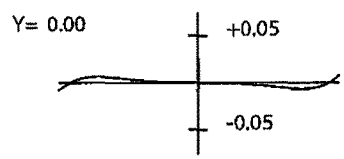
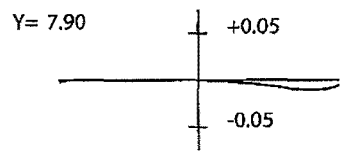
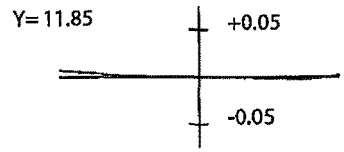
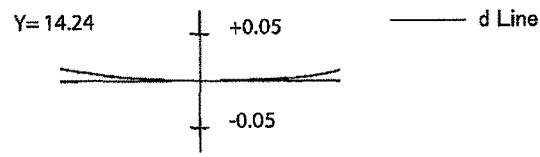

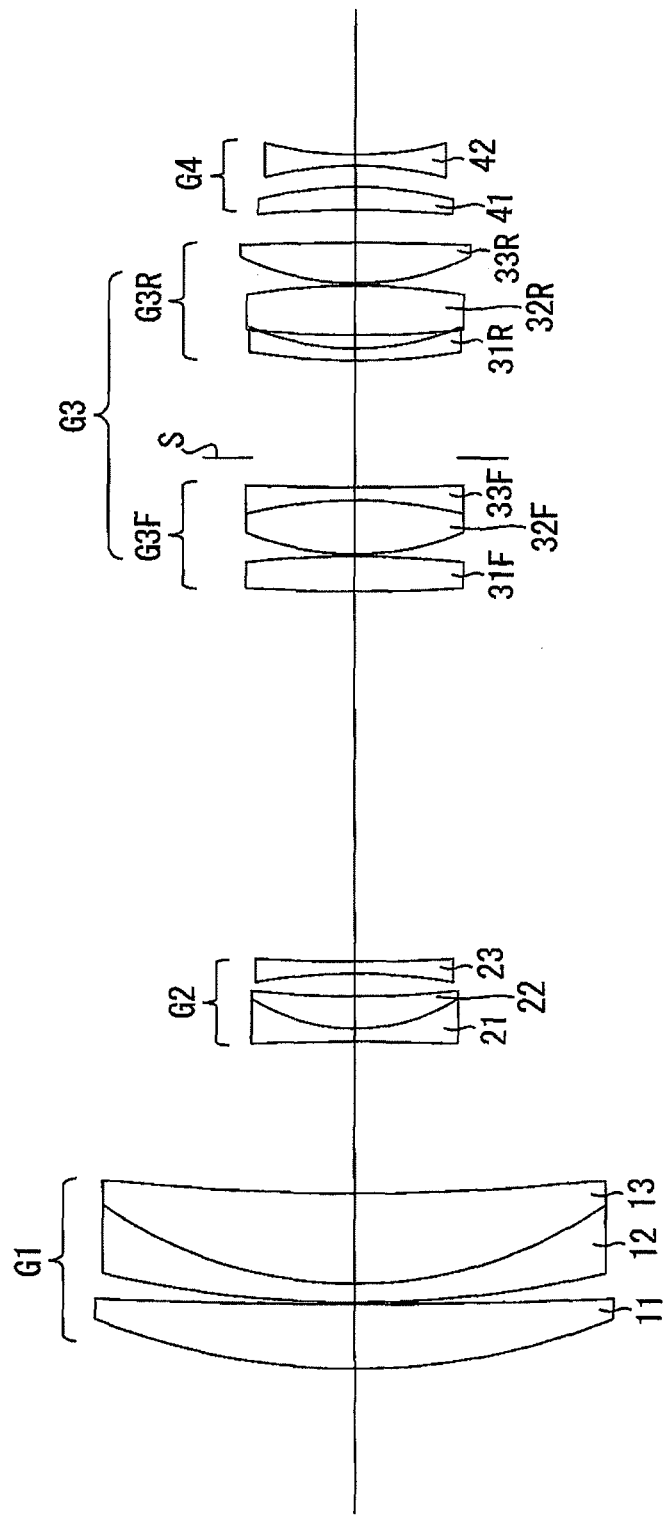

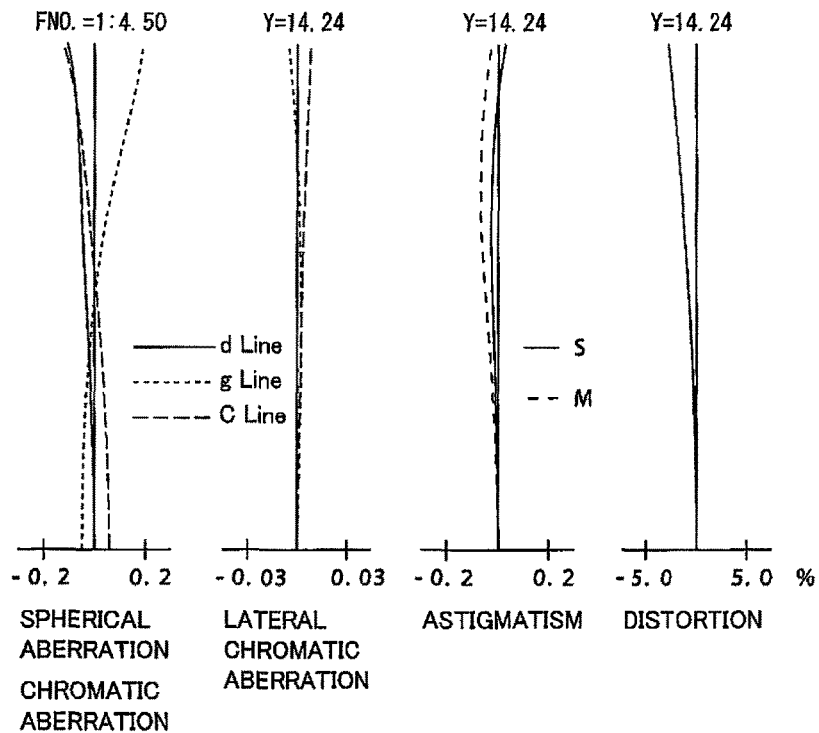
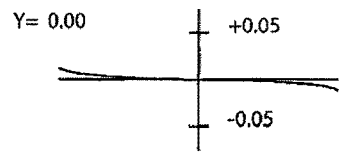
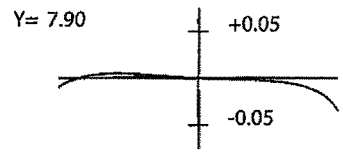
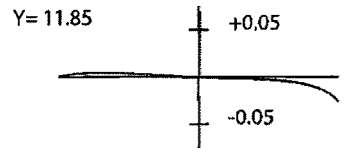
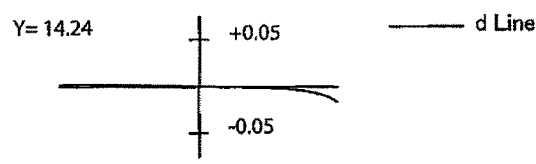

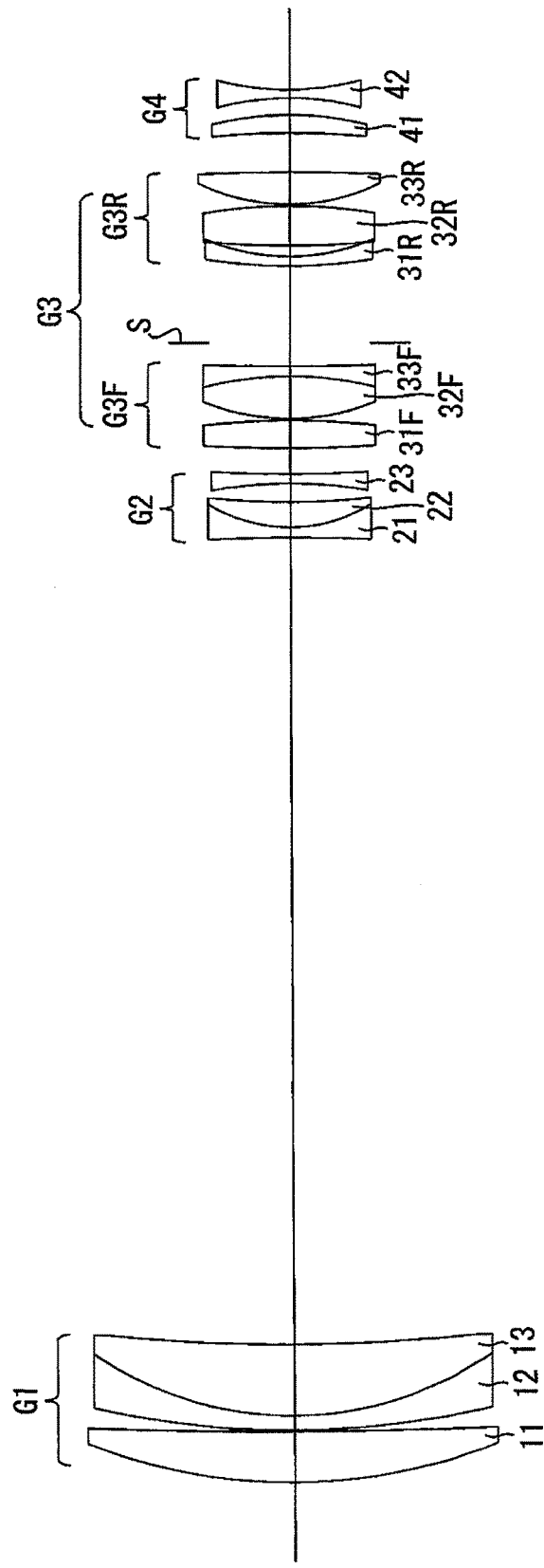

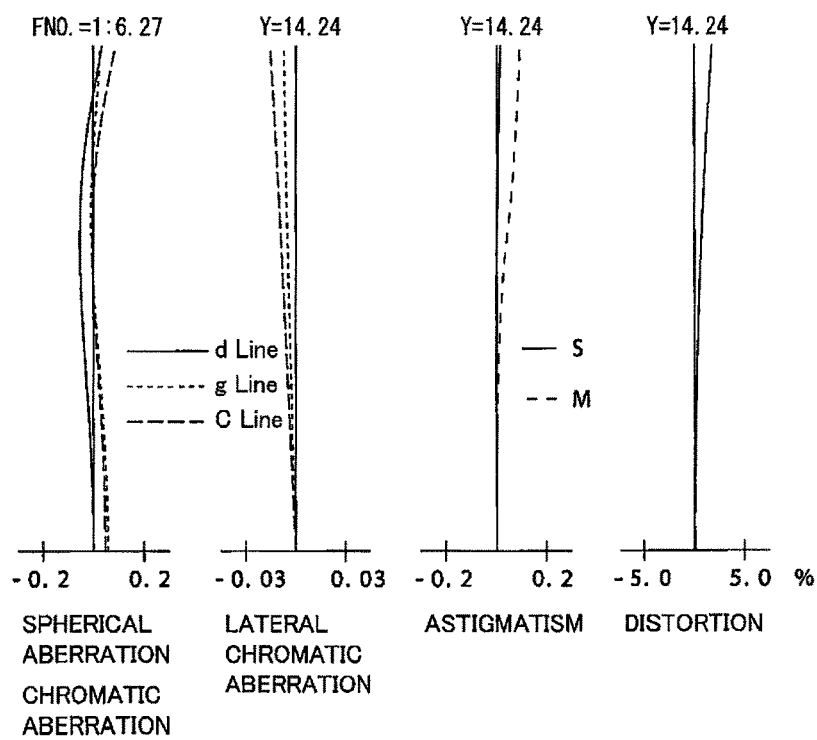
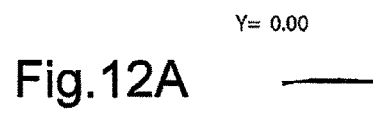
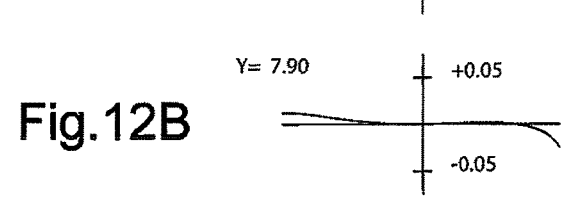
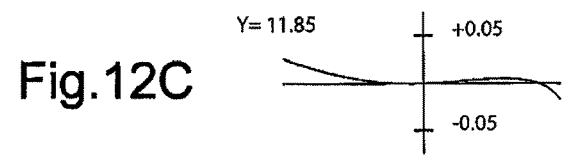
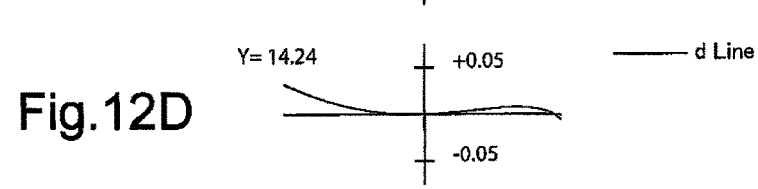

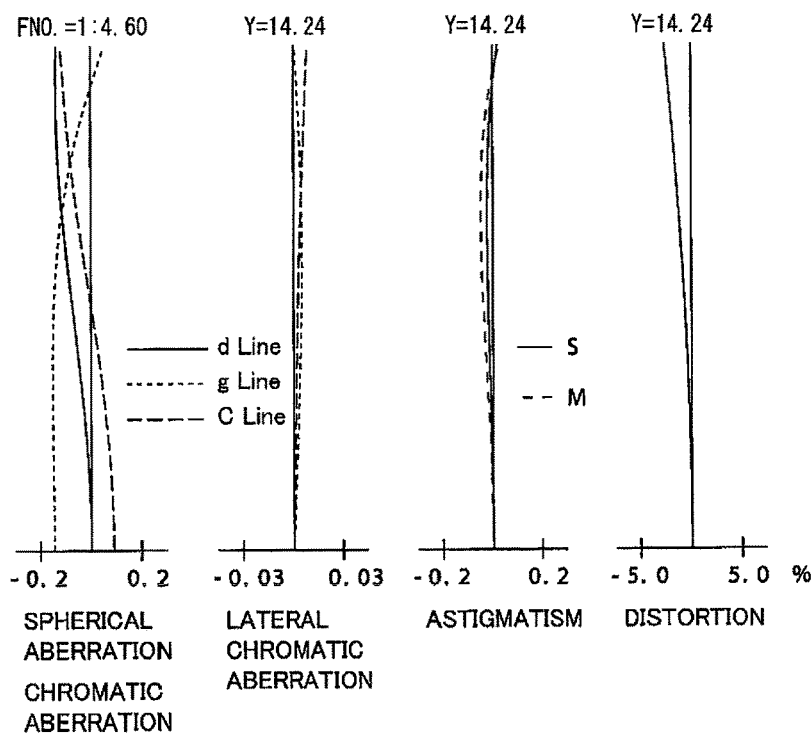
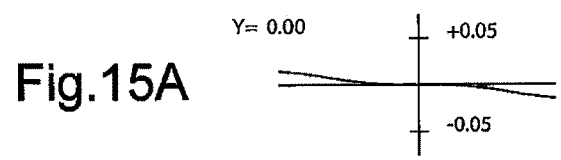
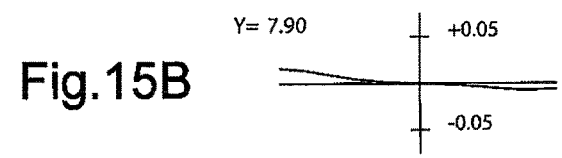
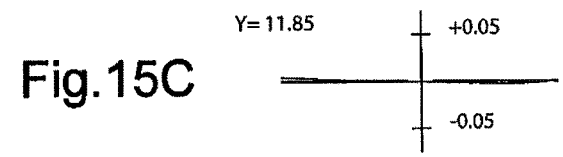
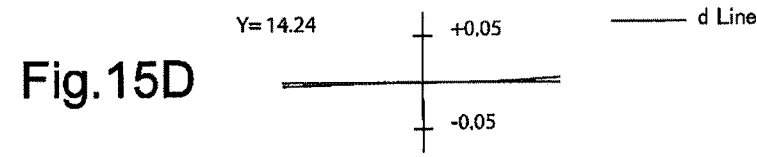

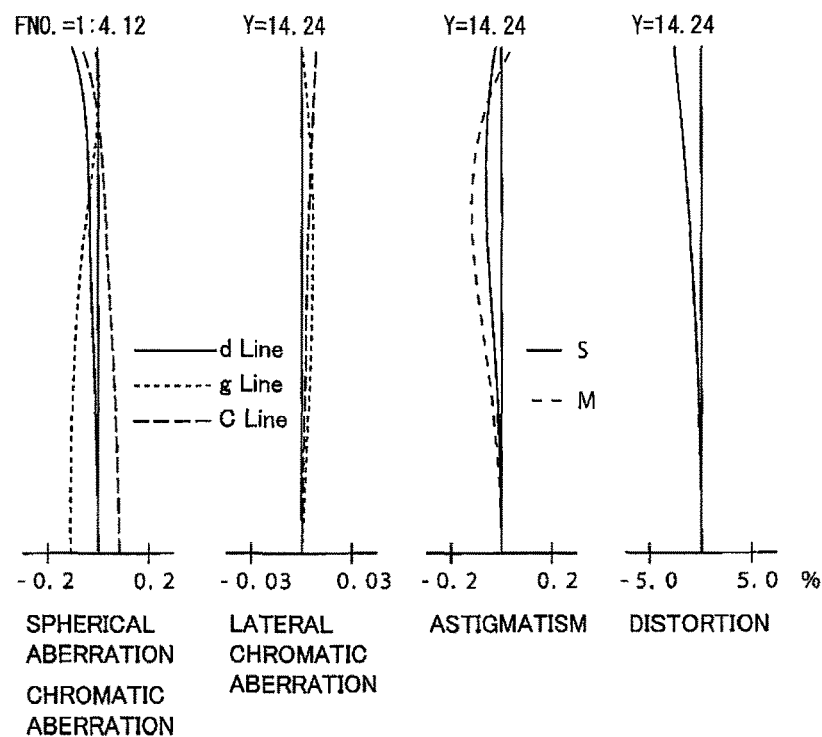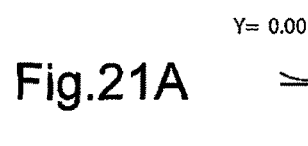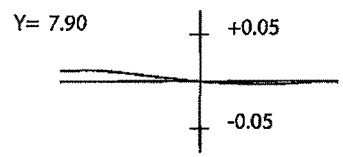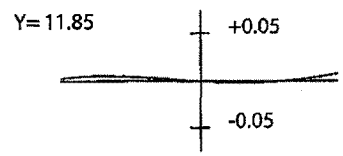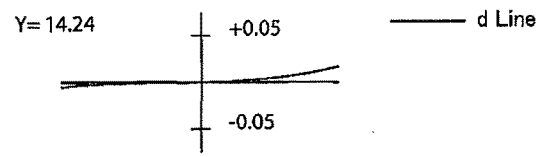

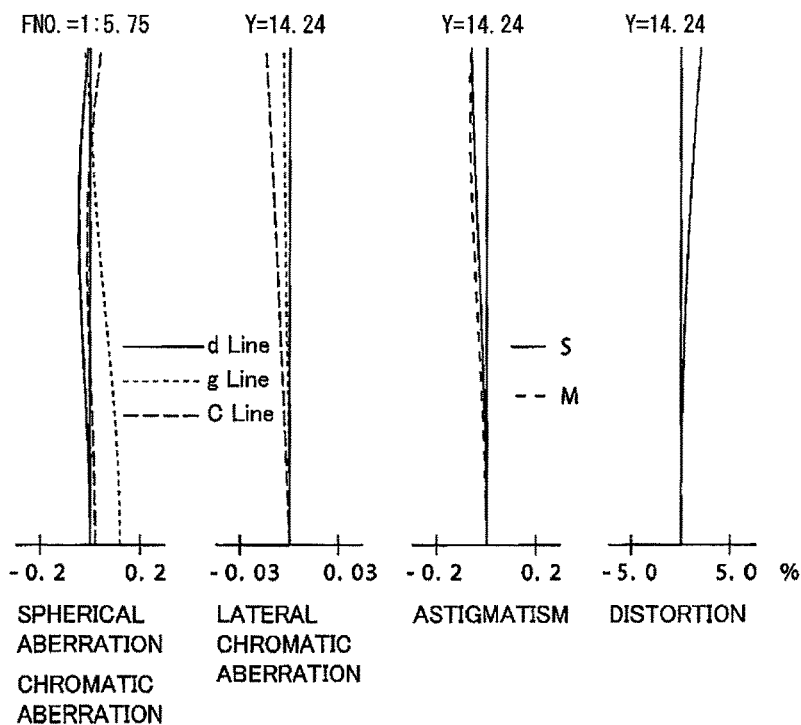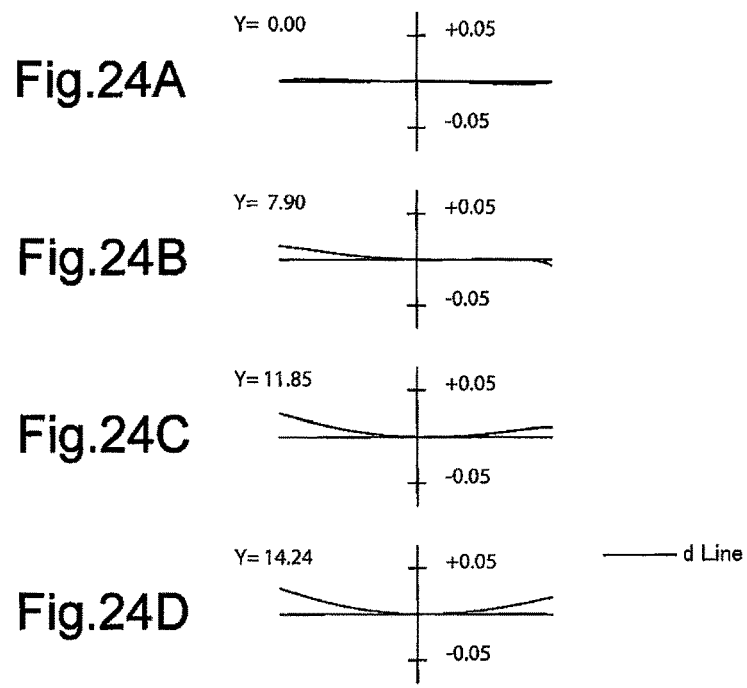

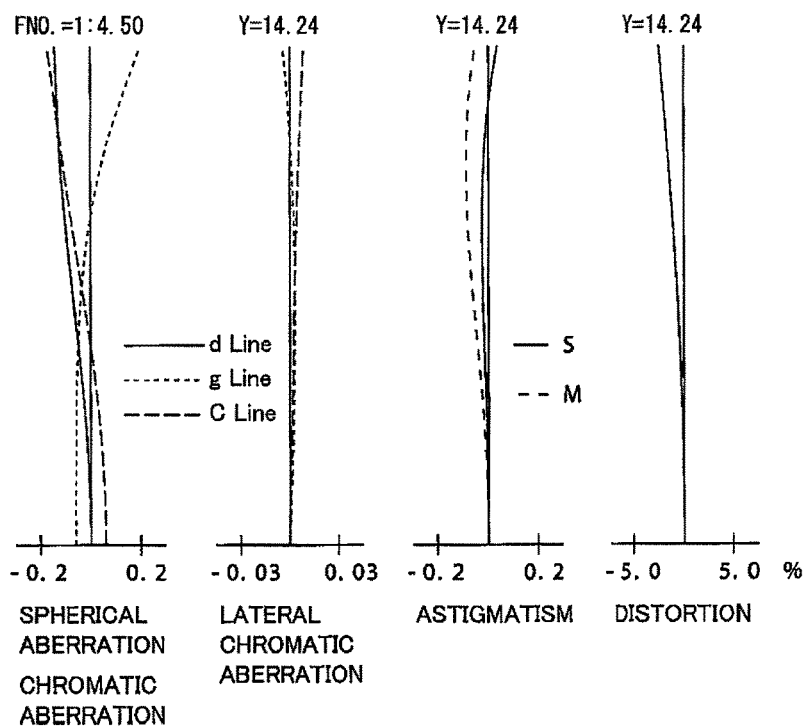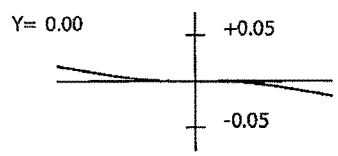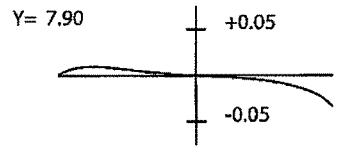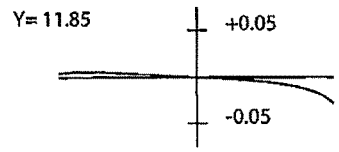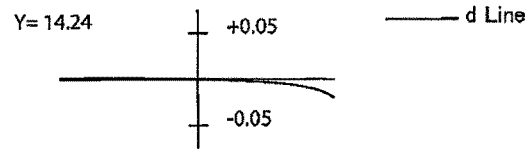

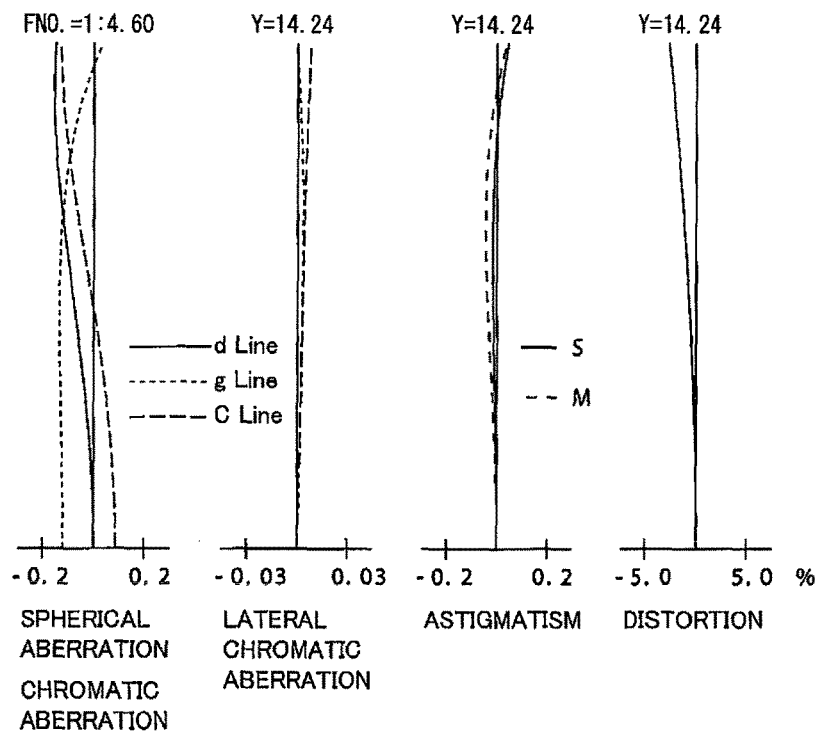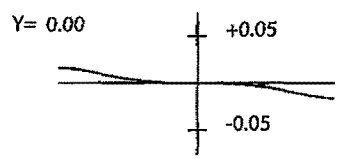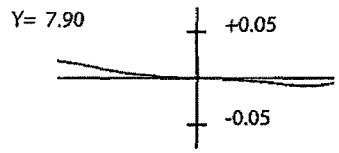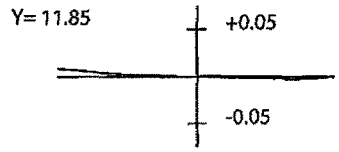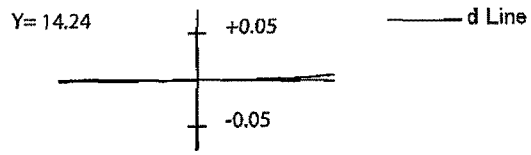

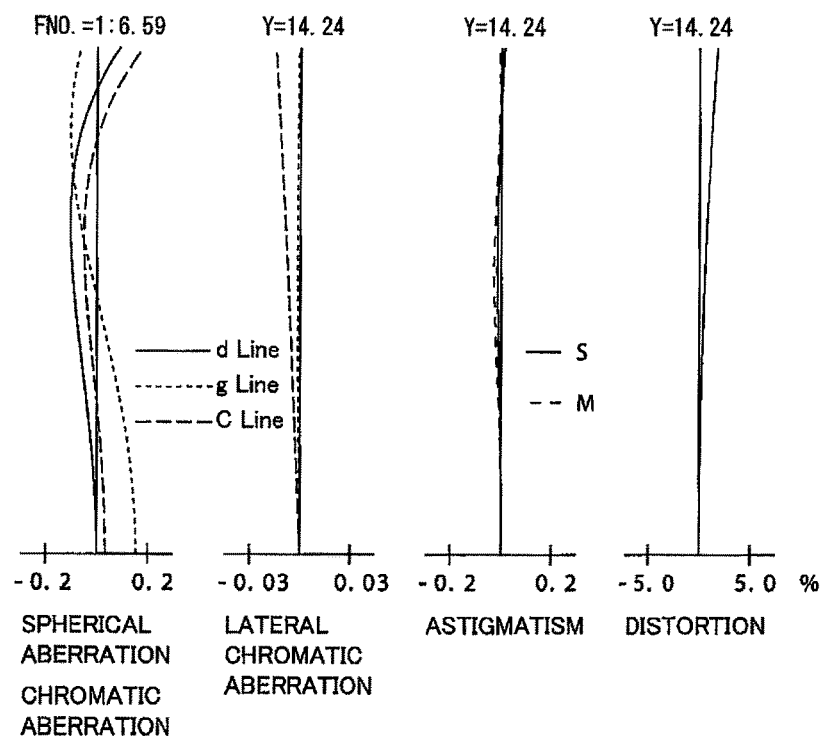
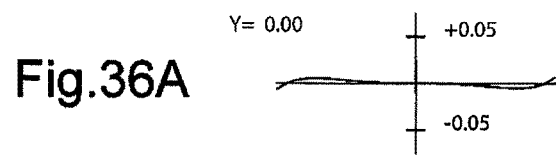
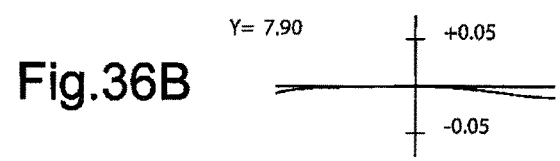
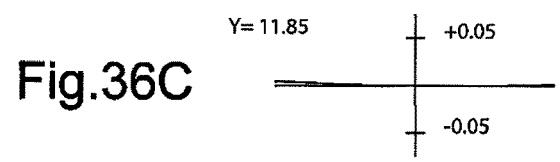
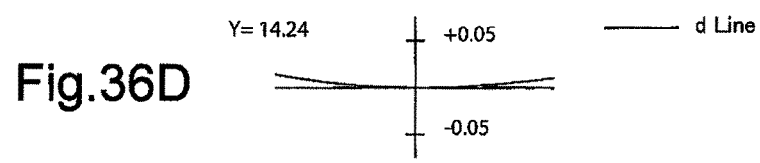

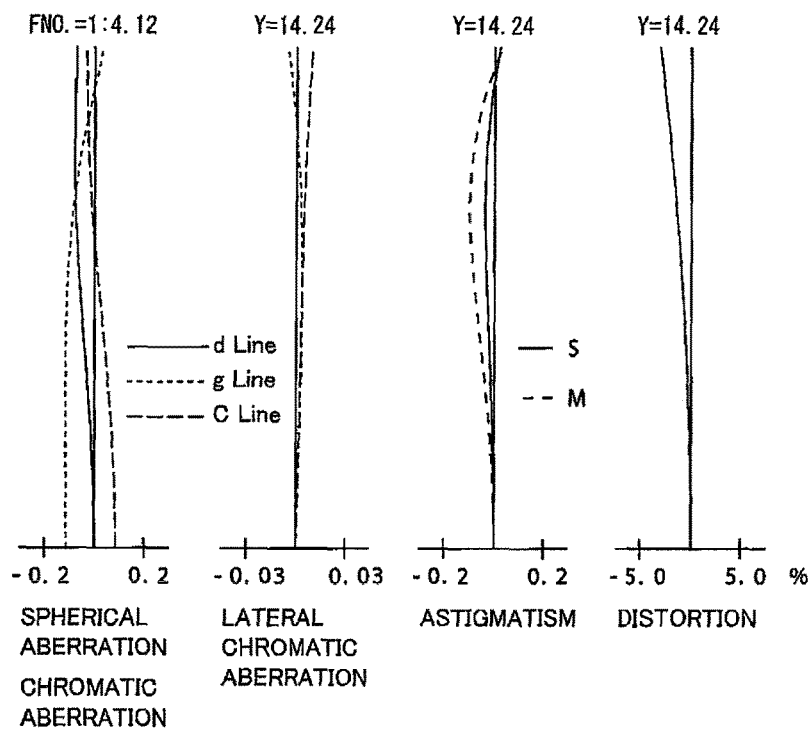
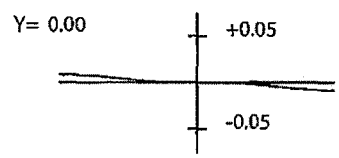
Fig.39A
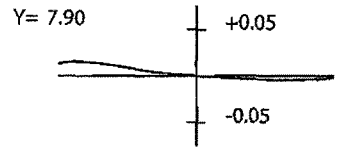
Fig.39B
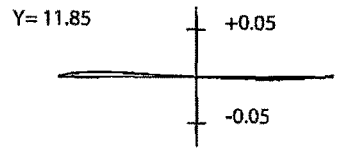
Fig.39C
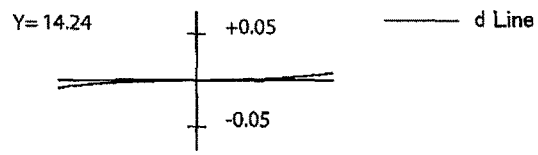
Fig.39D

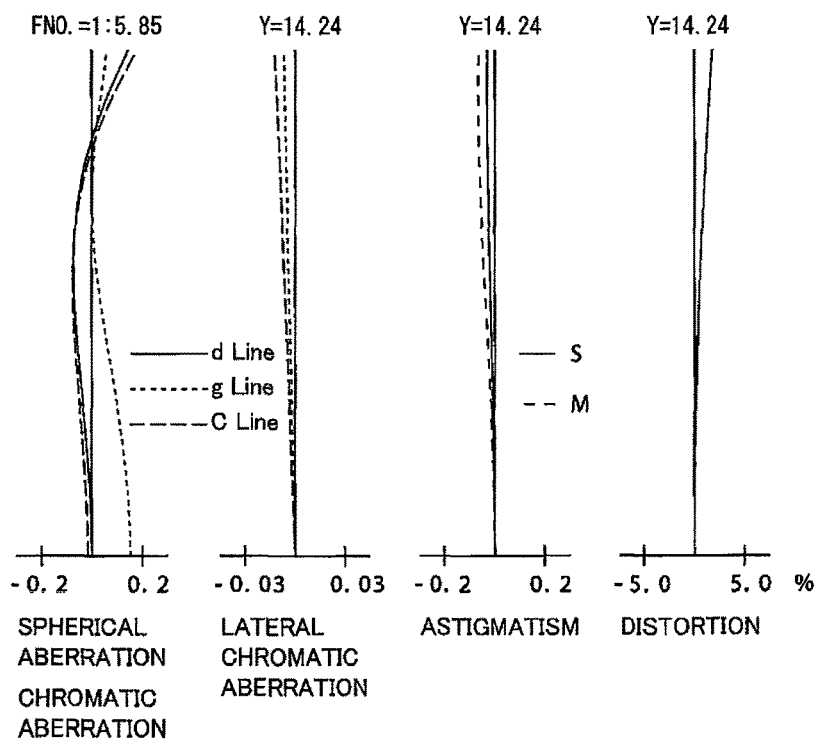
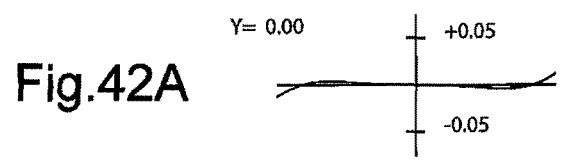
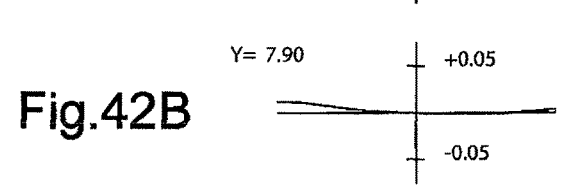
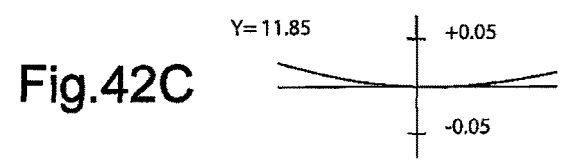
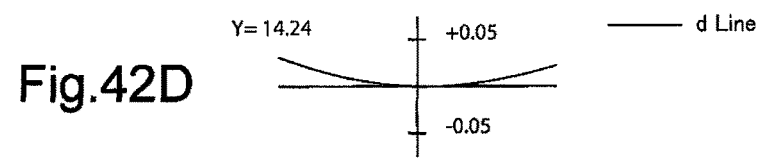

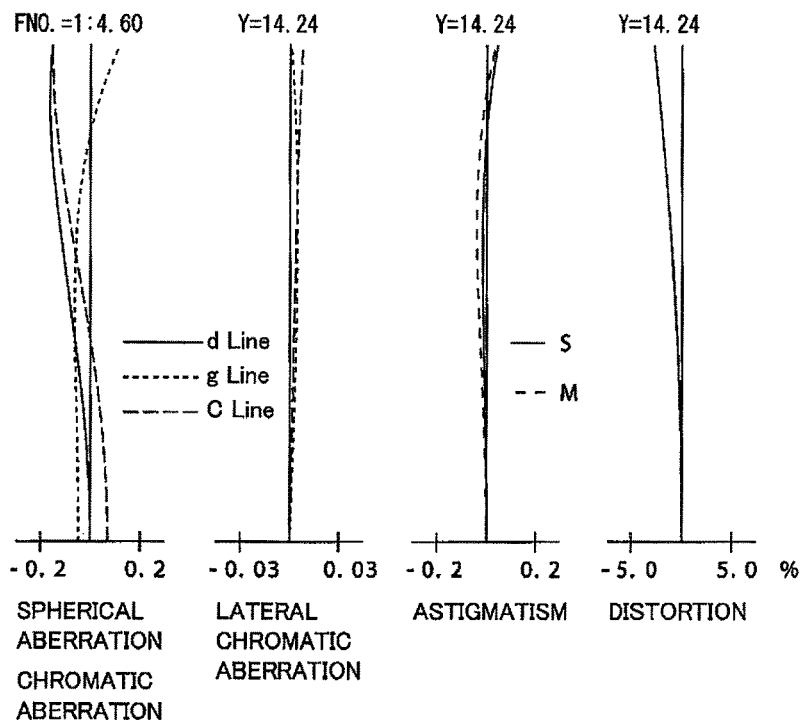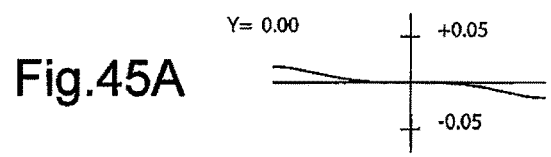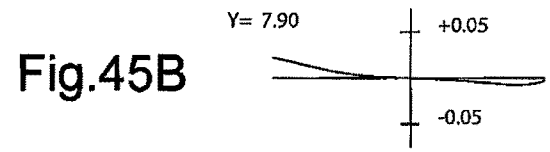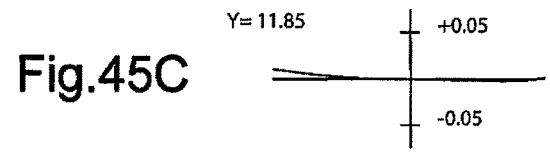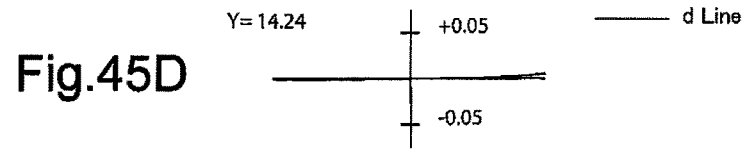

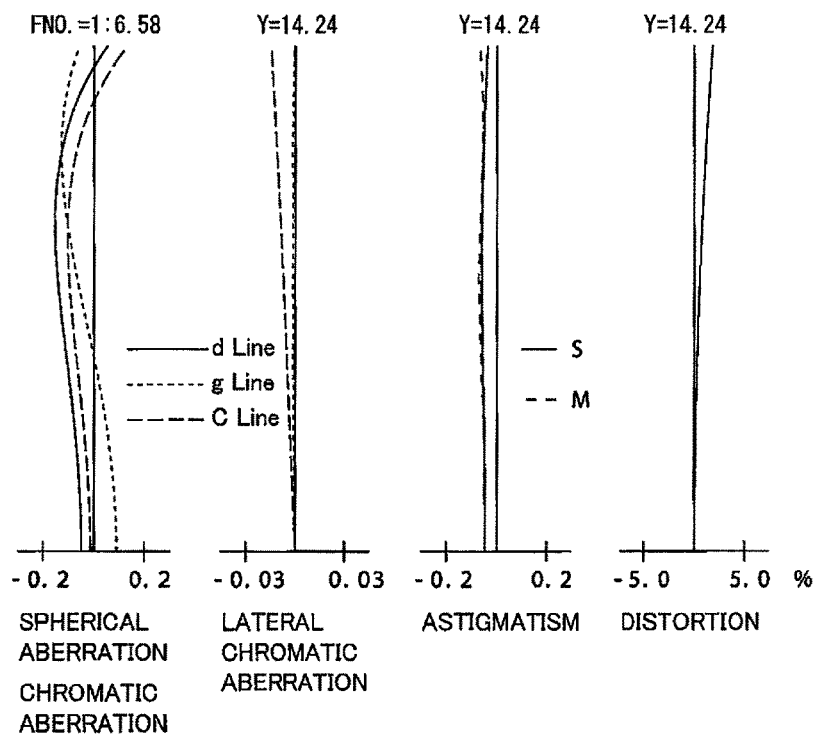
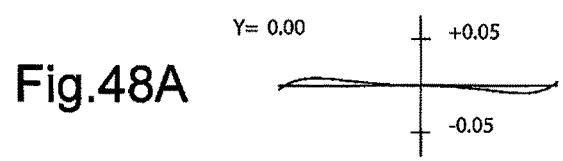
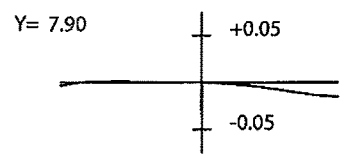
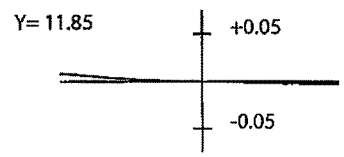
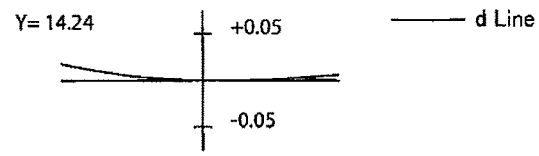

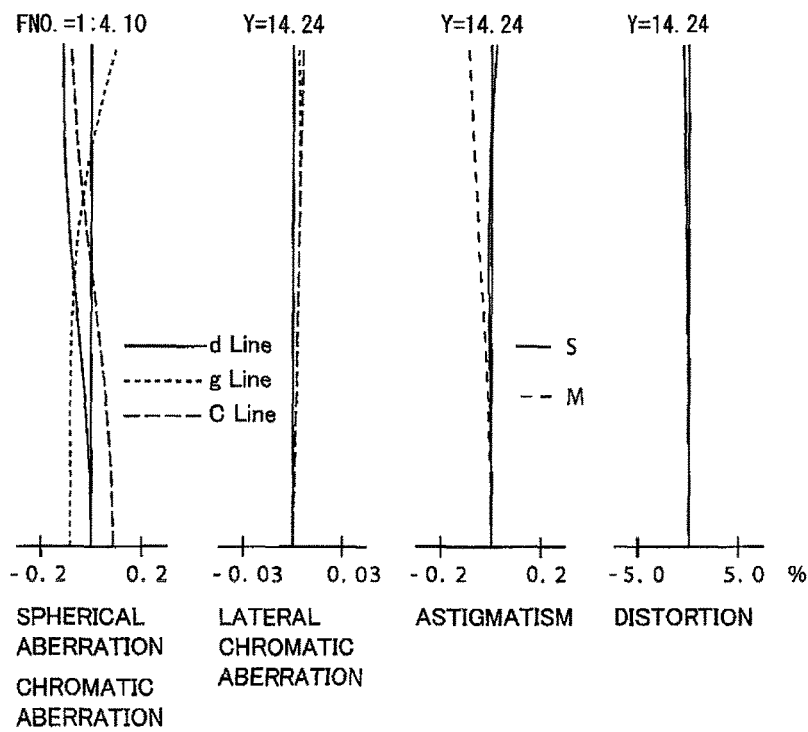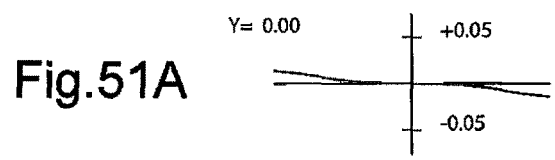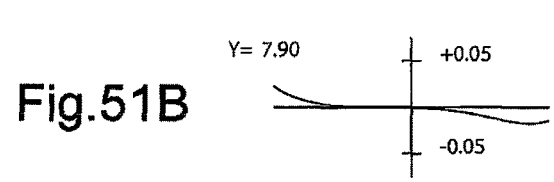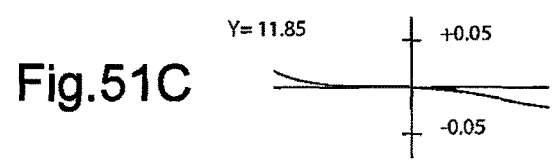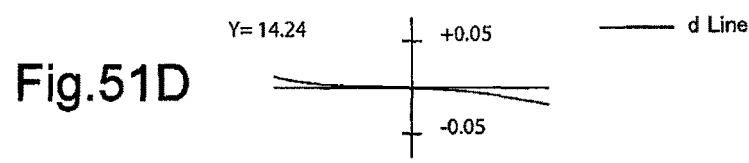

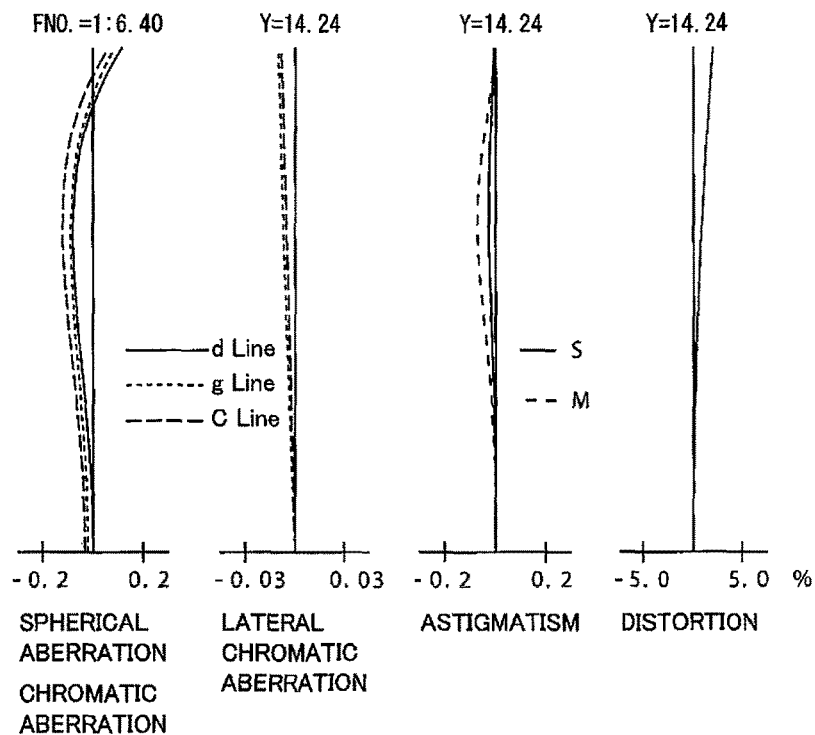
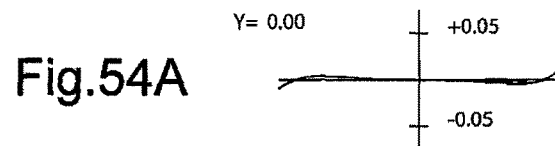
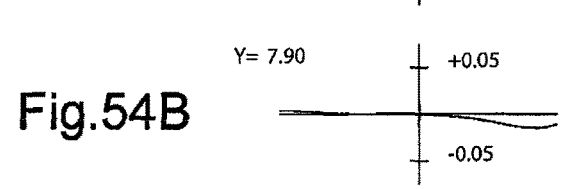
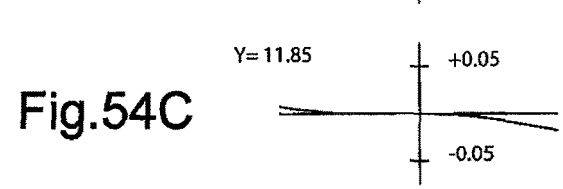
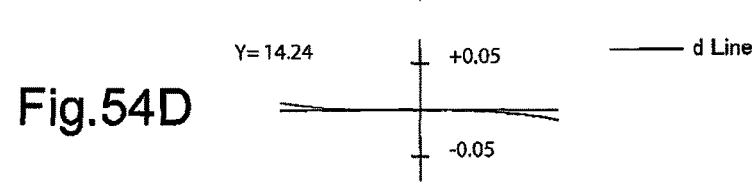

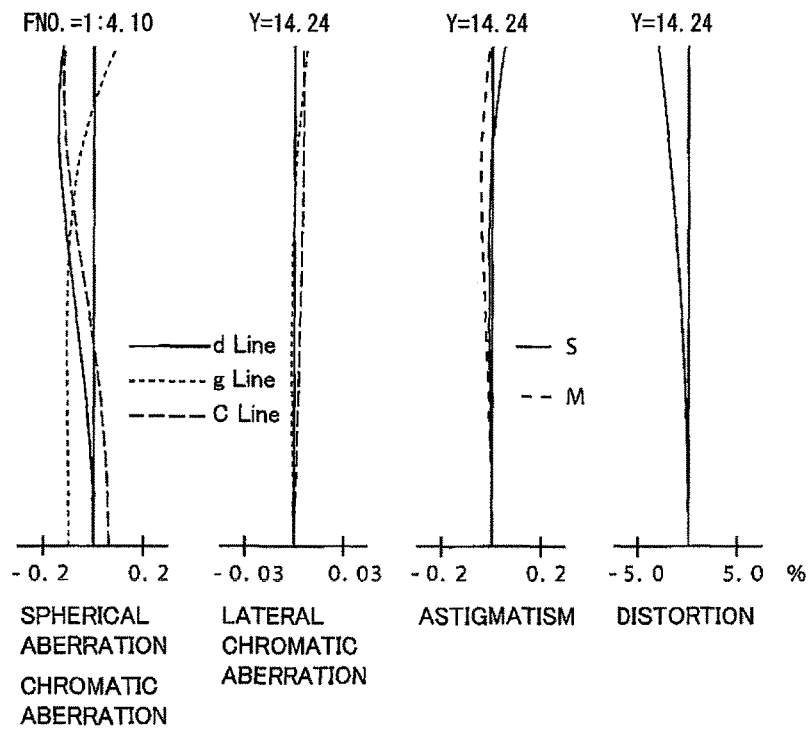
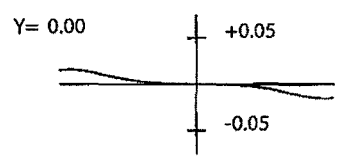
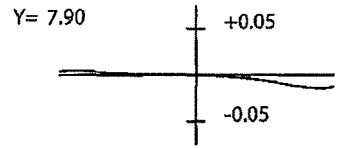
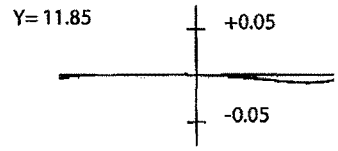
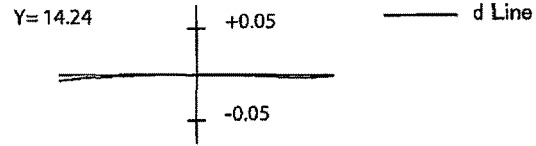

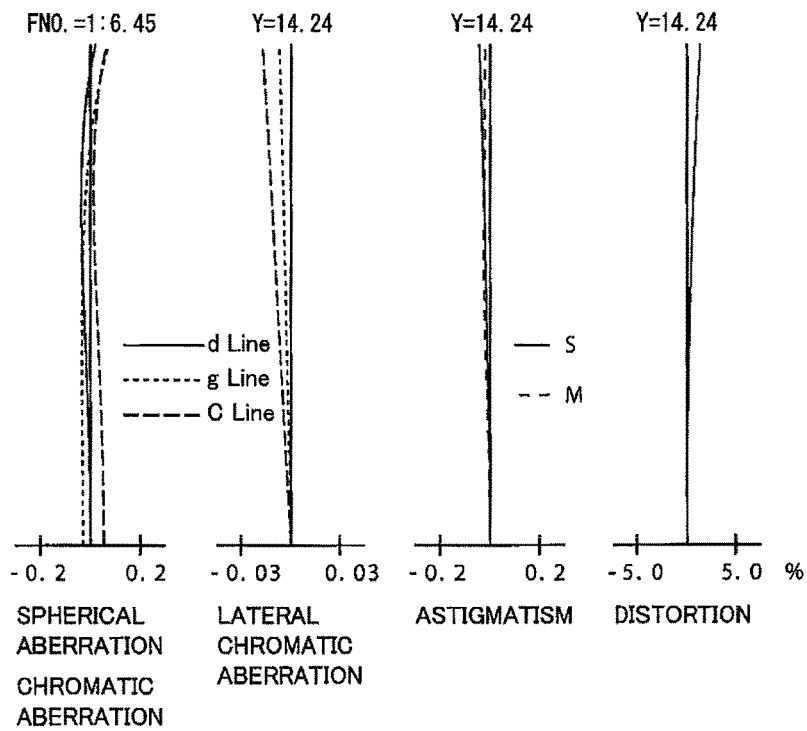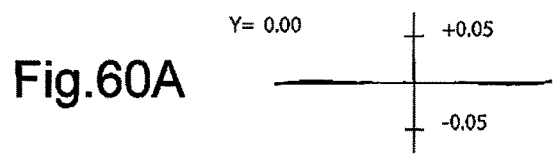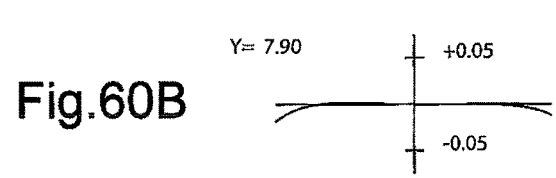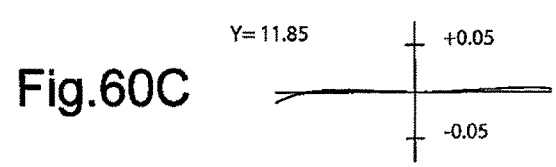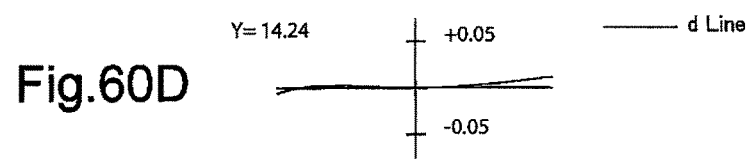

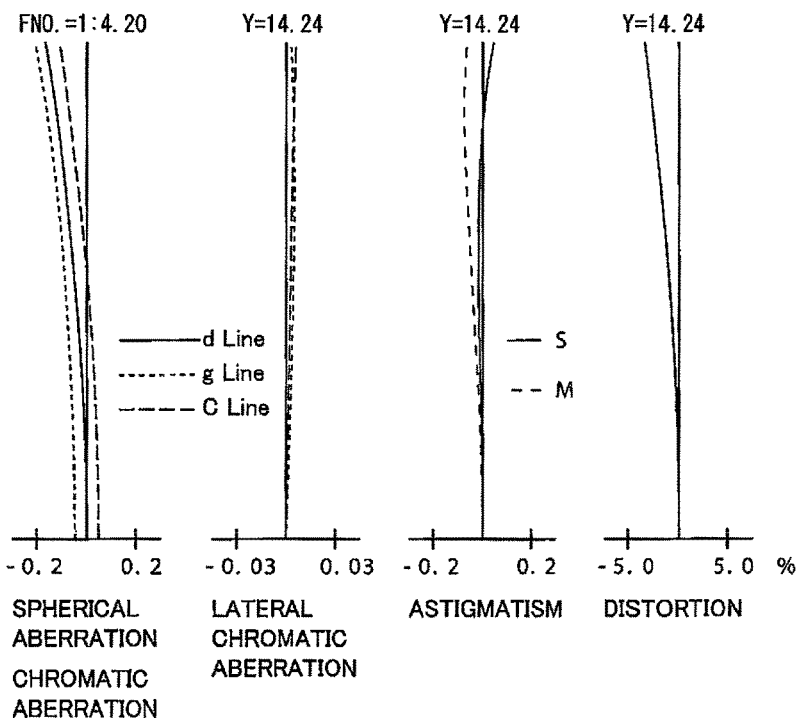
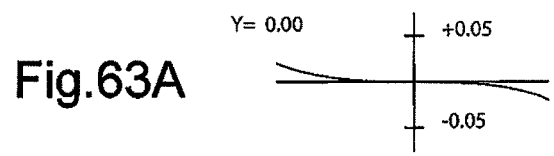
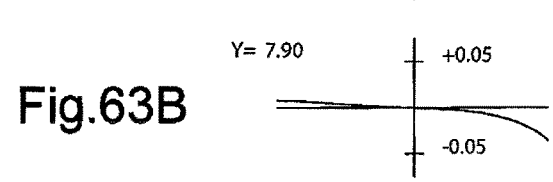
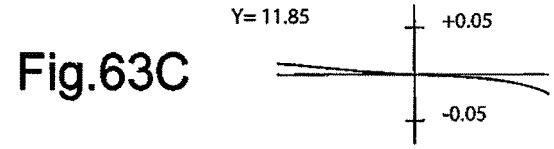
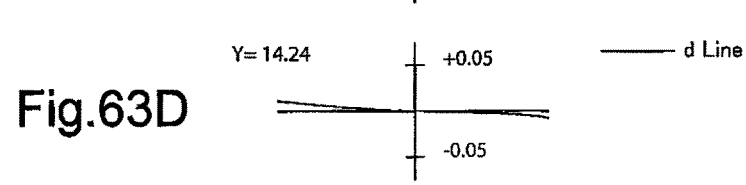

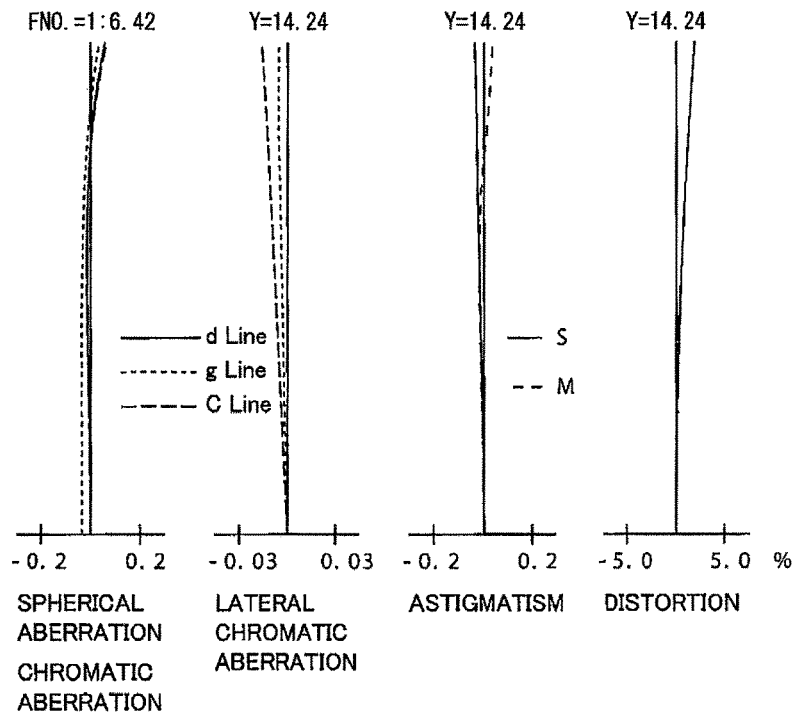
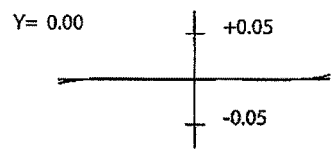
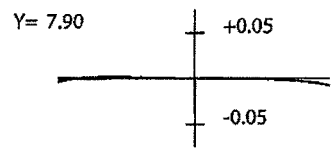
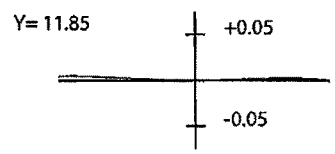
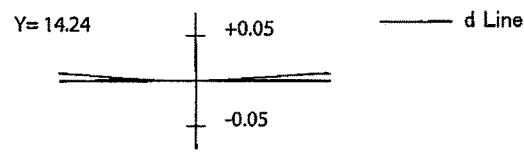

ZOOM LENS SYSTEM

BACKGROUND OF THE INVENTION

1. Field of the Invention

The present invention relates to a zoom lens system applied to, e.g., a surveillance camera, a digital camera, and an interchangeable lens.

2. Description of Related Art

In recent years, there has been a demand for a zoom lens system that is miniaturized, has a higher zoom ratio, and has an extended (long) focal length at the telephoto side for photographing distant objects using a high zoom ratio. Furthermore, there is a demand to have a high optical quality for an object distance from infinity through to a close distance. However, generally, a large amount of aberrations (especially spherical aberration) occur in a zoom lens system that includes a telephoto range.

Japanese Unexamined Patent Publication Nos. H11-352401 (Patent Literature 1) and 2012-27261 (Patent Literature 2) each disclose a zoom lens system including a telephoto range and configured of a positive first lens group, a negative second lens group, a positive third lens group, and a negative fourth lens group, in that order from the object side; known as a positive-lead zoom lens system.

However, in the zoom lens systems disclosed in Patent Literature 1 and 2, the correction of various aberrations over the zooming range from the short focal length extremity to the long focal length extremity is insufficient, and the optical quality tends to deteriorate.

SUMMARY OF THE INVENTION

The present invention has been devised in view of the above mentioned problems, and provides a zoom lens system that achieves a superior optical quality by favorably correcting various aberrations over the entire zooming range.

According to an aspect of the present invention, a zoom lens system is provided, including a positive first lens group, a negative second lens group, a positive intermediate lens group, and a negative image-side lens group, in that order from the object side. Upon zooming from the short focal length extremity to the long focal length extremity, a distance between the first lens group and the second lens group increases, and a distance between the second lens group and the intermediate lens group decreases. The image-side lens group consists of two lens elements. The following conditions (1), (2) and (3) are satisfied:

$$-6.0 < f1/f2 < -4.3 \quad (1),$$

$$-5.4 < f1/fIMG < -3.9 \quad (2),$$

and $$0.3 < D2/fw < 3.0 \quad (3),$$

wherein f1 designates the focal length of the first lens group, f2 designates the focal length of the second lens group, fIMG designates the focal length of the image-side lens group, D2 designates a distance along the optical axis between the surface closest to the image side on the second lens group and the surface closest to the object side on the intermediate lens group, at the short focal length extremity, and fw designates the focal length of the entire zoom lens system at the short focal length extremity.

Upon zooming from the short focal length extremity to the long focal length extremity, it is desirable for the first lens group to move (forwardly advance) toward the object side.

It is desirable for the first lens group to include at least one positive lens element, and a negative meniscus lens element, in that order from the object side.

In an embodiment, a zoom lens system is provided, including a positive first lens group, a negative second lens group, a positive intermediate lens group, and a negative image-side lens group, in that order from the object side. Upon zooming from the short focal length extremity to the long focal length extremity, a distance between the first lens group and the second lens group increases, and a distance between the second lens group and the intermediate lens group decreases. The first lens group includes at least one positive lens element and a negative meniscus lens element, in that order from the object side. The following conditions (1), (2) and (3) are satisfied:

$$-6.0 < f1/f2 < -4.3 \quad (1),$$

$$-5.4 < f1/fIMG < -3.9 \quad (2),$$

and $$0.3 < D2/fw < 3.0 \quad (3),$$

wherein f1 designates the focal length of the first lens group, f2 designates the focal length of the second lens group, fIMG designates the focal length of the image-side lens group, D2 designates a distance along the optical axis between the surface closest to the image side on the second lens group and the surface closest to the object side on the intermediate lens group, at the short focal length extremity, and fw designates the focal length of the entire zoom lens system at the short focal length extremity.

It is desirable for the following condition (3') to be satisfied within the scope of condition (3):

$$0.6 < D2/fw < 3.0 \quad (3').$$

It is desirable for the following condition (3") to be satisfied within the scope of condition (3):

$$0.3 < D2/fw < 1.0 \quad (3'').$$

It is desirable for the following conditions (11) and (12) to be satisfied:

$$\theta gFn - (0.6440 - 0.001682 \times \nu n) < 0 \quad (11),$$

and $$34 < \nu n \quad (12),$$

wherein θgFn designates the partial dispersion ratio at the short wavelength side of the negative meniscus lens element provided within the first lens group, θgF=(ng−nF)/(nF−nC), wherein ng, nF and nC designate refractive indexes at the g-line, the F-line and the C-line, respectively, and νn designates the Abbe number with respect to the d-line of the negative meniscus lens element provided within the first lens group.

It is desirable for the following condition (13) to be satisfied:

$$f1/fn < -1.5 \quad (13),$$

wherein f1 designates the focal length of the first lens group, and fn designates the focal length of the negative meniscus lens element provided within the first lens group.

It is desirable for the following condition (13') to be satisfied within the scope of condition (13):

$$-3.3 < f1/fn < -1.5 \tag{13'}$$

It is desirable for the image-side lens group to be a focusing lens group which is moved in the optical axis direction during a focusing operation.

It is desirable for the image-side lens group to consist of one positive lens element and one negative lens element.

It is desirable for the following condition (4) to be satisfied:

$$-6.0 < fRp/fRn < -1.5 \tag{4}$$

wherein fRp designates the focal length of the positive lens element provided within the image-side lens group, and fRn designates the focal length of the negative lens element provided within the image-side lens group.

It is desirable for the following condition (8) to be satisfied:

$$0.8 < f1/fw < 8.0 \tag{8}$$

wherein f1 designates the focal length of the first lens group, and fw designates the focal length of the entire zoom lens system at the short focal length extremity.

It is desirable for the following condition (9) to be satisfied:

$$0.6 < f1/(fw \times ft)^{1/2} < 6.0 \tag{9}$$

wherein f1 designates the focal length of the first lens group, fw designates the focal length of the entire zoom lens system at the short focal length extremity, and ft designates the focal length of the entire zoom lens system at the long focal length extremity.

It is desirable for the following condition (10) to be satisfied:

$$1.8 < nd_{ave} \tag{10}$$

wherein $nd_{ave}$ designates an average value of the refractive index at the d-line of all of the negative lens elements that are provided within the second lens group.

It is desirable for the intermediate lens group to include a positive front sub-lens lens group, an aperture diaphragm, and a positive rear sub-lens lens group, in that order from the object side.

It is desirable for the following condition (5) is satisfied:

$$0.1 < fSF/fSR < 7.0 \tag{5}$$

wherein fSF designates the focal length of the front sub-lens lens group, and fSR designates the focal length of the rear sub-lens lens group.

It is desirable for the following condition (6) to be satisfied:

$$1.00 < RF/RR < 20.0$$

wherein RF>0 and RR>0, wherein RF designates the radius of curvature of the surface closest to the image side on the front sub-lens lens group, and RR designates the radius of curvature of the surface closest to the object side on the rear sub-lens lens group.

It is desirable for the following condition (6') to be satisfied within the scope of condition (6):

$$1.0 < RF/RR < 2.8,$$

wherein RF>0, and RR>0.

It is desirable for the following condition (7) to be satisfied:

$$0.2 < DS/fFR < 1.0 \tag{7}$$

wherein DS designates a distance along the optical axis between the surface closest to the image side on the front sub-lens lens group and the surface closest to the object side on the rear sub-lens lens group, and fFR designates the combined focal length of the front sub-lens lens group and the rear sub-lens lens group at the short focal length extremity.

It is desirable for the intermediate lens group to be a positive third lens group, and the image-side lens group to be a negative fourth lens group. In such a case, the zoom lens system of the present invention is configured of a positive lens group, a negative lens group, a positive lens group and a negative lens group (four lens groups), in that order from the object side.

It is desirable for the intermediate lens group to include a positive third lens group and a positive fourth lens group; and the image-side lens group to be a negative fifth lens group. In such a case, the zoom lens system of the present invention is configured of a positive lens group, a negative lens group, a positive lens group, a positive lens group and a negative lens group (five lens groups), in that order from the object side.

It is desirable for the intermediate lens group to include a positive third lens group, a negative fourth lens group and a positive fifth lens group, and the image-side lens group to be a negative sixth lens group. In such a case, the zoom lens system of the present invention is configured of a positive lens group, a negative lens group, a positive lens group, a negative lens group, a positive lens group and a negative lens group (six lens groups), in that order from the object side.

It is desirable for the following condition (14) to be satisfied:

$$0.1 < f1/ft < 1.0 \tag{14}$$

wherein f1 designates the focal length of the first lens group, and ft designates the focal length of the entire zoom lens system at the long focal length extremity.

In an embodiment, a zoom lens system is provided, including a positive first lens group, a negative second lens group, and a positive $A^{th}$ lens group, in that order from the object side, wherein upon zooming from the short focal length extremity to the long focal length extremity, the distance between the first lens group and the second lens group increases, and the distance between the second lens group and the $A^{th}$ lens group decreases. The $A^{th}$ lens group is configured of a positive front sub-lens group, an aperture diaphragm, and a positive rear sub-lens group, in that order from the object side. The following conditions (5') and (6) are satisfied:

$$0.1 < fSF/fSR < 1.3 \tag{5'}$$

and $$1.0 < RF/RR < 20.0,$$

wherein RF>0 and RR>0, wherein fSF designates the focal length of the front sub-lens group, fSR designates the focal length of the rear sub-lens group, RF designates the radius of curvature of the surface closest the image side of the front sub-lens group, and RR designates the radius of curvature of the surface closest to the object side of the rear sub-lens group.

According to the present invention, a zoom lens system can be provided that achieves a superior optical quality by favorably correcting various aberrations over the entire zooming range.

The present disclosure relates to subject matter contained in Japanese Patent Application No. 2016-098112 (filed on May 16, 2016) and Japanese Patent Application No. 2017-020845 (filed on Feb. 8, 2017) which are expressly incorporated herein in their entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the zoom lens system of FIG. 1;

FIGS. 3A, 3B, 3C and 3D show lateral aberrations that occurred in the zoom lens system of FIG. 1;

FIGS. 5A, 5B, 5C and 5D show various aberrations that occurred in the zoom lens system of FIG. 4;

FIGS. 6A, 6B, 6C and 6D show lateral aberrations that occurred in the zoom lens system of FIG. 4;

FIG. 7 shows a lens arrangement of a second numerical embodiment of a zoom lens system, according to the present invention, at the short focal length extremity when focused on an object at infinity;

FIGS. 8A, 8B, 8C and 8D show various aberrations that occurred in the zoom lens system of FIG. 7;

FIGS. 9A, 9B, 9C and 9D show lateral aberrations that occurred in the zoom lens system of FIG. 7;

FIG. 10 shows a lens arrangement of the second numerical embodiment of a zoom lens system, according to the present invention, at the long focal length extremity when focused on an object at infinity;

FIGS. 11A, 11B, 11C and 11D show various aberrations that occurred in the zoom lens system of FIG. 10;

FIGS. 12A, 12B, 12C and 12D show lateral aberrations that occurred in the zoom lens system of FIG. 10;

FIGS. 14A, 14B, 14C and 14D show various aberrations that occurred in the zoom lens system of FIG. 13;

FIGS. 15A, 15B, 15C and 15D show lateral aberrations that occurred in the zoom lens system of FIG. 13;

FIGS. 20A, 20B, 20C and 20D show various aberrations that occurred in the zoom lens system of FIG. 19;

FIGS. 21A, 21B, 21C and 21D show lateral aberrations that occurred in the zoom lens system of FIG. 19;

FIGS. 23A, 23B, 23C and 23D show various aberrations that occurred in the zoom lens system of FIG. 22;

FIGS. 24A, 24B, 24C and 24D show lateral aberrations that occurred in the zoom lens system of FIG. 22;

FIGS. 26A, 26B, 26C and 26D show various aberrations that occurred in the zoom lens system of FIG. 25;

FIGS. 27A, 27B, 27C and 27D show lateral aberrations that occurred in the zoom lens system of FIG. 25;

FIGS. 32A, 32B, 32C and 32D show various aberrations that occurred in the zoom lens system of FIG. 31;

FIGS. 33A, 33B, 33C and 33D show lateral aberrations that occurred in the zoom lens system of FIG. 31;

FIGS. 35A, 35B, 35C and 35D show various aberrations that occurred in the zoom lens system of FIG. 34;

FIGS. 36A, 36B, 36C and 36D show lateral aberrations that occurred in the zoom lens system of FIG. 34;

FIGS. 38A, 38B, 38C and 38D show various aberrations that occurred in the zoom lens system of FIG. 37;

FIGS. 39A, 39B, 39C and 39D show lateral aberrations that occurred in the zoom lens system of FIG. 37;

FIGS. 41A, 41B, 41C and 41D show various aberrations that occurred in the zoom lens system of FIG. 40;

FIGS. 42A, 42B, 42C and 42D show lateral aberrations that occurred in the zoom lens system of FIG. 40;

FIGS. 44A, 44B, 44C and 44D show various aberrations that occurred in the zoom lens system of FIG. 43;

FIGS. 45A, 45B, 45C and 45D show lateral aberrations that occurred in the zoom lens system of FIG. 43;

FIGS. 47A, 47B, 47C and 47D show various aberrations that occurred in the zoom lens system of FIG. 46;

FIGS. 48A, 48B, 48C and 48D show lateral aberrations that occurred in the zoom lens system of FIG. 46;

FIGS. 50A, 50B, 50C and 50D show various aberrations that occurred in the zoom lens system of FIG. 49;

FIGS. 51A, 51B, 51C and 51D show lateral aberrations that occurred in the zoom lens system of FIG. 49;

FIGS. 53A, 53B, 53C and 53D show various aberrations that occurred in the zoom lens system of FIG. 52;

FIGS. 54A, 54B, 54C and 54D show lateral aberrations that occurred in the zoom lens system of FIG. 52;

FIGS. 56A, 56B, 56C and 56D show various aberrations that occurred in the zoom lens system of FIG. 55;

FIGS. 57A, 57B, 57C and 57D show lateral aberrations that occurred in the zoom lens system of FIG. 55;

FIGS. 59A, 59B, 59C and 59D show various aberrations that occurred in the zoom lens system of FIG. 58;

FIGS. 60A, 60B, 60C and 60D show lateral aberrations that occurred in the zoom lens system of FIG. 58;

FIGS. 62A, 62B, 62C and 62D show various aberrations that occurred in the zoom lens system of FIG. 61;

FIGS. 63A, 63B, 63C and 63D show lateral aberrations that occurred in the zoom lens system of FIG. 61;

FIGS. 65A, 65B, 65C and 65D show various aberrations that occurred in the zoom lens system of FIG. 64;

FIGS. 66A, 66B, 66C and 66D show lateral aberrations that occurred in the zoom lens system of FIG. 64;

DESCRIPTION OF THE EMBODIMENTS

Figure 67:
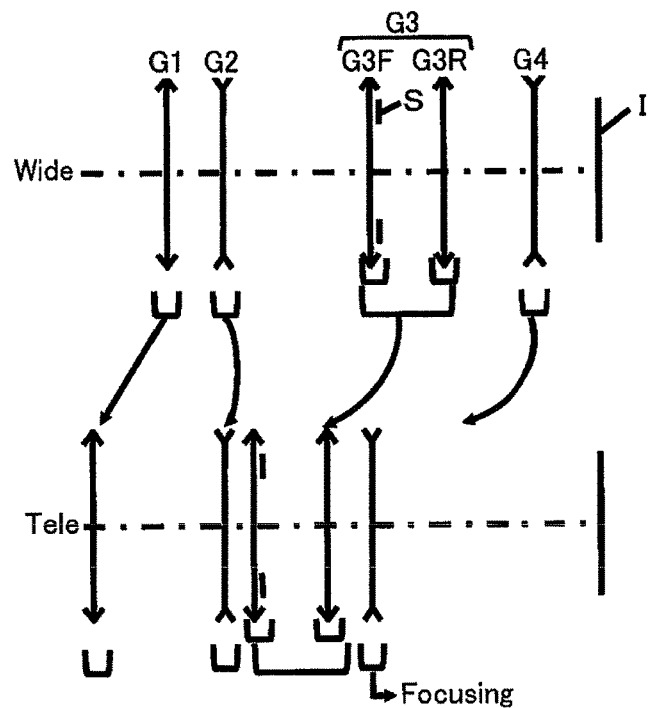
FIG. 67 shows a first zoom path of the zoom lens system according to the present invention.
Figure 68:
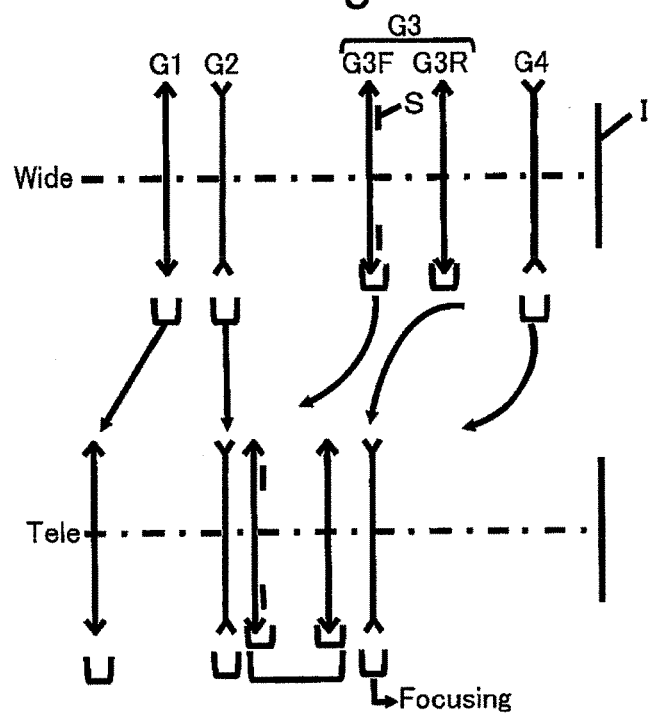
FIG. 68 shows a second zoom path of the zoom lens system according to the present invention.

As shown in the zoom paths of FIGS. 67 and 68, the zoom lens system of each of the first through eighth numerical embodiments, according to the present invention, is configured of a positive first lens group G1, a negative second lens group G2, a positive third lens group (intermediate lens group/$A^{th}$ lens group) G3, and a negative fourth lens group (image-side lens group/rearmost lens group/$B^{th}$ lens group) G4, in that order from the object side. The third lens group G3 is configured of a positive front sub-lens group G3F, an aperture diaphragm S, and a positive rear sub-lens group G3R, in that order from the object side. "I" designates the imaging plane (or an imaging surface of an image sensor).

As shown in the zoom path of FIG. 67, in the zoom lens system of each of the first through fourth numerical embodiments, upon zooming from the short focal length extremity (Wide) to the long focal length extremity (Tele), the front sub-lens lens group G3F and the rear sub-lens group G3R move integrally along the optical axis direction.

In other words, if the lens groups are defined based on the change in the distances between adjacent lens elements during zooming, the zoom lens systems of the first through fourth numerical embodiments are each configured of a positive lens group (first lens group G1), a negative lens group (second lens group G2), a positive lens group (third lens group G3) and a negative lens group (fourth lens group G4), in that order from the object side, totaling to four lens groups.

More specifically, upon zooming from the short focal length extremity to the long focal length extremity, the first lens group G1 moves (advances forwardly) toward the object side, the second lens group G2 first moves toward the image side and thereafter moves toward the object side (U-turns), and each of the third lens group G3 and the fourth lens group G4 first moves toward the image side and thereafter moves toward the object side to a position that exceeds the position thereof at the short focal length extremity.

There is a certain amount of freedom in the behavior of each lens group during zooming from the short focal length extremity to the long focal length extremity; various design choices are possible providing that the distance between the first lens group G1 and the second lens group G2 increases and the distance between the second lens group G2 and the third lens group (intermediate lens group) G3 decreases.

As shown in the zoom path of FIG. 68, in the zoom lens system of each of the fifth through eighth numerical embodiments, upon zooming from the short focal length extremity (Wide) to the long focal length extremity (Tele), the front sub-lens lens group G3F and the rear sub-lens group G3R move independently along the optical axis direction (the aperture diaphragm S moves integrally with the front sub-lens lens group G3F).

In other words, if the lens groups are defined based on the change in the distances between adjacent lens elements during zooming, the zoom lens systems of the fifth through eighth numerical embodiments are each configured of a positive lens group (first lens group G1), a negative lens group (second lens group G2), a positive lens group (front sub-lens lens group G3F), a positive lens group (rear sub-lens lens group G3R), and a negative lens group (fourth lens group G4), in that order from the object side, totaling to five lens groups.

More specifically, upon zooming from the short focal length extremity to the long focal length extremity, the first lens group G1 moves (advances forwardly) toward the object side, the second lens group G2 remains stationary relative to the imaging plane I (does not move in the optical axis direction) that is determined at the design stage, and each of the front sub-lens lens group G3F and the fourth lens group G4 first moves toward the image side and thereafter moves toward the object side to a position that exceeds the position thereof at the short focal length extremity, and the rear sub-lens lens group G3R monotonically moves toward the object side.

There is a certain amount of freedom in the behavior of each lens group during zooming from the short focal length extremity to the long focal length extremity; various design choices are possible providing that the distance between the first lens group G1 and the second lens group G2 increases and the distance between the second lens group G2 and the front sub-lens lens group (intermediate lens group) G3F decreases.

In each of the first through eighth numerical embodiments, the fourth lens group (image-side lens group) G4 also constitutes a focusing lens group which moves in the optical axis direction during a focusing operation. Namely, upon focusing on an object at infinity through to an object at a close distance, the fourth lens group (image-side lens group) G4 moves toward the image side.

In each of the first through third, fifth, sixth and eighth numerical embodiments, the first lens group G1 is configured of a positive lens element 11, a negative lens element (negative meniscus lens element) 12, and a positive lens element 13, in that order from the object side. The negative lens element 12 and the positive lens element 13 are cemented to each other.

In each of the fourth and seventh numerical embodiments, the first lens group G1 is configured of a positive lens element 11', a positive lens element 12', a negative lens element (negative meniscus lens element) 13', and a positive lens element 14', in that order from the object side. The negative lens element 13' and the positive lens element 14' are cemented to each other.

In each of the first through third, fifth, sixth and eighth numerical embodiments, the second lens group is configured of a negative lens element 21, a positive lens element 22, and a negative lens element 23, in that order from the object side. The negative lens element 21 and the positive lens element 22 are cemented to each other. In each of the fourth and seventh numerical embodiments, the second lens group G2 is configured of a negative lens element 21', a positive lens element 22', a positive lens element 23', and a negative lens element 24', in that order from the object side. The negative lens element 21' and the positive lens element 22' are cemented to each other. The positive lens element 23' and the negative lens element 24' are cemented to each other.

In each of the first through eighth numerical embodiments, the front sub-lens lens group G3F is configured of positive lens element 31F, a positive lens element 32F, and a negative lens element 33F, in that order from the object side. The positive lens element 32F and the negative lens element 33F are cemented to each other.

In each of the first through eighth numerical embodiments, the rear sub-lens lens group G3R is configured of a negative lens element 31R, a positive lens element 32R and a positive lens element 33R, in that order from the object side.

In each of the first through eighth numerical embodiments, the fourth lens group G4 is configured of a positive lens element 41 and a negative lens element 42, in that order from the object side.

Figure 69:
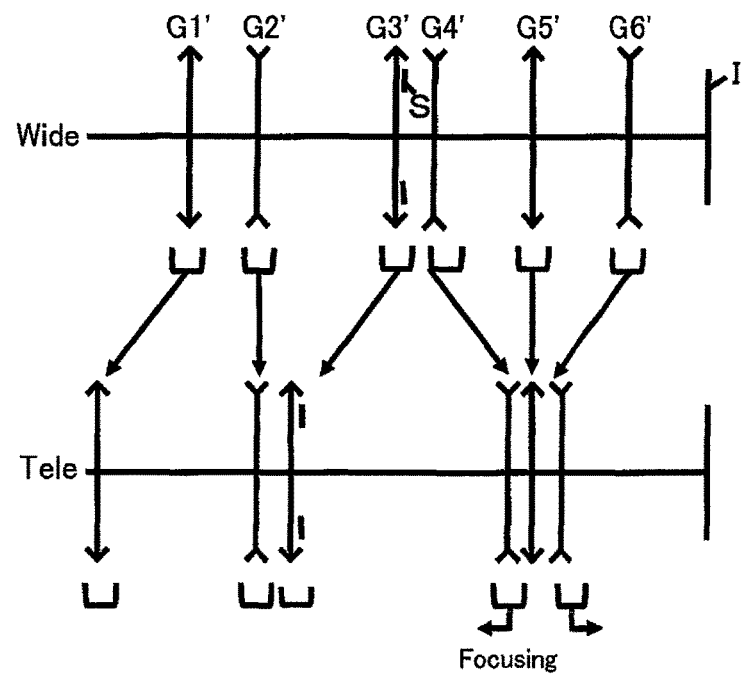
FIG. 69 shows a third zoom path of the zoom lens system according to the present invention.
Figure 70:
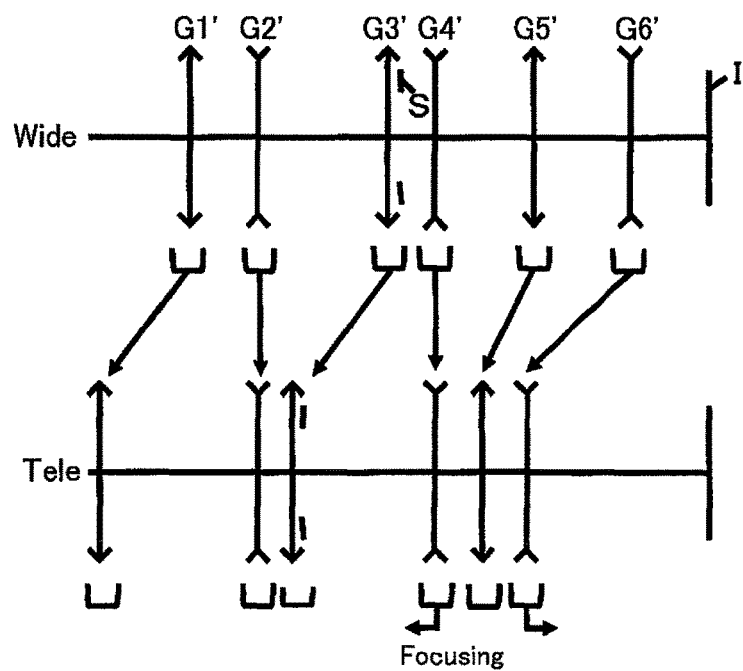
FIG. 70 shows a fourth zoom path of the zoom lens system according to the present invention.
Figure 71:
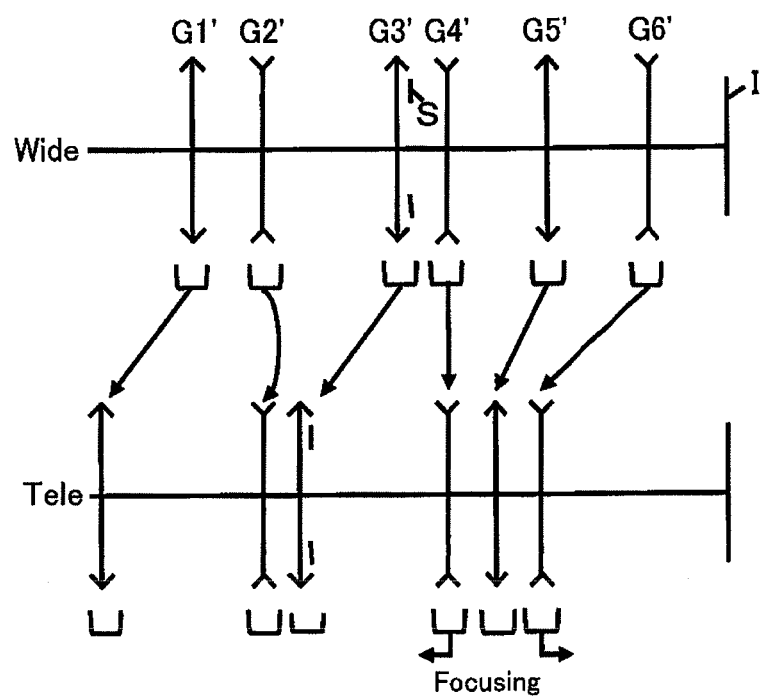
FIG. 71 shows a fifth zoom path of the zoom lens system according to the present invention.

As shown in the zoom paths of FIGS. 69 through 71, the zoom lens system of each of the ninth through eleventh numerical embodiments, according to the present invention, is configured of a positive first lens group G1', a negative second lens group G2', a positive third lens group (intermediate lens group) G3', a negative fourth lens group (intermediate lens group) G4', a positive fifth lens group (intermediate lens group) G5', and a negative sixth lens group (image-side lens group) G6', in that order from the object side. A diaphragm S is provided between the third lens group G3' and the fourth lens group G4' (immediately behind the third lens group G3'); the diaphragm S integrally moves with the third lens group G3'. "I" designates the imaging plane (or an imaging surface of an image sensor).

As shown in the zoom paths of FIGS. 69 through 71, in the zoom lens system of each of the ninth through eleventh numerical embodiments, upon zooming from the short focal length extremity (Wide) to the long focal length extremity (Tele), the distance between the first lens group G1' and the second lens group G2' increases, the distance between the second lens group G2' and the third lens group G3' decreases, the distance between the third lens group G3' and the fourth lens group G4' increases, the distance between the fourth lens group G4' and the fifth lens group G5' decreases, and the distance between the fifth lens group G5' and the sixth lens group G6' decreases.

In each of the ninth through eleventh numerical embodiments, upon zooming from the short focal length extremity to the long focal length extremity, the first lens group G1' moves monotonically toward the object side (forwardly advances).

In each of the ninth and tenth numerical embodiments, upon zooming from the short focal length extremity to the long focal length extremity, the second lens group G2' remains stationary relative to the imaging plane I (does not move in the optical axis direction) that is determined at the design stage. In the eleventh numerical embodiment, upon zooming from the short focal length extremity to the long focal length extremity, the second lens group G2' first moves toward the image side and thereafter returns (U-turns) toward the object side.

In each of the ninth through eleventh numerical embodiments, upon zooming from the short focal length extremity to the long focal length extremity, the third lens group G3' monotonically moves toward the object side (forwardly advances).

In the ninth numerical embodiment, upon zooming from the short focal length extremity to the long focal length extremity, the fourth lens group G4' monotonically moves toward the image side. In each of the tenth and eleventh numerical embodiments, upon zooming from the short focal length extremity to the long focal length extremity, the fourth lens group G4' remains stationary relative to the imaging plane I (does not move in the optical axis direction) that is determined at the design stage.

In the ninth numerical embodiment, upon zooming from the short focal length extremity to the long focal length extremity, the fifth lens group G5' remains stationary relative to the imaging plane I (does not move in the optical axis direction) that is determined at the design stage. In each of the tenth and eleventh numerical embodiments, upon zooming from the short focal length extremity to the long focal length extremity, the fifth lens group G5' monotonically moves toward the object side (forwardly advances).

In each of the ninth through eleventh numerical embodiments, the sixth lens group G6' monotonically moves toward the object side (forwardly advances).

There is a certain amount of freedom in the behavior of each lens group during zooming from the short focal length extremity to the long focal length extremity; various design choices are possible providing that the distance between the first lens group G1' and the second lens group G2' increases and the distance between the second lens group G2' and the third lens group (intermediate lens group) G3' decreases.

In each of the ninth through eleventh numerical embodiments, the fourth lens group G4' and the sixth lens group G6' constitute focusing lens groups which are moved during a focusing operation. Namely, upon focusing on an object at infinity through to an object at a close distance, the sixth lens group G6' moves toward the image side, and due to the fourth lens group G4' also sharing the burden of aberration correction, the fourth lens group G4' moves toward the object side.

In each of the ninth through eleventh numerical embodiments, the first lens group G1' is configured of a positive lens element 11A, a negative lens element (negative meniscus lens element) 12A, and a positive lens element 13A, in that order from the object side. The negative lens element 12A and the positive lens element 13A are cemented to each other.

In the ninth numerical embodiment, the second lens group G2' is configured of a negative lens element 21A, a positive lens element 22A, and a negative lens element 23A, in that order from the object side. The negative lens element 21A and the positive lens element 22A are cemented to each other.

In the tenth numerical embodiment, the second lens group G2' is configured of a negative lens element 21B, a positive lens element 22B, a positive lens element 23B, and a negative lens element 24B, in that order from the object side. The negative lens element 21B and the positive lens element 22B are cemented to each other. The positive lens element 23B and the negative lens element 24B are cemented to each other.

In the eleventh numerical embodiment, the second lens group G2' is configured of a negative lens element 21C, a positive lens element 22C, a negative lens element 23C, and positive lens element 24C, in that order from the object side. The negative lens element 21C and the positive lens element 22C are cemented to each other. The negative lens element 23C and the positive lens element 24C are cemented to each other.

In each of the ninth and tenth numerical embodiments, the third lens group G3' is configured of a positive lens element 31A, a positive lens element 32A, and a negative lens element 33A, in that order from the object side. The positive lens element 32A and the negative lens element 33A are cemented to each other.

In the eleventh numerical embodiment, the third lens group G3' is configured of a positive lens element 31B, a negative lens element 32B, and a positive lens element 33B, in that order from the object side. The negative lens element 32B and the positive lens element 33B are cemented to each other.

In each of the ninth through eleventh numerical embodiments, the fourth lens group G4' is configured of a negative single lens element 41A.

In each of the ninth through eleventh numerical embodiments, the fifth lens group G5' is configured of a positive lens element 51A, a positive lens element 52A, and a negative lens element 53A, in that order from the object side. The positive lens element 52A and the negative lens element 53A are cemented to each other.

In each of the ninth through eleventh numerical embodiments, the sixth lens group G6' is configured of a positive lens element 61A and a negative lens element 62A, in that order from the object side. The positive lens element 61A and the negative lens element 62A are cemented to each other.

In the illustrated embodiments, the focal length can be extended (increased) at the long focal length extremity by adopting a positive-lead zoom lens system having either a four-lens-group arrangement configured of a positive lens group, a negative lens group, a positive lens group, and a negative lens group, in that order from the object side; a five-lens-group arrangement configured of a positive lens group, a negative lens group, a positive lens group, a positive lens group, and a negative lens group, in that order from the object side; or a six-lens-group arrangement configured of a positive lens group, a negative lens group, a positive lens group, a negative lens group, a positive lens group and a negative lens group, in that order from the object side. Furthermore, in the zoom lens system of the illustrated embodiments, by arranging a positive first lens group G1 (G1') and a negative second lens group G2 (G2'), in that order from the object side, a higher zoom ratio can be achieved. Note that it is possible for the zoom lens system according to the present invention to have four or more intermediate lens groups and for the entire zoom lens system to have seven or more lens groups.

In a positive-lead zoom lens system of the related art, it is typical for the first lens group or the second lens group to be moved (forwardly advanced) toward the object side when carrying out a focusing operation. However, lens groups that are provided on the object side are relatively large, compared to the remaining lens groups within the zoom lens system, and are not suitable for performing a rapid and silent focusing operation. Consequently, in the zoom lens system of the illustrated embodiments, by using the fourth lens group G4 or the sixth lens group G6' (image-side lens group), which are provided closest to the image side and are relatively small in size (and weight), as a focusing lens group, a rapid and silent focusing operation can be attained. Furthermore, by moving the fourth lens group G4 or the sixth lens group G6' (image-side lens group) toward the image side during a focusing operation, no obstacles in the focusing movement direction occur, so that a necessary focusing movement amount (for the focusing lens group) can be secured while enabling a reduction in the minimum photographing distance.

If the number of lens elements in the focusing lens group are increased, although it becomes easier to improve the optical quality at close distances, such a focusing lens group becomes increasingly unsuitable for a rapid and silent focusing operation. Whereas, if the focusing lens group is only configured of a single lens element, abaxial aberration worsens mainly at the short focal length extremity, axial aberration worsens mainly at the long focal length extremity, and correction of chromatic aberration at a close distance becomes insufficient. Therefore, according to the illustrated embodiments of the zoom lens system, by configuring either the fourth lens group G4 or the sixth lens group G6' (image-side lens group), either of which constitutes the focusing lens group, out of one positive lens element and one negative lens element (41 and 42 or 61A and 62A), it is possible to achieve a rapid and silent focusing operation, and abaxial aberration at the short focal length extremity, axial aberration at the long focal length extremity, and chromatic aberration at a close distance can be favorably corrected.

It is desirable for the first lens group G1 (G1') to have at least one positive single lens element provided closest to the object side. Due to the converging function (focusing function), the pupil diameter (axial light-bundle diameter) upon passing through the positive single lens element can be narrowed, and is effective for suppressing occurrence of various aberrations such as spherical aberration, especially at the long focal length extremity. Furthermore, such a positive single lens element (provided closest to the object side within the first lens group G1 (G1')) is also effective for suppressing various aberrations caused by decentration occurring within the lens groups and decentration occurring between adjacent lens group (decentration between lens groups), which are caused by manufacturing error. Furthermore, providing a negative lens element behind (immediately behind) the positive single lens element closest to the object side is effective for suppressing the occurrence of abaxial aberration, especially at the short focal length extremity, while favorably correcting chromatic aberration from the short focal length extremity through to the long focal length extremity.

As described above, the first lens group G1 (G1') is moved toward the object side during zooming from the short focal length extremity to the long focal length extremity. If the first lens group were to remain stationary (at a fixed position on the optical axis) during zooming, the overall length of the zoom lens system would be increased mainly at the short focal length extremity, so that the lens diameter of the first lens group would increase (would need to be increased) in order to collect abaxial light rays.

By moving the first lens group G1 (G1') in the optical axis direction during zooming, the outer diameter of the first lens group G1 (G1') can be reduced, and is also advantageous for shortening the accommodating length of the zoom lens system (the distance from the object-side surface on the lens element closest to the object side to the image-side surface on the lens element closest to the image side, when the zoom lens system is retracted so that the length thereof in the optical axis direction is at a minimum out of the range from the short focal length extremity to the long focal length extremity), i.e., miniaturization of the zoom lens system can be achieved. Furthermore, since the height of the incident abaxial light rays onto the first lens group G1 (G1') can be reduced, the configuration of the present invention is advantageous for correcting abaxial aberration. Although decentration between lens groups (decentration between adjacent lens groups) caused by manufacturing error in the movement mechanism for moving the first lens group G1 (G1') during zooming easily occurs, by configuring the first lens group as described above (i.e., the first lens group G1 (G1') having at least one positive single lens element provided closest to the object side), any influence of decentration between lens groups due to manufacturing error can be suppressed.

Condition (1) specifies the focal length of the first lens group G1 (G1') to the focal length of the second lens group G2 (G2'). By satisfying condition (1), various aberrations such as spherical aberration and chromatic aberration at the long focal length extremity, and coma and astigmatism at the short focal length extremity can be favorably corrected.

If the upper limit of condition (1) is exceeded, the refractive power of the first lens group G1 (G1') becomes too strong, so that spherical aberration and chromatic aberration, etc., at the long focal length extremity worsen.

If the lower limit of condition (1) is exceeded, the refractive power of the second lens group G2 (G2') becomes too strong, so that coma and astigmatism at the short focal length extremity worsen.

Condition (2) specifies the ratio of the focal length of the first lens group G1 (G1') to the focal length of the image-side lens group (the fourth lens group G4 or the sixth lens group G6' in the illustrated embodiments). By satisfying condition (2), various aberrations including spherical aberration and chromatic aberration at the long focal length extremity can be favorably corrected, and fluctuations in astigmatism at the short focal length extremity and fluctuations spherical aberration at the long focal length extremity can be suppressed when the photographing distance is changed from infinity to a close distance.

If the upper limit of condition (2) is exceeded, the refractive power of the first lens group G1 (G1') becomes too strong, thereby worsening spherical aberration and chromatic aberration, etc., at the long focal length extremity.

If the lower limit of condition (2) is exceeded, the refractive power of the image-side lens group becomes too strong, and fluctuations in astigmatism at the short focal length extremity and fluctuations spherical aberration at the long focal length extremity increase when the photographing distance is changed from infinity to a close distance.

Conditions (3), (3') and (3") each specify the ratio of the distance along the optical axis between the surface closest to the image side on the second lens group G2 (G2') and the surface closest to the object side on the intermediate lens group (the third lens group G3 (G3') in the illustrated embodiment), at the short focal length extremity, to the focal length of the entire zoom lens system at the short focal length extremity. By satisfying condition (3), the diameters of the lens groups and the overall length of the zoom lens system can be reduced, a necessary backfocus can be attained, and coma, astigmatism and spherical aberration can be favorably corrected. These functional effects are more prominent if condition (3') and/or condition (3") are satisfied.

If the upper limits of conditions (3) and (3') are exceeded, the positions of the first lens group G1 (G1') and the second lens group G2 (G2'), at the short focal length extremity, are distant from the imaging plane I that is determined at the design stage, so that the lens diameters of the lens groups increase, and coma and astigmatism worsen. Furthermore, the overall length of the zoom lens system becomes too long.

If the lower limits of conditions (3) and (3") are exceeded, the distance between the second lens group G2 (G2') and the intermediate lens group becomes too close, so that it becomes difficult to attain a necessary backfocus. Furthermore, if attempts are made to attain a necessary backfocus with the lower limit of condition (3) exceeded, the divergent power of the second lens group G2 (G2') would need to be strengthened, thereby worsening spherical aberration and coma at the short focal length extremity.

As described above, the image-side lens group (the fourth lens group G4 or the sixth lens group G6' in the illustrated embodiments) is configured of one positive lens element and one negative lens element (the positive lens element 41 and the negative lens element 42, or the positive lens element 61A and the negative lens element 62A in the illustrated embodiments).

Condition (4) specifies the ratio of the focal length of the positive lens element to the focal length of the negative lens element of the image-side lens group, having the above-described configuration. By satisfying condition (4), axial chromatic aberration, spherical aberration and coma can be favorably corrected.

If the upper limit of condition (4) is exceeded, the refractive power of the positive lens element within the image-side lens group becomes too strong, so that it becomes difficult to correct axial chromatic aberration.

If the lower limit of condition (4) is exceeded, the refractive power of the negative lens element within the image-side lens group becomes too strong, so that it becomes difficult to correct spherical aberration and coma.

As described above, in each of the first through eighth numerical embodiments, the intermediate lens group (the third lens group G3 in the illustrated embodiments) is configured of a positive front sub-lens group G3F, an aperture diaphragm, and a positive rear sub-lens group G3R, in that order from the object side.

With the above-described configuration, conditions (5) and (5') specify the ratio of the focal length of the front sub-lens group G3F to the focal length of the rear sub-lens group G3R. By satisfying condition (5), spherical aberration, coma and astigmatism can be favorably corrected. These functional effects are more prominent if condition (5') is satisfied.

If the upper limit of condition (5) is exceeded, the refractive power of the rear sub-lens group G3R becomes too strong, so that fluctuations of spherical aberration and coma from infinity to a close distance increase.

If the lower limits of condition (5) and (5') are exceeded, the refractive power of the front sub-lens group G3F becomes too strong, so that fluctuation in astigmatism during zooming from the short focal length extremity to the long focal length extremity increases.

With the above-described configuration, conditions (6) and (6') specify the ratio of the radius of curvature of the surface closest to the image side on the front sub-lens group G3F to the radius of curvature of the surface closest to the object side on the rear sub-lens group G3R. By satisfying condition (6), spherical aberration and coma can be favorably corrected, and variation in optical quality due to manufacturing error can be suppressed. These function effects are more prominent if condition (6') is satisfied.

If the upper limit of condition (6) is exceeded, the radius of curvature of the surface closet to the object side on the rear sub-lens group G3R becomes too small, so that correction of spherical aberration and coma mainly at the short focal length extremity becomes difficult. Furthermore, decentration sensitivity of the rear sub-lens group G3R becomes too large, so that variation in optical quality due to manufacturing error increases.

If the lower limits of condition (6) or (6') are exceeded, the radius of curvature of the surface closest to the image side on the front sub-lens group G3F becomes too small, so that the divergent power becomes too strong, and the light bundle incident on the rear sub-lens group G3R becomes large. Consequently, fluctuations of spherical aberration and coma from infinity to a close distance increase.

Condition (7) specifies the ratio of the distance along the optical axis between the surface closest to the image side on the front sub-lens group G3F and the surface closest to the object side on the rear sub-lens group G3R, at the short focal length extremity, to the combined focal length of the front sub-lens group G3F and the rear sub-lens group G3R at the short focal length extremity. By satisfying condition (7), the overall length of the zoom lens system can be shortened, aberrations that occur at different coordinates can be favorably corrected, and coma can be favorably corrected over the entire zooming range.

If the upper limit of condition (7) is exceeded, the distance between the front sub-lens group G3F and the rear sub-lens group G3R becomes too large, and the overall length of the zoom lens system increases. Therefore, in order to increase peripheral light quantity of abaxial light rays, the lens diameter must be increased, resulting in causing difficulty in correcting coma aberration at the short focal length extremity.

If the lower limit of condition (7) is exceeded, the distance between the front sub-lens group G3F and the rear sub-lens group G3R becomes too small, so that since the heights of light rays that pass through the front sub-lens group G3F and the rear sub-lens group G3R become close to each other, it becomes difficult to correct coma over the entire zooming range.

Condition (8) specifies the ratio of the focal length of the first lens group G1 (G1') to the focal length of the entire zoom lens system at the short focal length extremity. By satisfying condition (8), the overall length of the zoom lens system can be shortened, and spherical aberration, coma, astigmatism and lateral chromatic aberration can be favorably corrected.

If the upper limit of condition (8) is exceeded, the refractive power of the first lens group G1 (G1') becomes too weak and the amount of movement (forward advancement) of the first lens group G1 (G1') during zooming increases, resulting in the overall length of the zoom lens system increasing. Furthermore, in order to allow the abaxial light bundle to pass through the first lens group G1 (G1'), the diameter of the first lens group G1 (G1') must be increased, so that abaxial coma, astigmatism and lateral chromatic aberration, etc., worsen.

If the lower limit of condition (8) is exceeded, the refractive power of the first lens group G1 (G1') becomes too strong, so that it becomes difficult to correct spherical aberration, coma, astigmatism and chromatic aberration, etc.

Condition (9) specifies the ratio of the focal length of the first lens group G1 (G1') to the square root of the product of the focal length of the entire zoom lens system at the short focal length extremity and at the long focal length extremity. By satisfying condition (9), the overall length of the zoom lens system can be shortened, and spherical aberration, coma, astigmatism and lateral chromatic aberration, etc., can be favorably corrected.

If the upper limit of condition (9) is exceeded, the refractive power of the first lens group G1 (G1') becomes too weak, the amount of movement (forward advancement) of the first lens group G1 (G1') during zooming increases, resulting in the overall length of the zoom lens system increasing. Furthermore, in order to allow the abaxial light bundle to pass through the first lens group G1 (G1'), the diameter of the first lens group G1 (G1') must be increased, so that abaxial coma, astigmatism and lateral chromatic aberration, etc., worsen.

If the lower limit of condition (9) is exceeded, the refractive power of the first lens group G1 (G1') becomes too strong, so that it becomes difficult to correct spherical aberration, coma, astigmatism and chromatic aberration, etc.

Condition (10) specifies the average value of the refractive indexes at the d-line of all of the negative lens elements within the second lens group G2 (G2') (in the illustrated embodiments, the negative lens elements 21 and 23, the negative lens elements 21' and 24', the negative lens elements 21A and 23A, the negative lens elements 21B and 24B, or the negative lens elements 21C and 23C). By satisfying condition (10), fluctuations in astigmatism during zooming can be suppressed and coma mainly at the short focal length extremity can be favorably corrected.

If the lower limit of condition (10) is exceeded, fluctuations in astigmatism during zooming increase, and it becomes difficult to correct coma mainly at the short focal length extremity.

As described above, the first lens group G1 (G1') is configured of at least one positive lens element (the positive lens element 11, positive lens element 11', positive lens element 12 or the positive lens element 11A in the illustrated embodiments), and a negative meniscus lens element (12, 13' or 12A), in that order from the object side.

With the above-described configuration, condition (11) specifies the relationship between partial dispersion ratio at the short wavelength side of the negative meniscus lens element provided within the first lens group G1 (G1') to the Abbe number at the d-line. By satisfying condition (11), the secondary spectrum mainly at the long focal length extremity is reduced, and axial chromatic aberration can be favorably corrected.

If condition (11) is not satisfied, the secondary spectrum mainly at the long focal length extremity increases, and it becomes difficult to correct axial chromatic aberration.

With the above-described configuration, condition (12) specifies the Abbe number with respect to the d-line of the negative meniscus lens element that is provided within the first lens group G1 (G1'). By satisfying condition (12), axial chromatic aberration and lateral chromatic aberration can be favorably corrected, and axial chromatic aberration can especially be favorably corrected by reducing the secondary spectrum mainly at the long focal length extremity.

If the lower limit of condition (12) is exceeded, axial chromatic aberration and lateral chromatic aberration become overcorrected. Furthermore, since a material having low anomalous dispersion properties would need to be selected, the secondary spectrum increases mainly at the long focal length extremity, so that it becomes difficult to correct axial chromatic aberration.

Conditions (13) and (13') specify the ratio of the focal length of the first lens group G1 (G1') to the focal length of the negative meniscus lens element provided within the first lens group G1 (G1'). By satisfying condition (13), spherical aberration, coma, astigmatism and chromatic aberration can be favorably corrected. These functional effects are more prominent if condition (13') is satisfied.

If the upper limits of conditions (13) and (13') are exceeded, the refractive power of the negative meniscus lens element within the first lens group G1 (G1') becomes too weak, and correction of the aberrations (spherical aberration, coma and chromatic aberration) burdened on the negative meniscus lens element becomes insufficient.

If the lower limit of condition (13') is exceeded, the refractive power of the negative meniscus lens element within the first lens group G1 (G1') becomes too strong, so that correction of spherical aberration, coma, astigmatism and chromatic aberration over the entire zooming range becomes difficult.

Condition (14) specifies the ratio of the focal length of the first lens group G1 (G1') to the focal length of the entire zoom lens system at the long focal length extremity. By satisfying condition (14), the first lens group G1 (G1'), and hence the entire zoom lens system, can be miniaturized, and field curvature, spherical aberration and coma can be favorably corrected.

If the upper limit of condition (14) is exceeded, the refractive power of the first lens group G1 (G1') becomes too weak, so that the first lens group G1 (G1'), and hence the entire zoom lens system, is enlarged. Furthermore, the cancellation effect on field curvature that occurs after the first lens group G1 (G1') becomes weak, so that positive field curvature occurs over the entire zooming range.

If the lower limit of condition (14) is exceeded, the refractive power of the first lens group G1 (G1') becomes too strong, so that it becomes difficult to correct spherical aberration and coma mainly at the long focal length extremity.

[Embodiments]

Specific first through eleventh numerical embodiments will be herein discussed. In the various aberration diagrams, lateral aberration diagrams and the tables, the d-line, g-line and C-line show aberrations at their respective wavelengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, R designates the radius of curvature, d designates the lens thickness or distance between lenses, N(d) designates the refractive index at the d-line, and ν (d) designates the Abbe number with respect to the d-line. The backfocus is the distance from the surface on the side closest to the image side of the zoom lens system to the imaging plane I (FIGS. 67 through 71). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity. The unit used for the various lengths is defined in millimeters (mm). An aspherical surface lens is not used in any of the first through eleventh embodiments. However, an embodiment is possible in which aberrations can be corrected by using an aspherical surface of diffraction surface at any part of the optical system.

[Numerical Embodiment 1]

Figure 1:
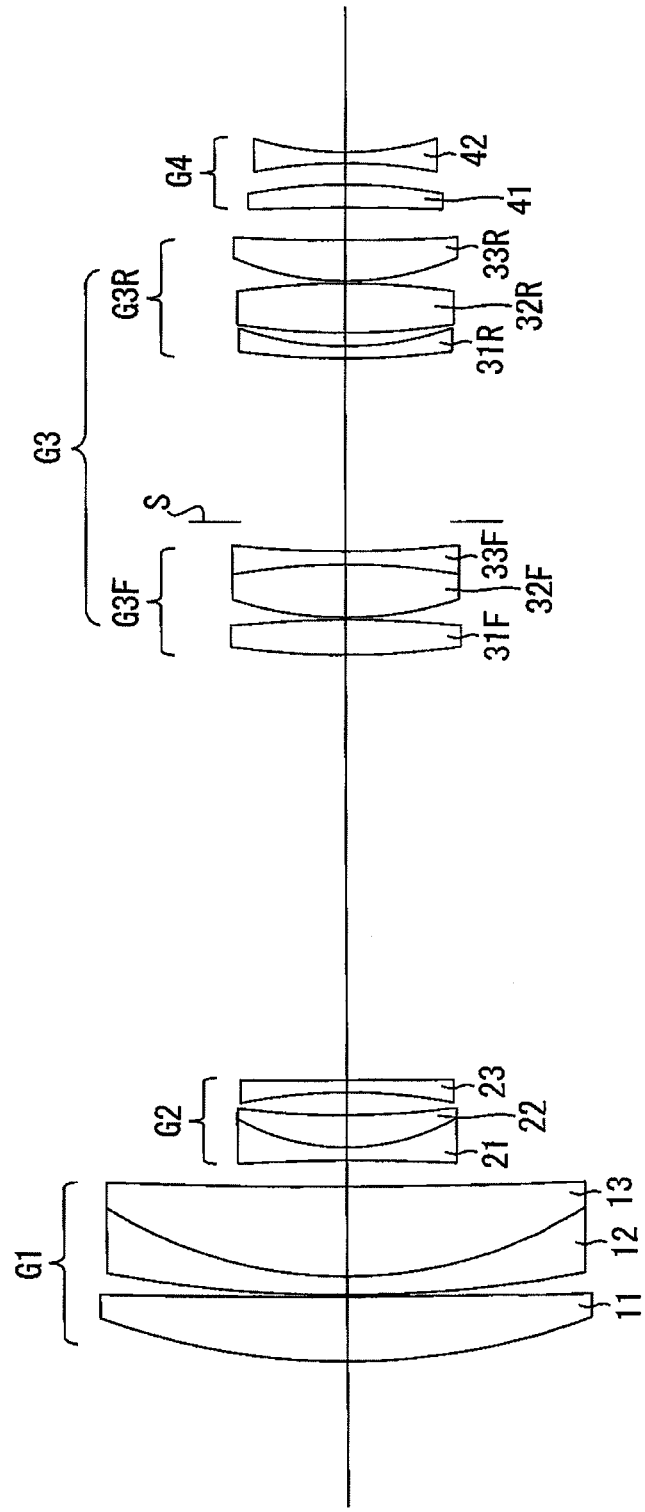
FIG. 1 shows a lens arrangement of a first numerical embodiment of a zoom lens system, according to the present invention, at the short focal length extremity when focused on an object at infinity.
Figure 4:
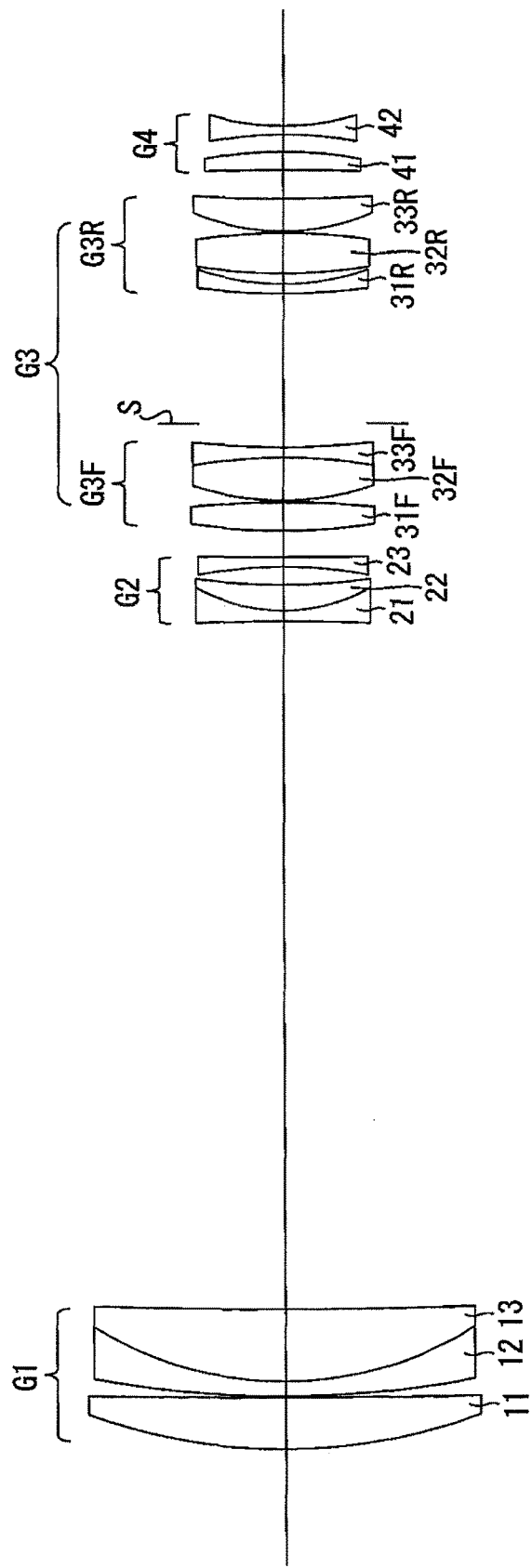
FIG. 4 shows a lens arrangement of the first numerical embodiment of a zoom lens system, according to the present invention, at the long focal length extremity when focused on an object at infinity.

FIGS. 1 through 6D and Tables 1 through 3 disclose a first numerical embodiment of the zoom lens system according to the present invention. FIG. 1 shows a lens arrangement of the zoom lens system at the short focal length extremity when focused on an object at infinity. FIGS. 2A, 2B, 2C and 2D show various aberrations that occurred in the zoom lens system of FIG. 1. FIGS. 3A, 3B, 3C and 3D show lateral aberrations that occurred in the zoom lens system of FIG. 1. FIG. 4 shows a lens arrangement of the zoom lens system at the long focal length extremity when focused on an object at infinity. FIGS. 5A, 5B, 5C and 5D show various aberrations that occurred in the zoom lens system of FIG. 4. FIGS. 6A, 6B, 6C and 6D show lateral aberrations that occurred in the zoom lens system of FIG. 4. Table 1 indicates the surface data. Table 2 indicates various lens system data. Table 3 indicates lens-group data.

The zoom lens system of the first numerical embodiment is configured of a positive first lens group G1, a negative second lens group G2, a positive third lens group (intermediate lens group) G3, and a negative fourth lens group (image-side lens group) G4, in that order from the object side. The third lens group G3 is configured of a positive front sub-lens lens group G3F, an aperture diaphragm S, and a positive rear sub-lens lens group G3R, in that order from the object side.

The first lens group G1 is configured of a positive meniscus lens element 11 having a convex surface on the object side, a negative meniscus lens element 12 having a convex surface on the object side, and a positive meniscus lens element 13 having a convex surface on the object side, in that order from the object side. The negative meniscus lens element 12 and the positive meniscus lens element 13 are cemented to each other.

The second lens group G2 is configured of a biconcave negative lens element 21, a positive meniscus lens element 22 having a convex surface on the object side, a biconcave negative lens element 23, in that order from the object side. The biconcave negative lens element 21 and the positive meniscus lens element 22 are cemented to each other.

The front sub-lens lens group G3F is configured of a biconvex positive lens element 31F, a biconvex positive lens element 32F and a biconcave negative lens element 33F, in that order from the object side. The biconvex positive lens element 32F and the biconcave negative lens element 33F are cemented to each other.

The rear sub-lens lens group G3R is configured of a negative meniscus lens element 31R having a convex surface on the object side, a biconvex positive lens element 32R, and a positive meniscus lens element 33R having a convex surface on the object side, in that order from the object side.

The fourth lens group G4 is configured of a positive meniscus lens element 41 having a convex surface on the image side, and a biconcave negative lens element 42, in that order from the object side.

TABLE 1

SURFACE DATA

| Surf. No. | R | d | N(d) | ν(d) |
|---|---|---|---|---|
| 1 | 66.223 | 5.940 | 1.51633 | 64.14 |
| 2 | 990.033 | 0.150 | | |
| 3 | 119.740 | 1.700 | 1.78590 | 44.20 |
| 4 | 41.913 | 8.270 | 1.48749 | 70.24 |
| 5 | 533.575 | d5 | | |
| 6 | −200.863 | 1.200 | 1.79952 | 42.22 |
| 7 | 20.538 | 2.960 | 1.84666 | 23.78 |
| 8 | 77.368 | 2.101 | | |
| 9 | −49.938 | 1.100 | 1.80400 | 46.58 |
| 10 | 3743.504 | d10 | | |
| 11 | 74.271 | 3.220 | 1.72916 | 54.68 |
| 12 | −101.460 | 0.200 | | |
| 13 | 33.328 | 4.920 | 1.49700 | 81.55 |
| 14 | −58.601 | 1.200 | 1.80610 | 33.27 |
| 15 | 97.682 | 2.700 | | |
| 16 (Diaphragm) | ∞ | 15.026 | | |
| 17 | 78.451 | 1.100 | 1.80610 | 33.27 |
| 18 | 30.401 | 1.242 | | |
| 19 | 67.476 | 4.540 | 1.58913 | 61.13 |
| 20 | −67.476 | 0.200 | | |
| 21 | 26.356 | 3.730 | 1.58313 | 59.37 |
| 22 | 200.093 | d22 | | |
| 23 | −225.082 | 2.110 | 1.78472 | 25.68 |
| 24 | −47.838 | 1.968 | | |
| 25 | −44.791 | 1.000 | 1.69680 | 55.53 |
| 26 | 29.861 | — | | |

Focal length fn of negative meniscus lens element 12: −82.849

Partial dispersion ratio θgFn at short wavelength side of negative meniscus lens element 12: 0.5631

Focal length fRp of positive meniscus lens element 41: 77.012

Focal length fRn of biconcave negative lens element 42: −25.572

TABLE 2

VARIOUS ZOOM LENS SYSTEM DATA
Zoom Ratio: 5.15

| | Short Focal Length Extremity | Intermediate Focal Length | Long Focal Length Extremity |
|---|---|---|---|
| FNO. | 4.60 | 5.14 | 6.48 |
| f | 56.500 | 132.085 | 291.188 |
| W | 14.5 | 6.0 | 2.7 |
| Y | 14.24 | 14.24 | 14.24 |
| fB | 52.474 | 57.967 | 81.814 |
| L | 163.502 | 201.850 | 233.845 |
| d5 | 2.392 | 53.371 | 79.101 |
| d10 | 39.049 | 18.199 | 3.044 |
| d22 | 3.010 | 5.736 | 3.310 |

TABLE 3

LENS GROUP DATA

| Lens Group | 1st Surf. | Focal Length |
|---|---|---|
| 1 | 1 | 166.473 |
| 2 | 6 | −33.874 |
| 3 | 11 | 35.379 |
| 3F | 11 | 50.571 |
| 3R | 17 | 45.787 |
| 4 | 23 | −39.835 |

[Numerical Embodiment 2]

FIGS. 7 through 12D and Tables 4 through 6 disclose a second numerical embodiment of the zoom lens system according to the present invention. FIG. 7 shows a lens arrangement of the zoom lens system at the short focal length extremity when focused on an object at infinity. FIGS. 8A, 8B, 8C and 8D show various aberrations that occurred in the zoom lens system of FIG. 7. FIGS. 9A, 9B, 9C and 9D show lateral aberrations that occurred in the zoom lens system of FIG. 7. FIG. 10 shows a lens arrangement of the zoom lens system at the long focal length extremity when focused on an object at infinity. FIGS. 11A, 11B, 11C and 11D show various aberrations that occurred in the zoom lens system of FIG. 10. FIGS. 12A, 12B, 12C and 12D show lateral aberrations that occurred in the zoom lens system of FIG. 10. Table 4 indicates the surface data. Table 5 indicates various lens system data. Table 6 indicates lens-group data.

The lens arrangement of the second numerical embodiment is the same as that of the first numerical embodiment except for the following feature:

(1) The positive lens element 33R of the rear sub-lens lens group G3R is a biconvex positive lens element.

TABLE 4

SURFACE DATA

| Surf. No. | R | d | N(d) | ν(d) |
|---|---|---|---|---|
| 1 | 65.353 | 5.940 | 1.51633 | 64.14 |
| 2 | 591.562 | 0.150 | | |
| 3 | 103.075 | 1.700 | 1.78590 | 44.20 |
| 4 | 41.348 | 8.270 | 1.48749 | 70.24 |
| 5 | 211.702 | d5 | | |
| 6 | −241.380 | 1.200 | 1.78590 | 44.20 |
| 7 | 17.988 | 2.960 | 1.84666 | 23.78 |
| 8 | 88.074 | 2.101 | | |
| 9 | −51.768 | 1.100 | 1.91082 | 35.25 |
| 10 | 183.198 | d10 | | |
| 11 | 160.717 | 3.220 | 1.72916 | 54.68 |

TABLE 4-continued

SURFACE DATA

| Surf. No. | R | d | N(d) | ν(d) |
|---|---|---|---|---|
| 12 | −90.648 | 0.200 | | |
| 13 | 26.431 | 4.920 | 1.49700 | 81.55 |
| 14 | −41.142 | 1.200 | 1.80610 | 33.27 |
| 15 | 313.760 | 2.700 | | |
| 16 (Diaphragm) | ∞ | 8.933 | | |
| 17 | 62.054 | 1.100 | 1.80610 | 33.27 |
| 18 | 25.205 | 1.242 | | |
| 19 | 109.122 | 4.540 | 1.58913 | 61.13 |
| 20 | −57.553 | 0.200 | | |
| 21 | 24.527 | 3.730 | 1.58313 | 59.37 |
| 22 | −231.862 | d22 | | |
| 23 | −100.601 | 2.110 | 1.84666 | 23.78 |
| 24 | −36.003 | 1.952 | | |
| 25 | −32.813 | 1.000 | 1.75500 | 52.32 |
| 26 | 33.533 | — | | |

Focal length fn of negative meniscus lens element 12: −88.933

Partial dispersion ratio θgFn at short wavelength side of negative meniscus lens element 12: 0.5631

Focal length fRp of positive meniscus lens element 41: 65.246

Focal length fRn of biconcave negative lens element 42: −21.825

TABLE 5

VARIOUS ZOOM LENS SYSTEM DATA
Zoom Ratio: 5.13

| | Short Focal Length Extremity | Intermediate Focal Length | Long Focal Length Extremity |
|---|---|---|---|
| FNO. | 4.50 | 4.79 | 6.27 |
| f | 56.498 | 99.947 | 289.884 |
| W | 14.5 | 8.0 | 2.8 |
| Y | 14.24 | 14.24 | 14.24 |
| fB | 51.996 | 52.274 | 76.272 |
| L | 163.454 | 188.127 | 237.984 |
| d5 | 13.914 | 50.109 | 93.695 |
| d10 | 34.066 | 19.088 | 3.000 |
| d22 | 3.010 | 6.188 | 4.549 |

TABLE 6

LENS GROUP DATA

| Lens Group | 1st Surf. | Focal Length |
|---|---|---|
| 1 | 1 | 183.561 |
| 2 | 6 | −30.635 |
| 3 | 11 | 29.677 |
| 3F | 11 | 45.022 |
| 3R | 17 | 39.852 |
| 4 | 23 | −34.053 |

[Numerical Embodiment 3]

Figure 13:
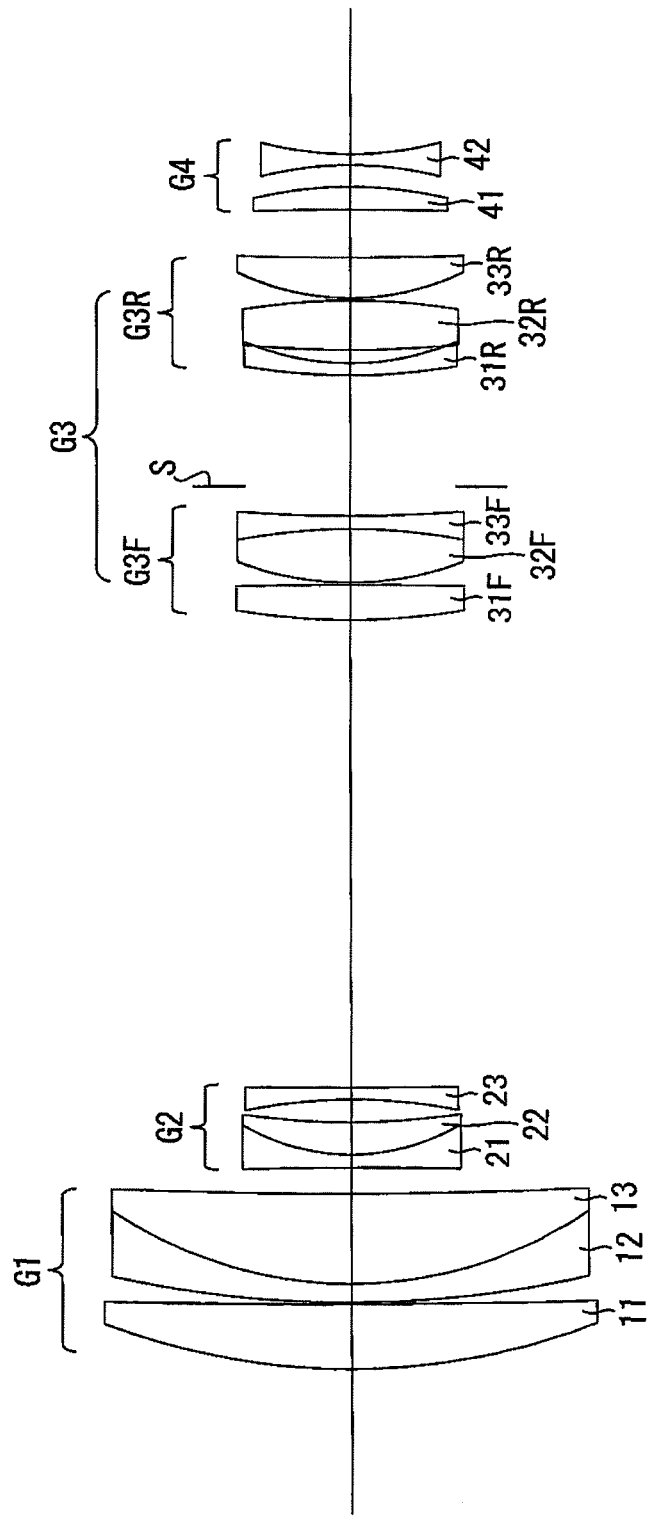
FIG. 13 shows a lens arrangement of a third numerical embodiment of a zoom lens system, according to the present invention, at the short focal length extremity when focused on an object at infinity.
Figure 16:
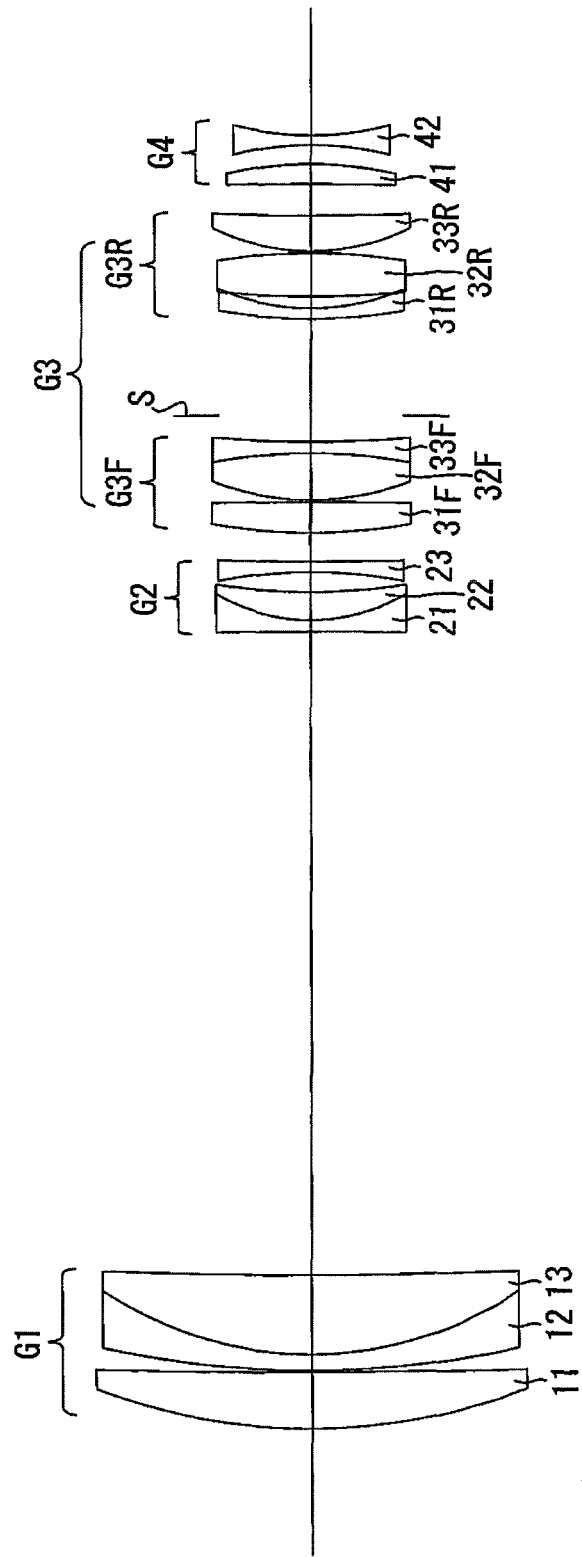
FIG. 16 shows a lens arrangement of the third numerical embodiment of a zoom lens system, according to the present invention, at the long focal length extremity when focused on an object at infinity.
Figures 17A, 17B, 17C, 17D:
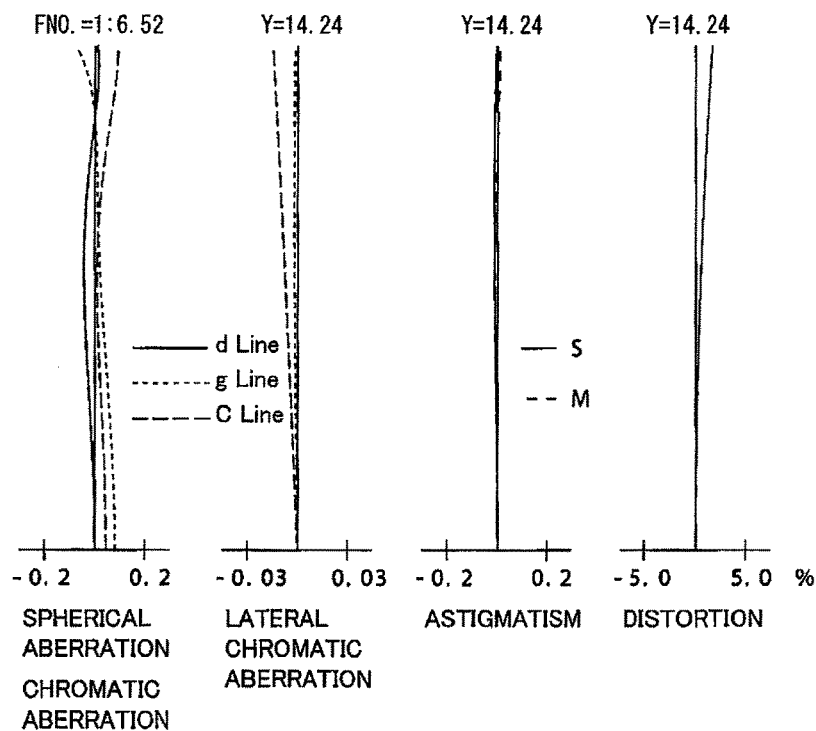
FIGS. 17A, 17B, 17C and 17D show various aberrations that occurred in the zoom lens system of FIG. 16.
Figure 18A:
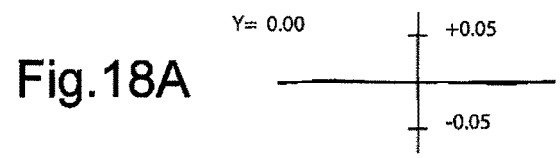
FIGS. 18A, 18B, 18C and 18D show lateral aberrations that occurred in the zoom lens system of FIG. 16.
Figure 18B:
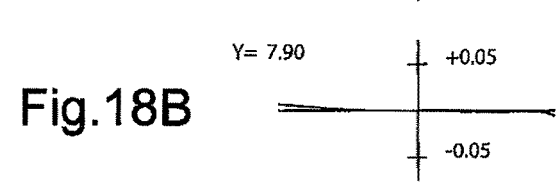
Figure 18C:
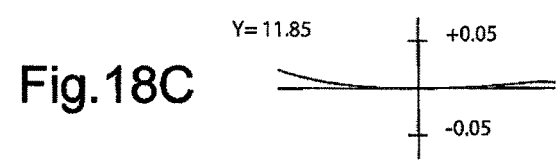
Figure 18D:
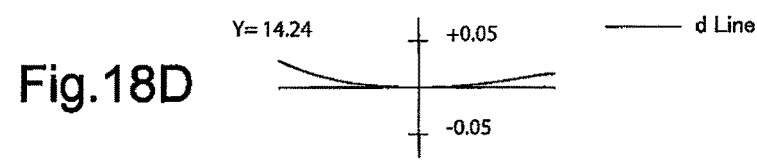

FIGS. 13 through 18D and Tables 7 through 9 disclose a third numerical embodiment of the zoom lens system according to the present invention. FIG. 13 shows a lens arrangement of the zoom lens system at the short focal length extremity when focused on an object at infinity. FIGS. 14A, 14B, 14C and 14D show various aberrations that occurred in the zoom lens system of FIG. 13. FIGS. 15A, 15B, 15C and 15D show lateral aberrations that occurred in the zoom lens system of FIG. 13. FIG. 16 shows a lens arrangement of the zoom lens system at the long focal length extremity when focused on an object at infinity. FIGS. 17A, 17B, 17C and 17D show various aberrations that occurred in the zoom lens system of FIG. 16. FIGS. 18A, 18B, 18C and 18D show lateral aberrations that occurred in the zoom lens system of FIG. 16. Table 7 indicates the surface data. Table 8 indicates various lens system data. Table 9 indicates lens-group data.

The lens arrangement of the third numerical embodiment is the same as that of the first numerical embodiment.

TABLE 7

SURFACE DATA

| Surf. No. | R | d | N(d) | ν(d) |
|---|---|---|---|---|
| 1 | 63.874 | 5.940 | 1.51633 | 64.14 |
| 2 | 875.746 | 0.150 | | |
| 3 | 101.587 | 1.700 | 1.79952 | 42.22 |
| 4 | 39.902 | 8.270 | 1.48749 | 70.24 |
| 5 | 482.084 | d5 | | |
| 6 | −439.858 | 1.200 | 1.79952 | 42.22 |
| 7 | 20.096 | 2.960 | 1.84666 | 23.78 |
| 8 | 68.596 | 2.101 | | |
| 9 | −50.048 | 1.100 | 1.80400 | 46.58 |
| 10 | 970.828 | d10 | | |
| 11 | 62.983 | 3.220 | 1.72916 | 54.68 |
| 12 | −477.061 | 0.200 | | |
| 13 | 29.663 | 4.920 | 1.49700 | 81.55 |
| 14 | −56.142 | 1.200 | 1.80610 | 33.27 |
| 15 | 135.791 | 2.700 | | |
| 16 (Diaphragm) | ∞ | 10.220 | | |
| 17 | 59.144 | 1.100 | 1.80610 | 33.27 |
| 18 | 25.469 | 1.242 | | |
| 19 | 112.437 | 4.540 | 1.58913 | 61.13 |
| 20 | −61.662 | 0.200 | | |
| 21 | 24.180 | 3.730 | 1.58313 | 59.37 |
| 22 | 338.379 | d22 | | |
| 23 | −376.821 | 2.110 | 1.78472 | 25.68 |
| 24 | −38.842 | 1.993 | | |
| 25 | −34.136 | 1.000 | 1.77250 | 49.60 |
| 26 | 32.904 | — | | |

Focal length fn of negative meniscus lens element 12: −83.209

Partial dispersion ratio θgFn at short wavelength side of negative meniscus lens element 12: 0.5672

Focal length fRp of positive meniscus lens element 41: 55.035

Focal length fRn of biconcave negative lens element 42: −21.549

TABLE 8

VARIOUS ZOOM LENS SYSTEM DATA
Zoom Ratio: 5.15

| | Short Focal Length Extremity | Intermediate Focal Length | Long Focal Length Extremity |
|---|---|---|---|
| FNO. | 4.60 | 5.08 | 6.52 |
| f | 56.500 | 131.898 | 291.179 |
| W | 14.5 | 6.0 | 2.8 |
| Y | 14.24 | 14.24 | 14.24 |
| fB | 52.000 | 57.715 | 81.923 |
| L | 163.550 | 195.345 | 217.643 |
| d5 | 2.392 | 47.975 | 67.624 |
| d10 | 42.965 | 22.371 | 3.000 |
| d22 | 4.397 | 5.489 | 3.300 |

TABLE 9

| LENS GROUP DATA | | |
|---|---|---|
| Lens Group | 1st Surf. | Focal Length |
| 1 | 1 | 148.091 |
| 2 | 6 | −34.307 |
| 3 | 11 | 33.764 |
| 3F | 11 | 51.386 |
| 3R | 17 | 47.215 |
| 4 | 23 | −37.837 |

[Numerical Embodiment 4]

Figure 19:
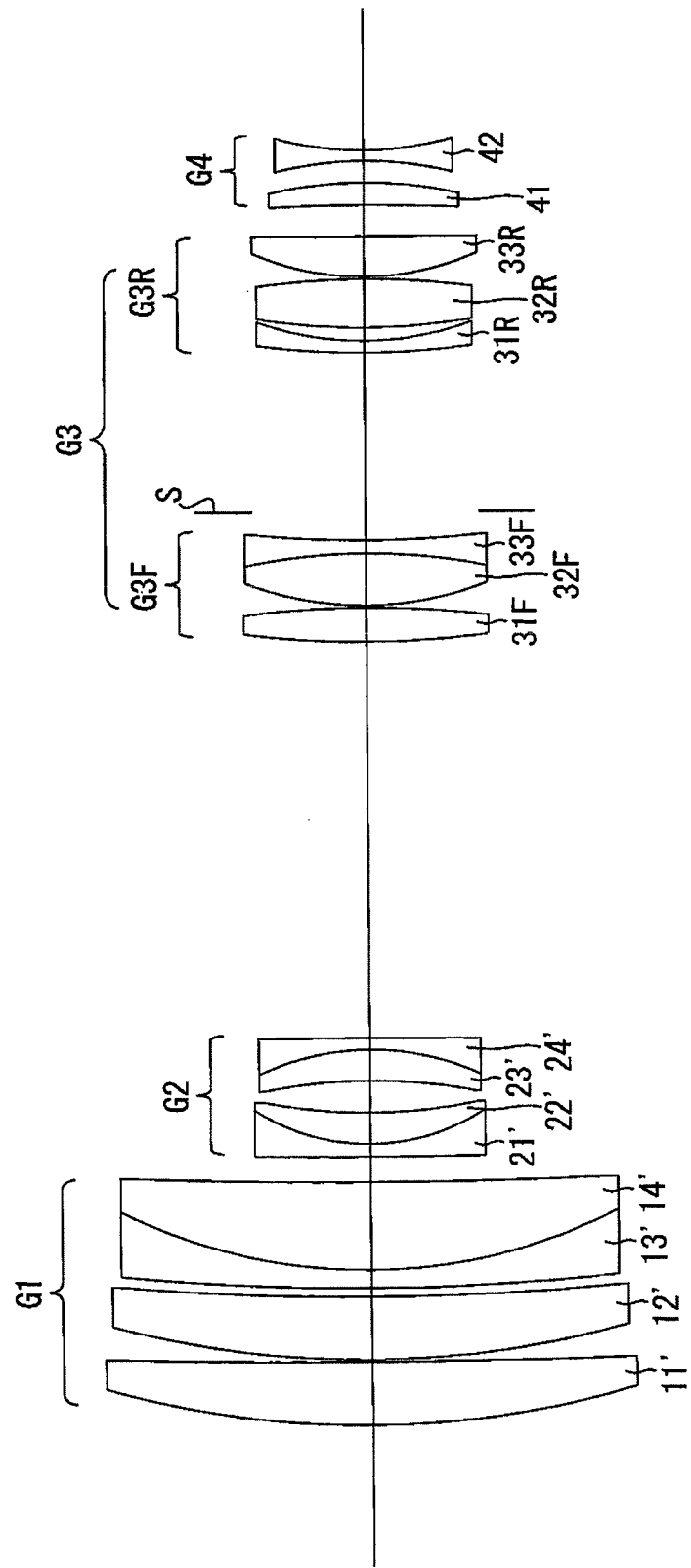
FIG. 19 shows a lens arrangement of a fourth numerical embodiment of a zoom lens system, according to the present invention, at the short focal length extremity when focused on an object at infinity.
Figure 22:
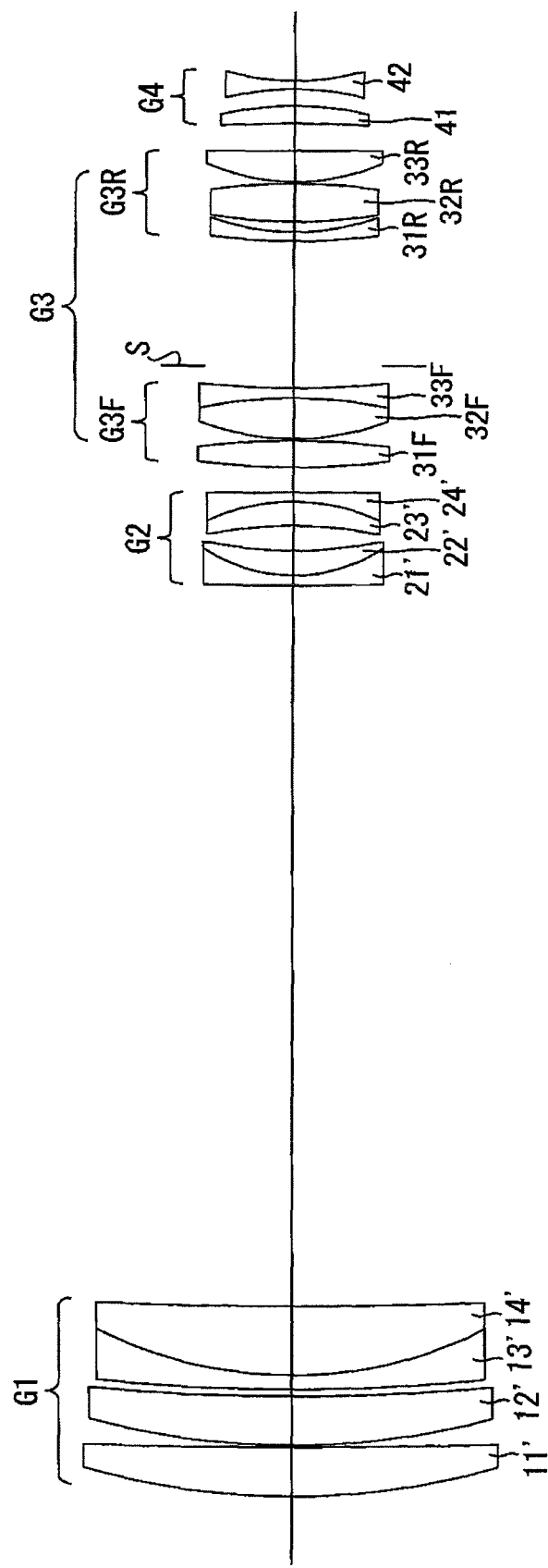
FIG. 22 shows a lens arrangement of the fourth numerical embodiment of a zoom lens system, according to the present invention, at the long focal length extremity when focused on an object at infinity.

FIGS. 19 through 24D and Tables 10 through 12 disclose a fourth numerical embodiment of the zoom lens system according to the present invention. FIG. 19 shows a lens arrangement of the zoom lens system at the short focal length extremity when focused on an object at infinity. FIGS. 20A, 20B, 20C and 20D show various aberrations that occurred in the zoom lens system of FIG. 19. FIGS. 21A, 21B, 21C and 21D show lateral aberrations that occurred in the zoom lens system of FIG. 19. FIG. 22 shows a lens arrangement of the zoom lens system at the long focal length extremity when focused on an object at infinity. FIGS. 23A, 23B, 23C and 23D show various aberrations that occurred in the zoom lens system of FIG. 22. FIGS. 24A, 24B, 24C and 24D show lateral aberrations that occurred in the zoom lens system of FIG. 22. Table 10 indicates the surface data. Table 11 indicates various lens system data. Table 12 indicates lens-group data.

The lens arrangement of the fourth numerical embodiment is the same as that of the first numerical embodiment except for the following features:

(1) The first lens group G1 is configured of a positive meniscus lens element 11' having a convex surface on the object side, a positive meniscus lens element 12' having a convex surface on the object side, a negative meniscus lens element 13' having a convex surface on the object side, and a positive meniscus lens element 14' having a convex surface on the object side, in that order from the object side. The negative meniscus lens element 13' and the positive meniscus lens element 14' are cemented to each other.

(2) The second lens group G2 is configured of a negative meniscus lens element 21' having a convex surface on the object side, a positive meniscus lens element 22' having a convex surface on the object side, a positive meniscus lens element 23' having a convex surface on the image side, and a negative meniscus lens element 24' having a convex surface on the image side, in that order from the object side. The negative meniscus lens element 21' and the positive meniscus lens element 22' are cemented to each other. The positive meniscus lens element 23' and the negative meniscus lens element 24' are cemented to each other.

TABLE 10

| SURFACE DATA | | | | |
|---|---|---|---|---|
| Surf. No. | R | d | N(d) | ν(d) |
| 1 | 90.731 | 5.940 | 1.51633 | 64.14 |
| 2 | 835.644 | 0.200 | | |
| 3 | 93.441 | 5.900 | 1.49700 | 81.55 |
| 4 | 264.691 | 0.834 | | |
| 5 | 231.354 | 1.700 | 1.78590 | 44.20 |
| 6 | 52.840 | 8.270 | 1.48749 | 70.24 |
| 7 | 557.551 | d7 | | |
| 8 | 511.658 | 1.200 | 1.77250 | 49.60 |
| 9 | 19.983 | 2.960 | 1.84666 | 23.78 |
| 10 | 50.884 | 3.000 | | |
| 11 | −51.918 | 2.900 | 1.80518 | 25.43 |
| 12 | −24.951 | 1.100 | 1.91650 | 31.60 |
| 13 | −1369.725 | d13 | | |
| 14 | 89.562 | 3.220 | 1.72916 | 54.68 |
| 15 | −92.318 | 0.200 | | |
| 16 | 31.986 | 4.920 | 1.49700 | 81.55 |
| 17 | −55.705 | 1.200 | 1.80610 | 33.27 |
| 18 | 110.260 | 2.700 | | |
| 19 (Diaphragm) | ∞ | 15.000 | | |
| 20 | 77.370 | 1.100 | 1.85026 | 32.27 |
| 21 | 30.463 | 1.242 | | |
| 22 | 64.484 | 4.540 | 1.58913 | 61.13 |
| 23 | −75.203 | 0.200 | | |
| 24 | 26.635 | 3.730 | 1.58313 | 59.37 |
| 25 | 2317.443 | d25 | | |
| 26 | −169.009 | 2.110 | 1.78472 | 25.68 |
| 27 | −39.960 | 2.028 | | |
| 28 | −34.456 | 1.000 | 1.69680 | 55.53 |
| 29 | 31.788 | — | | |

Focal length fn of negative meniscus lens element 13': −87.503

Partial dispersion ratio θgFn at short wavelength side of negative meniscus lens element 13': 0.5631

Focal length fRp of positive meniscus lens element 41: 66.214

Focal length fRn of biconcave negative lens element 42: −23.583

TABLE 11

| VARIOUS ZOOM LENS SYSTEM DATA | | | |
|---|---|---|---|
| Zoom Ratio: 5.12 | | | |
| | Short Focal Length Extremity | Intermediate Focal Length | Long Focal Length Extremity |
| FNO. | 4.12 | 4.30 | 5.75 |
| f | 56.487 | 100.026 | 289.281 |
| W | 14.5 | 8.0 | 2.8 |
| Y | 14.24 | 14.24 | 14.24 |
| fB | 52.027 | 51.131 | 67.820 |
| L | 171.873 | 194.766 | 237.999 |
| d7 | 2.392 | 38.962 | 86.683 |
| d13 | 37.250 | 20.522 | 3.000 |
| d25 | 3.010 | 6.957 | 3.302 |

TABLE 12

| LENS GROUP DATA | | |
|---|---|---|
| Lens Group | 1st Surf. | Focal Length |
| 1 | 1 | 174.680 |
| 2 | 8 | −32.060 |
| 3 | 14 | 34.664 |
| 3F | 14 | 50.014 |
| 3R | 20 | 43.359 |
| 4 | 26 | −38.402 |

[Numerical Embodiment 5]

Figure 25:
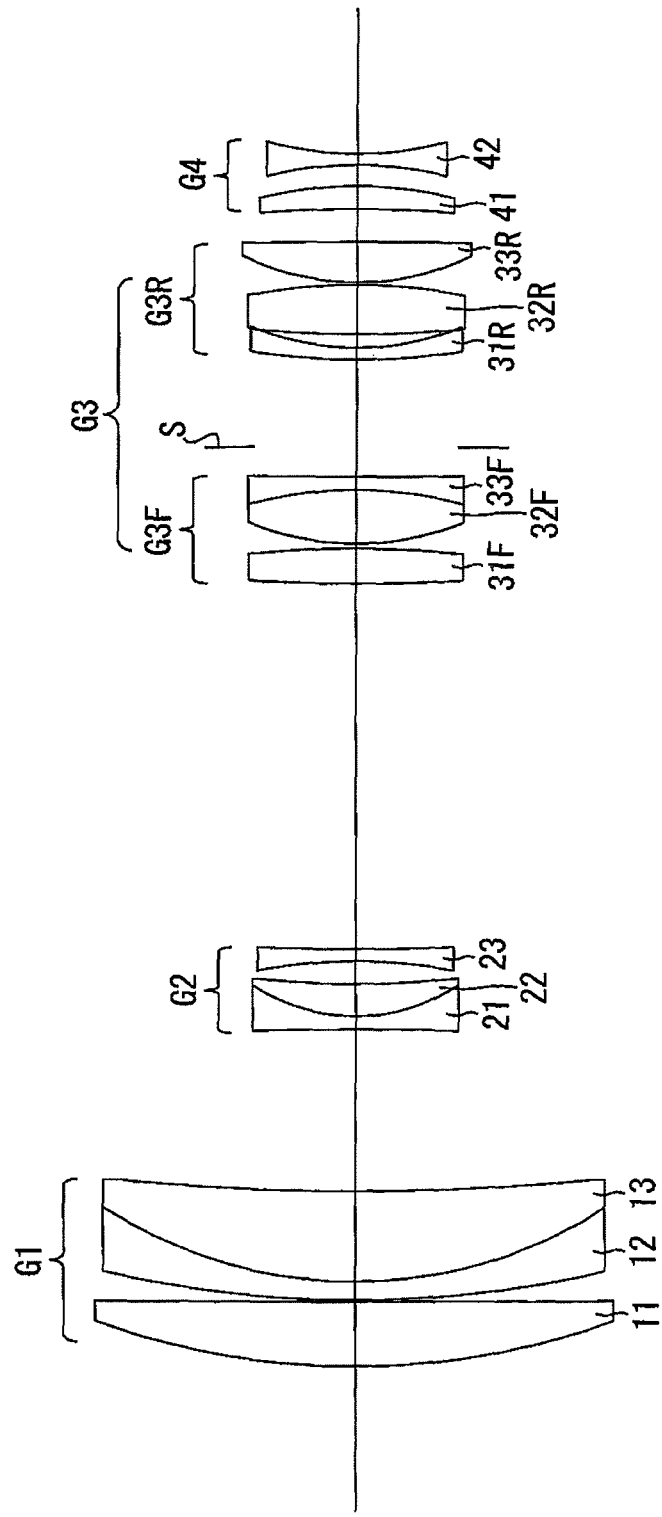
FIG. 25 shows a lens arrangement of a fifth numerical embodiment of a zoom lens system, according to the present invention, at the short focal length extremity when focused on an object at infinity.
Figure 28:
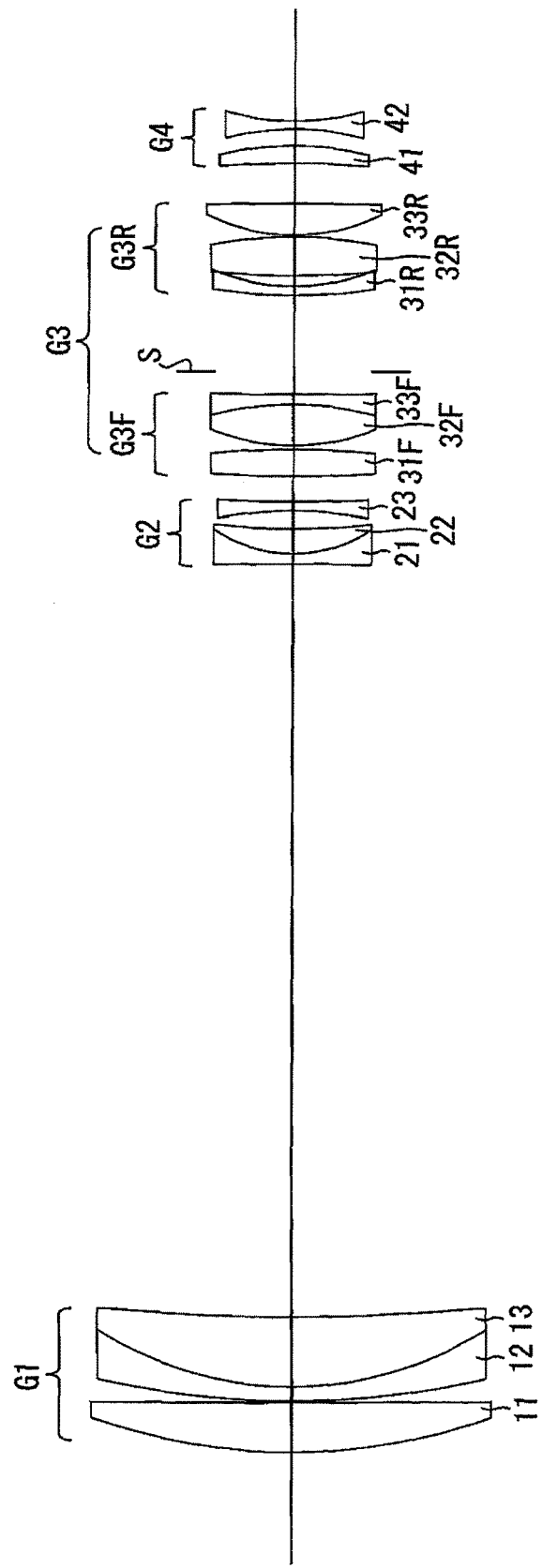
FIG. 28 shows a lens arrangement of the fifth numerical embodiment of a zoom lens system, according to the present invention, at the long focal length extremity when focused on an object at infinity.
Figures 29A, 29B, 29C, 29D:
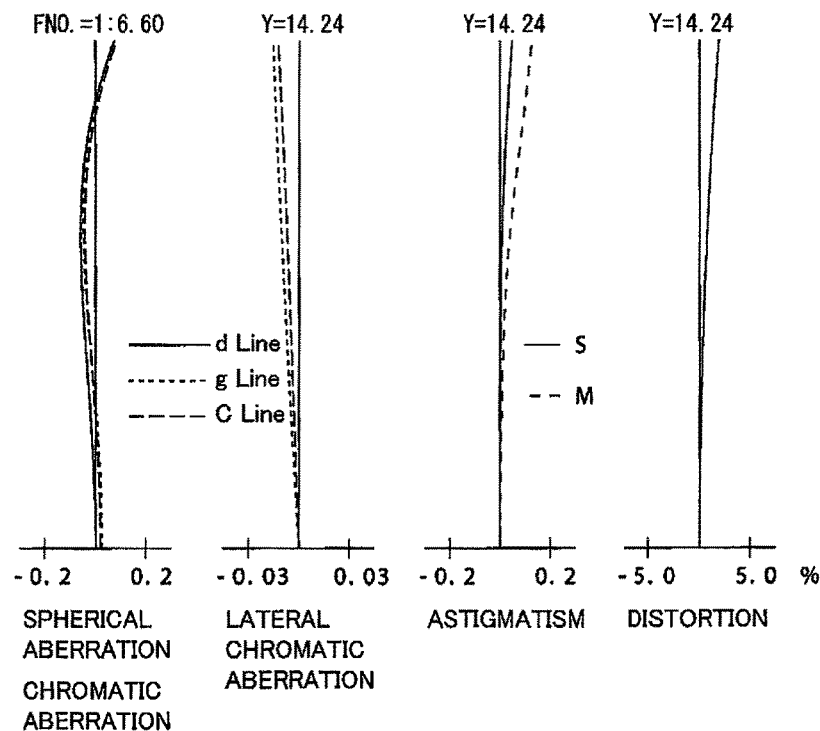
FIGS. 29A, 29B, 29C and 29D show various aberrations that occurred in the zoom lens system of FIG. 28.
Figure 30A:
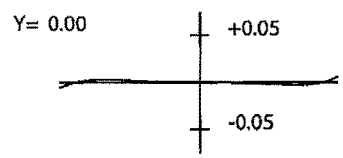
FIGS. 30A, 30B, 30C and 30D show lateral aberrations that occurred in the zoom lens system of FIG. 28.
Figure 30B:
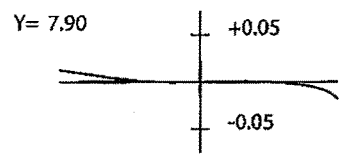
Figure 30C:
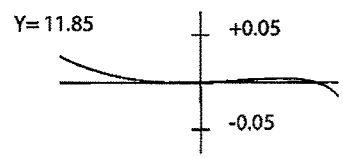
Figure 30D:
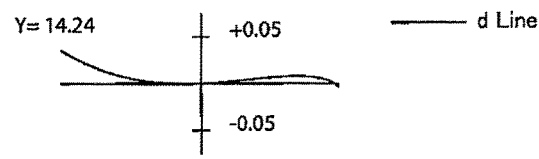

FIGS. 25 through 30D and Tables 13 through 15 disclose a fifth numerical embodiment of the zoom lens system according to the present invention. FIG. 25 shows a lens arrangement of the zoom lens system at the short focal length extremity when focused on an object at infinity. FIGS. 26A, 26B, 26C and 26D show various aberrations that occurred in the zoom lens system of FIG. 25. FIGS. 27A, 27B, 27C and 27D show lateral aberrations that occurred in the zoom lens system of FIG. 25. FIG. 28 shows a lens arrangement of the zoom lens system at the long focal length extremity when focused on an object at infinity. FIGS. 29A, 29B, 29C and 29D show various aberrations that occurred in the zoom lens system of FIG. 28. FIGS. 30A, 30B, 30C and 30D show lateral aberrations that occurred in the zoom lens system of FIG. 28. Table 13 indicates the surface data. Table 14 indicates various lens system data. Table 15 indicates lens-group data.

The lens arrangement of the fifth numerical embodiment is the same as that of the first numerical embodiment except for the following feature:

(1) The positive lens element 33R of the rear sub-lens lens group G3R is a biconvex positive lens element.

TABLE 13

SURFACE DATA

| Surf. No. | R | d | N(d) | ν(d) |
|---|---|---|---|---|
| 1 | 71.045 | 5.940 | 1.48749 | 70.24 |
| 2 | 3575.886 | 0.150 | | |
| 3 | 103.355 | 1.700 | 1.78590 | 44.20 |
| 4 | 43.306 | 8.270 | 1.48749 | 70.24 |
| 5 | 230.704 | d5 | | |
| 6 | −331.517 | 1.200 | 1.78590 | 44.20 |
| 7 | 17.191 | 2.960 | 1.84666 | 23.78 |
| 8 | 81.364 | 2.101 | | |
| 9 | −47.539 | 1.100 | 1.91082 | 35.25 |
| 10 | 203.654 | d10 | | |
| 11 | 166.532 | 3.220 | 1.72916 | 54.68 |
| 12 | −97.847 | 0.400 | | |
| 13 | 26.367 | 4.920 | 1.49700 | 81.55 |
| 14 | −38.149 | 1.200 | 1.80610 | 33.27 |
| 15 | 650.959 | 2.700 | | |
| 16 (Diaphragm) | ∞ | d16 | | |
| 17 | 65.122 | 1.100 | 1.80610 | 33.27 |
| 18 | 25.718 | 1.242 | | |
| 19 | 105.740 | 4.540 | 1.58913 | 61.13 |
| 20 | −50.907 | 0.200 | | |
| 21 | 24.182 | 3.730 | 1.58313 | 59.37 |
| 22 | −485.636 | d22 | | |
| 23 | −115.093 | 2.110 | 1.84666 | 23.78 |
| 24 | −37.242 | 1.952 | | |
| 25 | −33.786 | 1.000 | 1.75500 | 52.32 |
| 26 | 31.190 | — | | |

Focal length fn of negative meniscus lens element 12: −96.041

Partial dispersion ratio θgFn at short wavelength side of negative meniscus lens element 12: 0.5631

Focal length fRp of positive meniscus lens element 41: 64.230

Focal length fRn of biconcave negative lens element 42: −21.334

TABLE 14

VARIOUS ZOOM LENS SYSTEM DATA
Zoom Ratio: 5.17

| | Short Focal Length Extremity | Intermediate Focal Length | Long Focal Length Extremity |
|---|---|---|---|
| FNO. | 4.50 | 5.15 | 6.60 |
| f | 55.918 | 99.787 | 288.865 |
| W | 14.6 | 8.0 | 2.8 |
| Y | 14.24 | 14.24 | 14.24 |
| fB | 52.000 | 62.328 | 79.875 |
| L | 163.331 | 199.249 | 238.001 |
| d5 | 14.862 | 50.781 | 89.532 |
| d10 | 33.680 | 24.407 | 3.000 |
| d16 | 8.044 | 6.911 | 9.036 |
| d22 | 3.010 | 3.088 | 4.823 |

TABLE 15

LENS GROUP DATA

| Lens Group | 1st Surf. | Focal Length |
|---|---|---|
| 1 | 1 | 179.265 |
| 2 | 6 | −29.948 |
| 3F | 11 | 45.234 |
| 3R | 17 | 38.896 |
| 4 | 23 | −33.281 |

[Numerical Embodiment 6]

Figure 31:
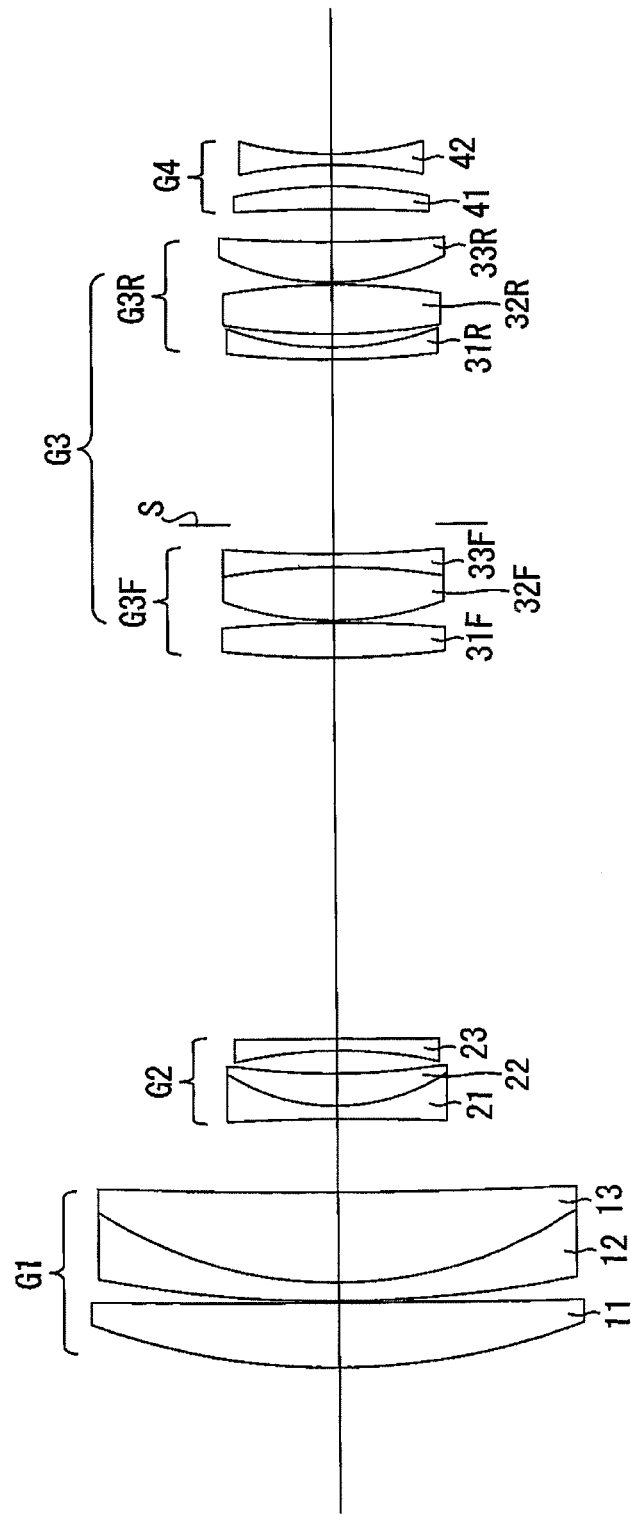
FIG. 31 shows a lens arrangement of a sixth numerical embodiment of a zoom lens system, according to the present invention, at the short focal length extremity when focused on an object at infinity.
Figure 34:
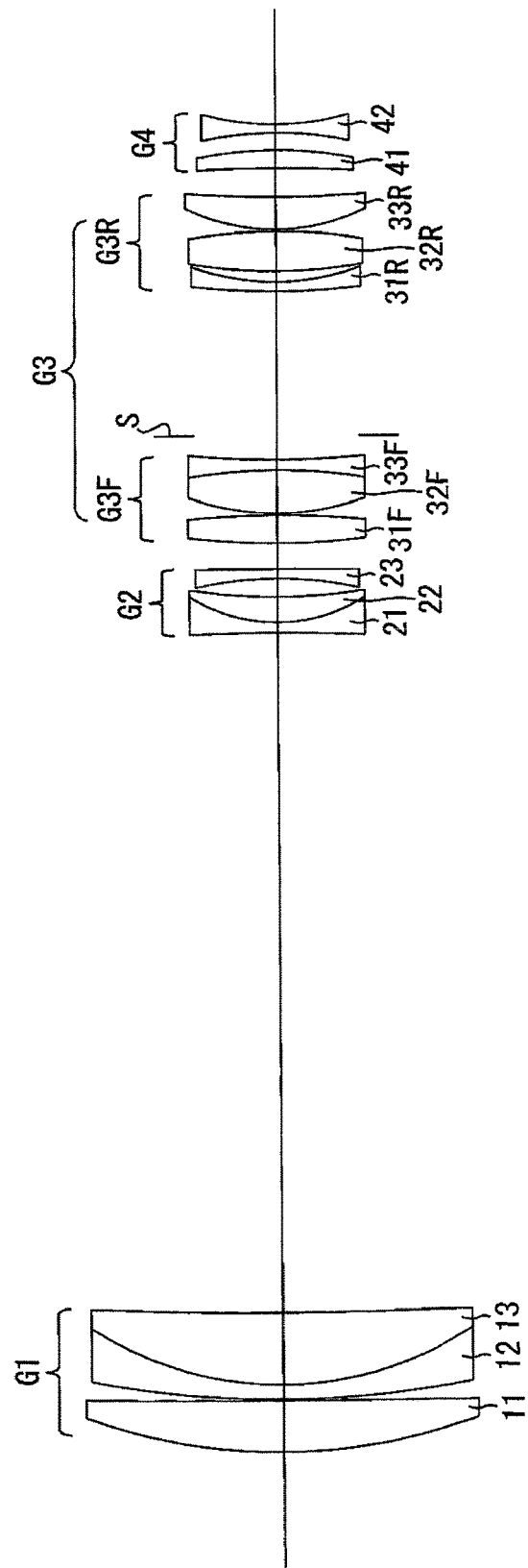
FIG. 34 shows a lens arrangement of the sixth numerical embodiment of a zoom lens system, according to the present invention, at the long focal length extremity when focused on an object at infinity.

FIGS. 31 through 36D and Tables 16 through 18 disclose a sixth numerical embodiment of the zoom lens system according to the present invention. FIG. 31 shows a lens arrangement of the zoom lens system at the short focal length extremity when focused on an object at infinity. FIGS. 32A, 32B, 32C and 32D show various aberrations that occurred in the zoom lens system of FIG. 31. FIGS. 33A, 33B, 33C and 33D show lateral aberrations that occurred in the zoom lens system of FIG. 31. FIG. 34 shows a lens arrangement of the zoom lens system at the long focal length extremity when focused on an object at infinity. FIGS. 35A, 35B, 35C and 35D show various aberrations that occurred in the zoom lens system of FIG. 34. FIGS. 36A, 36B, 36C and 36D show lateral aberrations that occurred in the zoom lens system of FIG. 34. Table 16 indicates the surface data. Table 17 indicates various lens system data. Table 18 indicates lens-group data.

The lens arrangement of the sixth numerical embodiment is the same as that of the first numerical embodiment except for the following feature:

(1) The negative lens element 23 of the second lens group G2 is a negative meniscus lens element having a convex surface on the image side

TABLE 16

SURFACE DATA

| Surf. No. | R | d | N(d) | ν(d) |
|---|---|---|---|---|
| 1 | 65.942 | 5.940 | 1.51633 | 64.14 |
| 2 | 1665.559 | 0.150 | | |
| 3 | 115.444 | 1.700 | 1.78590 | 44.20 |
| 4 | 40.603 | 8.270 | 1.48749 | 70.24 |
| 5 | 503.028 | d5 | | |
| 6 | −232.556 | 1.200 | 1.79952 | 42.22 |
| 7 | 18.688 | 2.960 | 1.84666 | 23.78 |
| 8 | 65.405 | 2.101 | | |
| 9 | −43.080 | 1.100 | 1.80400 | 46.58 |
| 10 | −930.355 | d10 | | |
| 11 | 86.168 | 3.220 | 1.72916 | 54.68 |
| 12 | −110.182 | 0.200 | | |
| 13 | 30.070 | 4.920 | 1.49700 | 81.55 |
| 14 | −60.568 | 1.200 | 1.80610 | 33.27 |
| 15 | 112.705 | 2.700 | | |
| 16 (Diaphragm) | ∞ | d16 | | |
| 17 | 84.228 | 1.100 | 1.80610 | 33.27 |
| 18 | 28.175 | 1.242 | | |
| 19 | 60.776 | 4.540 | 1.58913 | 61.13 |
| 20 | −58.331 | 0.200 | | |
| 21 | 23.840 | 3.730 | 1.58313 | 59.37 |
| 22 | 139.574 | d22 | | |
| 23 | −162.939 | 2.110 | 1.78472 | 25.68 |
| 24 | −43.808 | 1.965 | | |
| 25 | −40.870 | 1.000 | 1.69680 | 55.53 |
| 26 | 31.693 | — | | |

Focal length fn of negative meniscus lens element 12: −80.499

Partial dispersion ratio θgFn at short wavelength side of negative meniscus lens element 12: 0.5631

Focal length fRp of positive meniscus lens element 41: 75.765

Focal length fRn of biconcave negative lens element 42: −25.474

TABLE 17

VARIOUS ZOOM LENS SYSTEM DATA
Zoom Ratio: 5.15

|  | Short Focal Length Extremity | Intermediate Focal Length | Long Focal Length Extremity |
|---|---|---|---|
| FNO. | 4.60 | 5.60 | 6.59 |
| f | 56.500 | 128.147 | 291.184 |
| W | 14.5 | 6.2 | 2.7 |
| Y | 14.24 | 14.24 | 14.24 |
| fB | 52.000 | 68.127 | 82.210 |
| L | 163.475 | 207.429 | 234.943 |
| d5 | 6.742 | 50.696 | 78.210 |
| d10 | 35.022 | 20.601 | 3.000 |
| d16 | 15.153 | 13.435 | 16.675 |
| d22 | 3.010 | 3.022 | 3.300 |

TABLE 18

LENS GROUP DATA

| Lens Group | 1st Surf. | Focal Length |
|---|---|---|
| 1 | 1 | 160.852 |
| 2 | 6 | −30.988 |
| 3F | 11 | 48.659 |
| 3R | 17 | 43.573 |
| 4 | 23 | −39.854 |

[Numerical Embodiment 7]

Figure 37:
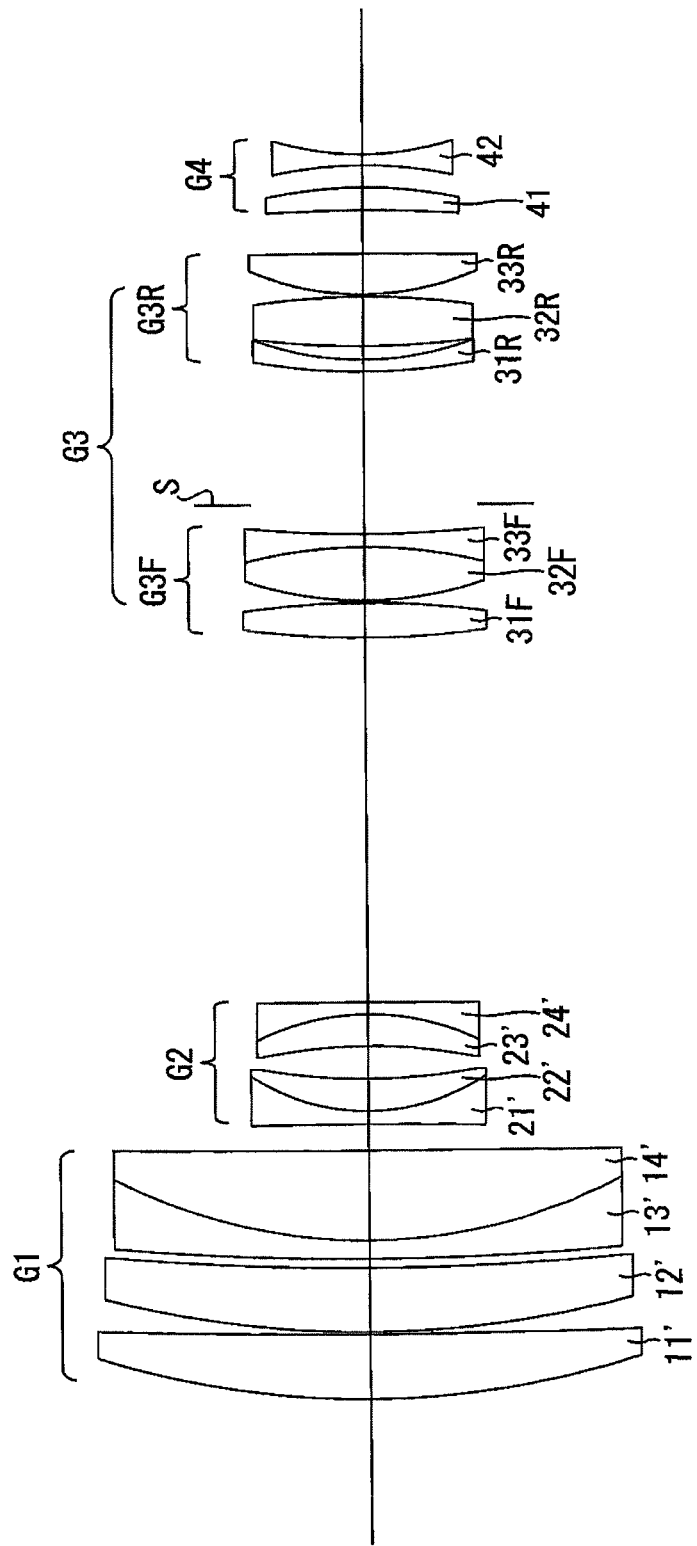
FIG. 37 shows a lens arrangement of a seventh numerical embodiment of a zoom lens system, according to the present invention, at the short focal length extremity when focused on an object at infinity.
Figure 40:
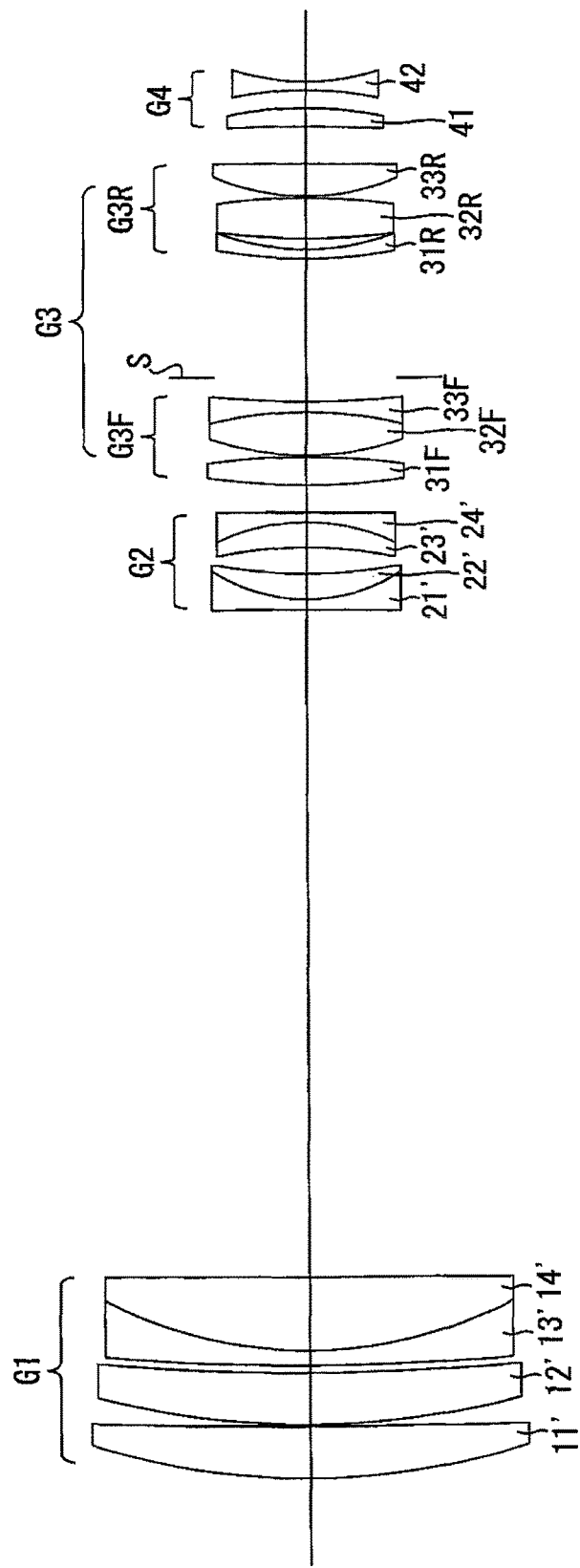
FIG. 40 shows a lens arrangement of the seventh numerical embodiment of a zoom lens system, according to the present invention, at the long focal length extremity when focused on an object at infinity.

FIGS. 37 through 42D and Tables 19 through 21 disclose a seventh numerical embodiment of the zoom lens system according to the present invention. FIG. 37 shows a lens arrangement of the zoom lens system at the short focal length extremity when focused on an object at infinity. FIGS. 38A, 38B, 38C and 38D show various aberrations that occurred in the zoom lens system of FIG. 37. FIGS. 39A, 39B, 39C and 39D show lateral aberrations that occurred in the zoom lens system of FIG. 37. FIG. 40 shows a lens arrangement of the zoom lens system at the long focal length extremity when focused on an object at infinity. FIGS. 41A, 41B, 41C and 41D show various aberrations that occurred in the zoom lens system of FIG. 40. FIGS. 42A, 42B, 42C and 42D show lateral aberrations that occurred in the zoom lens system of FIG. 40. Table 19 indicates the surface data. Table 20 indicates various lens system data. Table 21 indicates lens-group data.

The lens arrangement of the seventh numerical embodiment is the same as that of the first numerical embodiment except for the following features:

(1) The first lens group G1 is configured of positive meniscus lens element 11' having a convex surface on the object side, a positive meniscus lens element 12' having a convex surface on the object side, a negative meniscus lens element 13' having a convex surface on the object side, and a positive meniscus lens element 14' having a convex surface on the object side, in that order from the object side. The negative meniscus lens element 13' and the positive meniscus lens element 14' are cemented to each other.

(2) The second lens group G2 is configured of a biconcave negative lens element 21', a positive meniscus lens element 22' having convex surface on the object side, a positive meniscus lens element 23' having a convex surface on the image side, and a negative meniscus lens element 24' having a convex surface on the image side, in that order from the object side. The biconcave negative lens element 21' and the positive meniscus lens element 22' are cemented to each other. The positive meniscus lens element 23' and the negative meniscus lens element 24' are cemented to each other.

(3) The positive lens element 33R of the rear sub-lens lens group G3R is a biconvex positive lens element.

TABLE 19

SURFACE DATA

| Surf. No. | R | d | N(d) | ν(d) |
|---|---|---|---|---|
| 1 | 83.019 | 5.940 | 1.51633 | 64.14 |
| 2 | 759.176 | 0.200 | | |
| 3 | 96.073 | 5.900 | 1.49700 | 81.55 |
| 4 | 263.439 | 0.834 | | |
| 5 | 265.947 | 1.700 | 1.78590 | 44.20 |
| 6 | 51.281 | 8.270 | 1.48749 | 70.24 |
| 7 | 2486.975 | d7 | | |
| 8 | −609.467 | 1.200 | 1.77250 | 49.60 |
| 9 | 20.053 | 2.960 | 1.84666 | 23.78 |
| 10 | 58.046 | 3.000 | | |
| 11 | −48.533 | 2.900 | 1.80518 | 25.43 |
| 12 | −23.544 | 1.100 | 1.91650 | 31.60 |
| 13 | −1119.010 | d13 | | |
| 14 | 84.036 | 3.220 | 1.72916 | 54.68 |
| 15 | −81.719 | 0.200 | | |
| 16 | 35.226 | 4.920 | 1.49700 | 81.55 |
| 17 | −46.205 | 1.200 | 1.80610 | 33.27 |
| 18 | 116.068 | 2.700 | | |
| 19 (Diaphragm) | ∞ | d19 | | |
| 20 | 57.476 | 1.100 | 1.85026 | 32.27 |
| 21 | 29.873 | 1.242 | | |
| 22 | 83.008 | 4.540 | 1.58913 | 61.13 |
| 23 | −72.432 | 0.200 | | |
| 24 | 26.999 | 3.730 | 1.58313 | 59.37 |
| 25 | −581.710 | d25 | | |
| 26 | −163.715 | 2.110 | 1.78472 | 25.68 |
| 27 | −43.020 | 2.028 | | |
| 28 | −40.554 | 1.000 | 1.69680 | 55.53 |
| 29 | 28.413 | — | | |

Focal length fn of negative meniscus lens element 13': −81.123

Partial dispersion ratio θgFn at short wavelength side of negative meniscus lens element 13': 0.5631

Focal length fRp of positive meniscus lens element 41: 73.795

Focal length fRn of biconcave negative lens element 42: −23.836

TABLE 20

VARIOUS ZOOM LENS SYSTEM DATA
Zoom Ratio: 5.24

|  | Short Focal Length Extremity | Intermediate Focal Length | Long Focal Length Extremity |
|---|---|---|---|
| FNO. | 4.12 | 4.77 | 5.85 |
| f | 55.555 | 100.445 | 291.199 |
| W | 14.8 | 8.0 | 2.7 |
| Y | 14.24 | 14.24 | 14.24 |
| fB | 52.000 | 65.617 | 80.754 |
| L | 166.321 | 201.011 | 240.057 |
| d7 | 2.427 | 37.118 | 76.164 |
| d13 | 33.497 | 24.699 | 3.061 |
| d19 | 12.239 | 7.965 | 13.630 |
| d25 | 3.963 | 3.418 | 4.254 |

TABLE 21

LENS GROUP DATA

| Lens Group | 1st Surf. | Focal Length |
|---|---|---|
| 1 | 1 | 164.502 |
| 2 | 8 | −29.889 |
| 3F | 14 | 51.442 |
| 3R | 20 | 39.692 |
| 4 | 26 | −36.641 |

[Numerical Embodiment 8]

Figure 43:
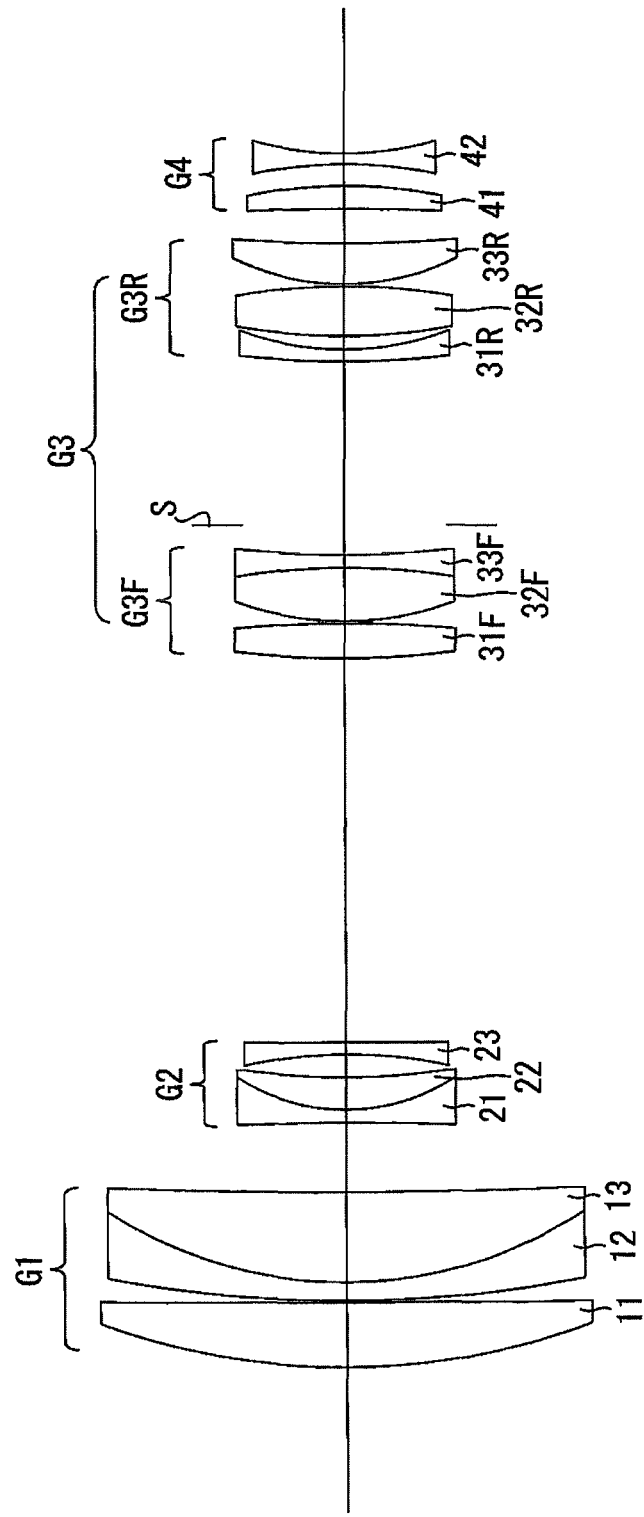
FIG. 43 shows a lens arrangement of an eighth numerical embodiment of a zoom lens system, according to the present invention, at the short focal length extremity when focused on an object at infinity.
Figure 46:
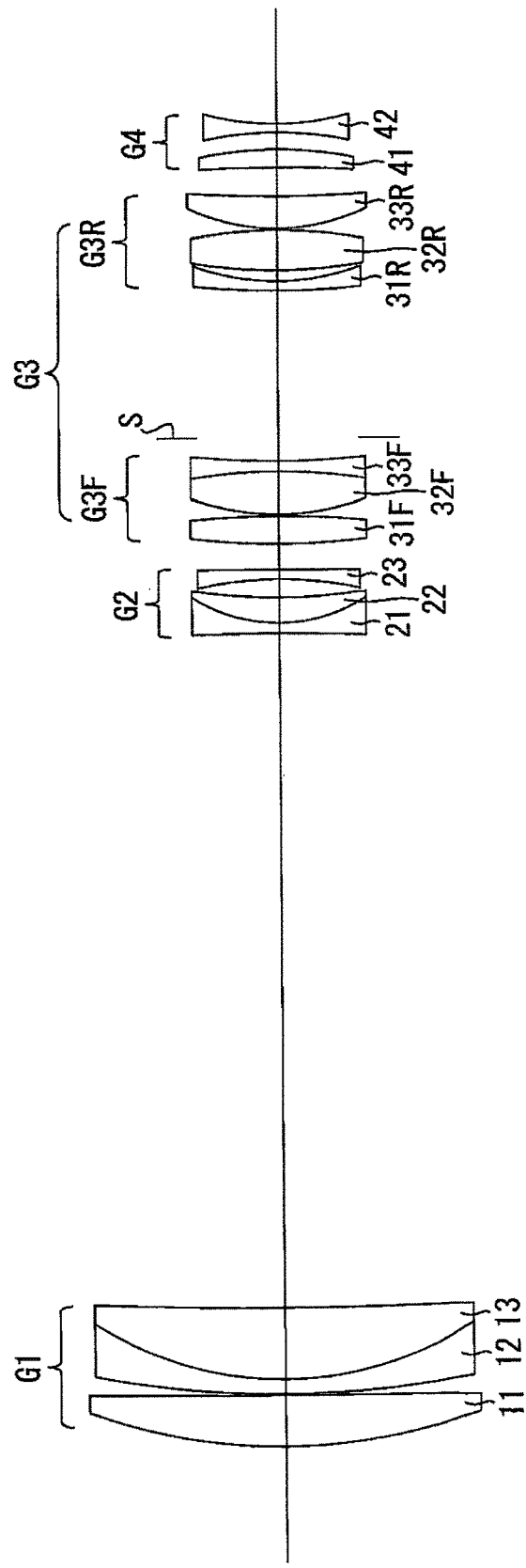
FIG. 46 shows a lens arrangement of the eighth numerical embodiment of a zoom lens system, according to the present invention, at the long focal length extremity when focused on an object at infinity.

FIGS. 43 through 48D and Tables 22 through 24 disclose an eighth numerical embodiment of the zoom lens system according to the present invention. FIG. 43 shows a lens arrangement of the zoom lens system at the short focal length extremity when focused on an object at infinity. FIGS. 44A, 44B, 44C and 44D show various aberrations that occurred in the zoom lens system of FIG. 43. FIGS. 45A, 45B, 45C and 45D show lateral aberrations that occurred in the zoom lens system of FIG. 43. FIG. 46 shows a lens arrangement of the zoom lens system at the long focal length extremity when focused on an object at infinity. FIGS. 47A, 47B, 47C and 47D show various aberrations that occurred in the zoom lens system of FIG. 46. FIGS. 48A, 48B, 48C and 48D show lateral aberrations that occurred in the zoom lens system of FIG. 46. Table 22 indicates the surface data. Table 23 indicates various lens system data. Table 24 indicates lens-group data.

The lens arrangement of the eighth numerical embodiment is the same as that of the sixth numerical embodiment.

TABLE 22

SURFACE DATA

| Surf. No. | R | d | N(d) | ν(d) |
|---|---|---|---|---|
| 1 | 66.185 | 5.940 | 1.51633 | 64.14 |
| 2 | 1830.880 | 0.150 | | |
| 3 | 115.982 | 1.700 | 1.78590 | 44.20 |
| 4 | 40.698 | 8.270 | 1.48749 | 70.24 |
| 5 | 518.618 | d5 | | |
| 6 | −258.147 | 1.200 | 1.79952 | 42.20 |
| 7 | 18.696 | 2.960 | 1.84666 | 23.78 |
| 8 | 66.301 | 2.101 | | |
| 9 | −43.026 | 1.100 | 1.80400 | 46.58 |
| 10 | −1304.849 | d10 | | |
| 11 | 84.443 | 3.220 | 1.72916 | 54.68 |
| 12 | −105.929 | 0.200 | | |
| 13 | 29.495 | 4.920 | 1.49700 | 81.55 |
| 14 | −62.708 | 1.200 | 1.80610 | 33.27 |
| 15 | 95.293 | 2.700 | | |
| 16 (Diaphragm) | ∞ | d16 | | |
| 17 | 94.317 | 1.100 | 1.80610 | 33.27 |
| 18 | 28.435 | 1.242 | | |
| 19 | 59.789 | 4.540 | 1.58913 | 61.13 |
| 20 | −57.035 | 0.200 | | |
| 21 | 23.908 | 3.730 | 1.58313 | 59.37 |
| 22 | 146.952 | d22 | | |
| 23 | −174.932 | 2.110 | 1.78472 | 25.68 |
| 24 | −43.449 | 1.978 | | |
| 25 | −39.978 | 1.000 | 1.69680 | 55.53 |
| 26 | 32.076 | — | | |

Focal length fn of negative meniscus lens element 12: −80.583

Partial dispersion ratio θgFn at short wavelength side of negative meniscus lens element 12: 0.5631

Focal length fRp of positive meniscus lens element 41: 73.150

Focal length fRn of biconcave negative lens element 42: −25.396

TABLE 23

VARIOUS ZOOM LENS SYSTEM DATA
Zoom Ratio: 5.15

| | Short Focal Length Extremity | Intermediate Focal Length | Long Focal Length Extremity |
|---|---|---|---|
| FNO. | 4.60 | 5.58 | 6.58 |
| f | 56.500 | 121.921 | 291.183 |
| W | 14.5 | 6.6 | 2.7 |
| Y | 14.24 | 14.24 | 14.24 |
| fB | 52.000 | 67.988 | 82.212 |
| L | 163.483 | 203.077 | 235.0003 |
| d5 | 6.360 | 45.954 | 77.877 |
| d10 | 35.327 | 20.675 | 3.000 |
| d16 | 15.053 | 13.327 | 17.0505 |
| d22 | 3.182 | 3.572 | 3.300 |

TABLE 24

LENS GROUP DATA

| Lens Group | 1st Surf. | Focal Length |
|---|---|---|
| 1 | 1 | 160.585 |
| 2 | 6 | −31.252 |
| 3F | 11 | 49.107 |
| 3R | 17 | 43.822 |
| 4 | 23 | −40.527 |

[Numerical Embodiment 9]

Figure 49:
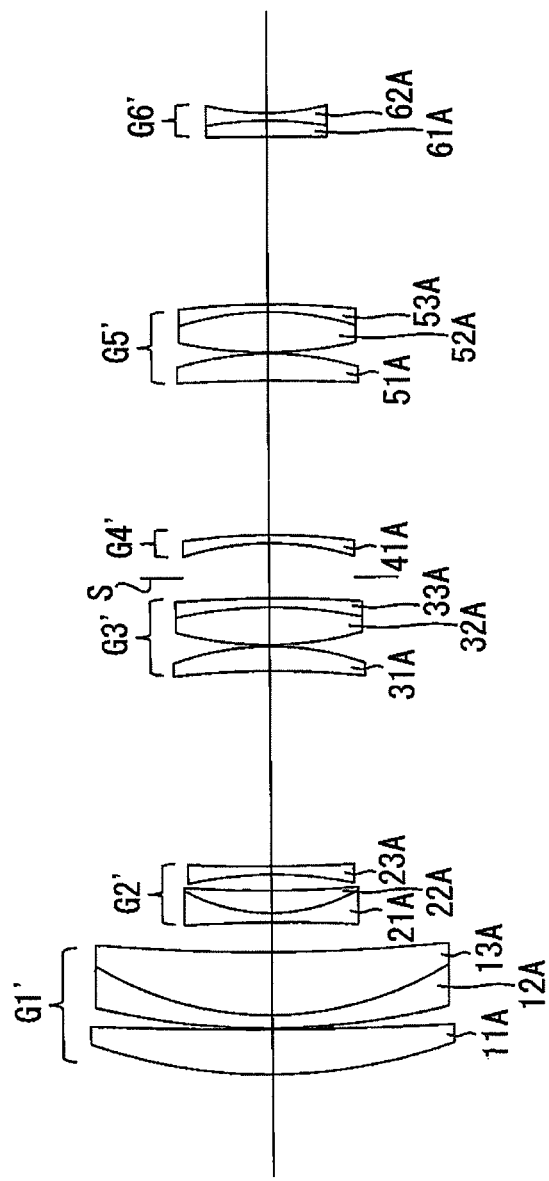
FIG. 49 shows a lens arrangement of a ninth numerical embodiment of a zoom lens system, according to the present invention, at the short focal length extremity when focused on an object at infinity.
Figure 52:
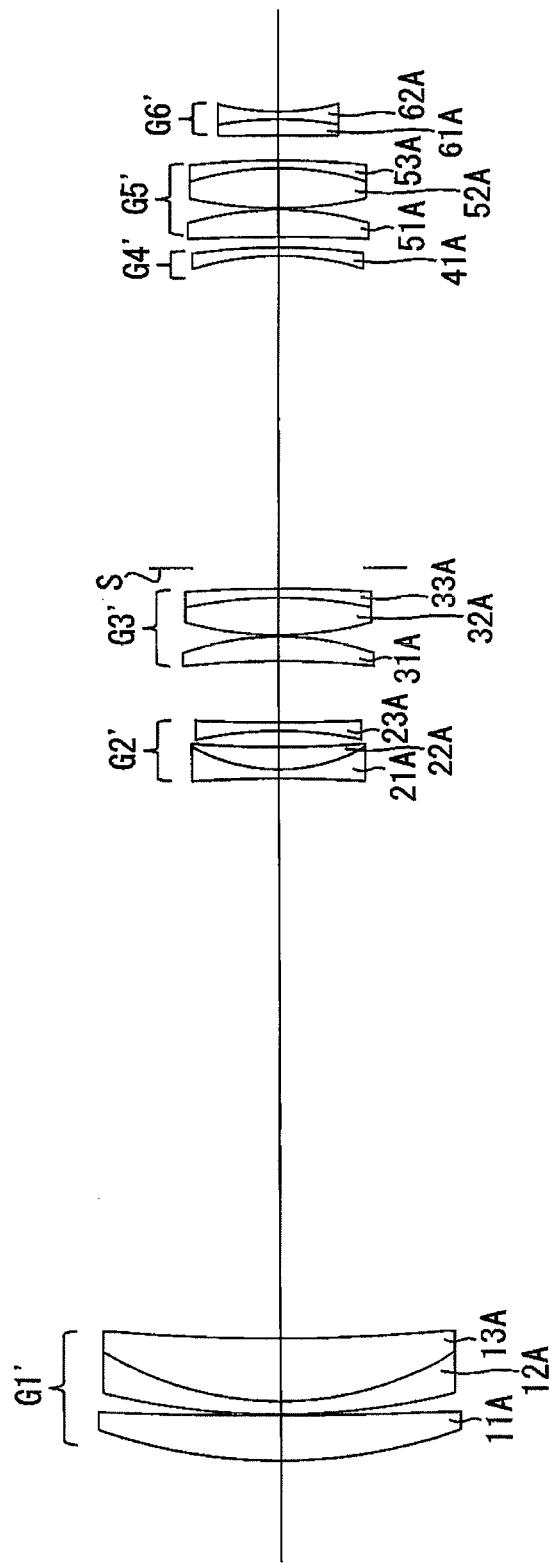
FIG. 52 shows a lens arrangement of the ninth numerical embodiment of a zoom lens system, according to the present invention, at the long focal length extremity when focused on an object at infinity.

FIGS. 49 through 54D and Tables 25 through 27 disclose a ninth numerical embodiment of the zoom lens system according to the present invention. FIG. 49 shows a lens arrangement of the zoom lens system at the short focal length extremity when focused on an object at infinity. FIGS. 50A, 50B, 50C and 50D show various aberrations that occurred in the zoom lens system of FIG. 49. FIGS. 51A, 51B, 51C and 51D show lateral aberrations that occurred in the zoom lens system of FIG. 49. FIG. 52 shows a lens arrangement of the zoom lens system at the long focal length extremity when focused on an object at infinity. FIGS. 53A, 53B, 53C and 53D show various aberrations that occurred in the zoom lens system of FIG. 52. FIGS. 54A, 54B, 54C and 54D show lateral aberrations that occurred in the zoom lens system of FIG. 52. Table 25 indicates the surface data. Table 26 indicates various lens system data. Table 27 indicates lens-group data.

The zoom lens system of the ninth numerical embodiment is configured of a positive first lens group G1', a negative second lens group G2', a positive third lens group (intermediate lens group) G3', a negative fourth lens group (intermediate lens group) G4', a positive fifth lens group (intermediate lens group) G5', and negative sixth lens group (image-side lens group) G6', in that order from the object side. A diaphragm S is provided between the third lens group G3' and the fourth lens group G4' (immediately behind the third lens group G3'); the diaphragm S moves integrally with the third lens group G3'.

The first lens group G1' is configured of a positive meniscus lens element 11A having a convex surface on the object side, a negative meniscus lens element 12A having a convex surface on the object side, and a positive meniscus lens element 13A having a convex surface on the object side, in that order from the object side. The negative meniscus lens element 12A and the positive meniscus lens element 13A are cemented to each other.

The second lens group G2' is configured of a biconcave negative lens element 21A, a positive meniscus lens element 22A having a convex surface on the object side, and a biconcave negative lens element 23A, in that order from the object side. The biconcave negative lens element 21A and the positive meniscus lens element 22A are cemented to each other.

The third lens group G3' is configured of a positive meniscus lens element 31A having a convex surface on the image side, a biconvex positive lens element 32A, and a negative meniscus lens element 33A having a convex surface on the image side, in that order from the object side. The biconvex positive lens element 32A and the negative meniscus lens element 33A are cemented to each other.

The fourth lens group G4' is configured of a negative meniscus lens element 41A having a convex surface on the image side.

The fifth lens group G5' is configured of a positive meniscus lens element 51A having a convex surface on the image side, a biconvex positive lens element 52A, and a negative meniscus lens element 53A having a convex surface on the image side, in that order from the object side. The biconvex positive lens element 52A and the negative meniscus lens element 53A are cemented to each other.

The sixth lens group G6' is configured of a positive meniscus lens element 61A having a convex surface on the image side, and a biconcave negative lens element 62A, in that order from the object side. The positive meniscus lens element 61A and the biconcave negative lens element 62A are cemented to each other.

TABLE 25

SURFACE DATA

| Surf. No. | R | d | N(d) | ν(d) |
|---|---|---|---|---|
| 1 | 72.212 | 5.940 | 1.48749 | 70.24 |
| 2 | 579.395 | 0.150 | | |
| 3 | 98.922 | 1.700 | 1.76200 | 40.10 |
| 4 | 45.041 | 8.270 | 1.49700 | 81.55 |
| 5 | 253.781 | d5 | | |
| 6 | −186.376 | 1.200 | 1.80440 | 39.58 |
| 7 | 23.884 | 2.960 | 1.84666 | 23.78 |
| 8 | 167.039 | 2.101 | | |
| 9 | −52.427 | 1.100 | 1.80400 | 46.58 |
| 10 | 278.728 | d10 | | |
| 11 | −120.109 | 3.220 | 1.65844 | 50.88 |
| 12 | −37.628 | 0.200 | | |
| 13 | 46.936 | 4.920 | 1.49700 | 81.55 |
| 14 | −58.295 | 1.200 | 1.90366 | 31.31 |
| 15 | −165.766 | 2.700 | | |
| 16 (Diaphragm) | ∞ | d16 | | |
| 17 | −37.889 | 1.100 | 1.80440 | 39.58 |
| 18 | −81.680 | d18 | | |
| 19 | −257.534 | 3.540 | 1.77250 | 49.62 |
| 20 | −41.773 | 0.200 | | |
| 21 | 55.108 | 5.272 | 1.48749 | 70.24 |
| 22 | −38.704 | 1.000 | 1.90366 | 31.31 |
| 23 | −111.116 | d23 | | |
| 24 | −467.599 | 2.110 | 1.84666 | 23.78 |
| 25 | −45.763 | 1.000 | 1.77250 | 49.60 |
| 26 | 33.276 | — | | |

Focal length fn of negative meniscus lens element 12A: −110.021

Partial dispersion ratio θgFn at short wavelength side of negative meniscus lens element 12A: 0.5765

Focal length fRp of positive meniscus lens element 61A: 59.778

Focal length fRn of biconcave negative lens element 62A: −24.804

TABLE 26

VARIOUS ZOOM LENS SYSTEM DATA
Zoom Ratio: 4.04

| | Short Focal Length Extremity | Intermediate Focal Length | Long Focal Length Extremity |
|---|---|---|---|
| FNO. | 4.10 | 4.96 | 6.40 |
| f | 71.999 | 147.929 | 291.198 |
| W | 11.2 | 5.4 | 2.7 |
| Y | 14.24 | 14.24 | 14.24 |
| fB | 39.001 | 44.450 | 57.719 |
| L | 165.197 | 210.341 | 234.706 |
| d5 | 3.908 | 49.052 | 73.418 |
| d10 | 25.643 | 16.628 | 8.090 |
| d16 | 4.503 | 19.698 | 40.916 |
| d18 | 20.239 | 14.059 | 1.379 |
| d23 | 22.018 | 16.569 | 3.300 |

TABLE 27

LENS GROUP DATA

| Lens Group | 1st Surf. | Focal Length |
|---|---|---|
| 1 | 1 | 167.146 |
| 2 | 6 | −37.986 |
| 3 | 11 | 46.730 |
| 4 | 17 | −88.852 |
| 5 | 19 | 45.428 |
| 6 | 24 | −42.641 |

[Numerical Embodiment 10]

Figure 55:
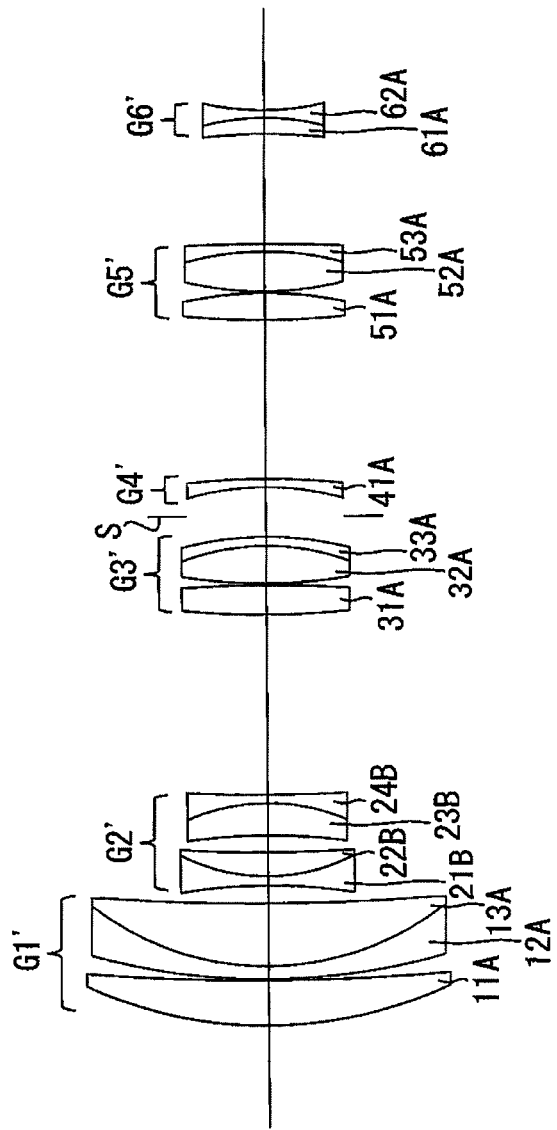
FIG. 55 shows a lens arrangement of a tenth numerical embodiment of a zoom lens system, according to the present invention, at the short focal length extremity when focused on an object at infinity.
Figure 58:
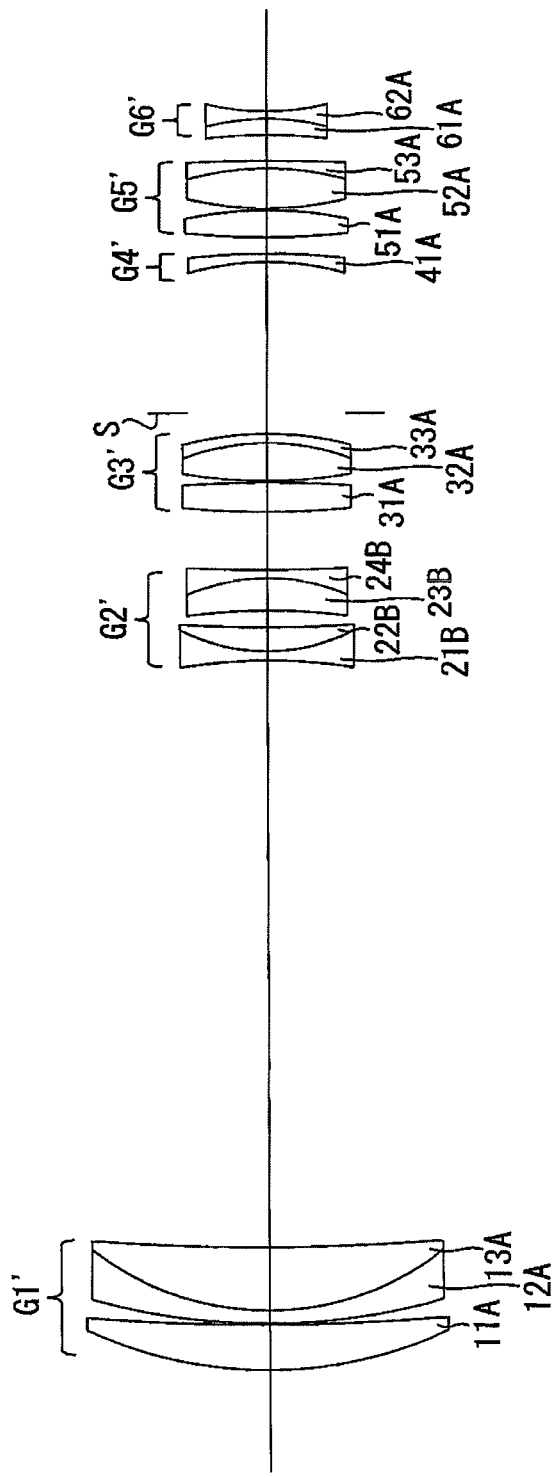
FIG. 58 shows a lens arrangement of the tenth numerical embodiment of a zoom lens system, according to the present invention, at the long focal length extremity when focused on an object at infinity.

FIGS. 55 through 60D and Tables 28 through 30 disclose a tenth numerical embodiment of the zoom lens system according to the present invention. FIG. 55 shows a lens arrangement of the zoom lens system at the short focal length extremity when focused on an object at infinity. FIGS. 56A, 56B, 56C and 56D show various aberrations that occurred in the zoom lens system of FIG. 55. FIGS. 57A, 57B, 57C and 57D show lateral aberrations that occurred in the zoom lens system of FIG. 55. FIG. 58 shows a lens arrangement of the zoom lens system at the long focal length extremity when focused on an object at infinity. FIGS. 59A, 59B, 59C and 59D show various aberrations that occurred in the zoom lens system of FIG. 58. FIGS. 60A, 60B, 60C and 60D show lateral aberrations that occurred in the zoom lens system of FIG. 58. Table 28 indicates the surface data. Table 29 indicates various lens system data. Table 30 indicates lens-group data.

The lens arrangement of the tenth numerical embodiment is the same as that of the ninth numerical embodiment except for the following features:

(1) The second lens group G2' is configured of a biconcave negative lens element 21B, a positive meniscus lens element 22B having a convex surface on the object side, a positive meniscus lens element 23B having a convex surface on the image side, and a biconcave negative lens element 24B, in that order from the object side. The biconcave negative lens element 21B and the positive meniscus lens element 22B are cemented to each other. The positive meniscus lens element 23B and the biconcave negative lens element 24B are cemented to each other.

(2) The positive lens element 31A of the third lens group G3' is a biconvex positive lens element.

(3) The positive lens element 51A of the fifth lens group G5' is a biconvex positive lens element.

TABLE 28

SURFACE DATA

| Surf. No. | R | d | N(d) | v(d) |
|---|---|---|---|---|
| 1 | 57.404 | 5.940 | 1.48749 | 70.24 |
| 2 | 297.397 | 0.150 | | |
| 3 | 86.414 | 1.700 | 1.79952 | 42.22 |
| 4 | 37.911 | 8.270 | 1.48749 | 70.24 |
| 5 | 299.133 | d5 | | |
| 6 | −72.870 | 1.200 | 1.79952 | 42.22 |
| 7 | 25.156 | 3.142 | 1.75520 | 27.51 |
| 8 | 180.148 | 2.208 | | |
| 9 | −81.394 | 4.241 | 1.84666 | 23.88 |
| 10 | −26.838 | 1.100 | 1.88300 | 40.80 |
| 11 | 223.027 | d11 | | |
| 12 | 111.937 | 3.859 | 1.60300 | 65.44 |
| 13 | −167.214 | 0.200 | | |
| 14 | 65.846 | 4.964 | 1.53775 | 74.70 |
| 15 | −31.545 | 1.200 | 1.90366 | 31.31 |
| 16 | −43.474 | 2.700 | | |
| 17 (Diaphragm) | ∞ | d17 | | |
| 18 | −37.620 | 1.100 | 1.85026 | 32.27 |
| 19 | −89.821 | d19 | | |
| 20 | 108.347 | 3.540 | 1.72000 | 43.69 |
| 21 | −50.926 | 0.200 | | |
| 22 | 43.634 | 5.272 | 1.49700 | 81.55 |
| 23 | −39.401 | 1.000 | 1.90366 | 31.31 |
| 24 | −222.674 | d24 | | |
| 25 | −71.992 | 2.110 | 1.84666 | 23.78 |
| 26 | −32.089 | 1.000 | 1.72916 | 54.68 |
| 27 | 35.857 | — | | |

Focal length fn of negative meniscus lens element 12A: −85.816

Partial dispersion ratio θgFn at short wavelength side of negative meniscus lens element 12A: 0.5672

Focal length fRp of positive meniscus lens element 61A: 66.761

Focal length fRn of biconcave negative lens element 62A: −23.081

TABLE 29

VARIOUS ZOOM LENS SYSTEM DATA
Zoom Ratio: 5.19

| | Short Focal Length Extremity | Intermediate Focal Length | Long Focal Length Extremity |
|---|---|---|---|
| FNO. | 4.10 | 4.88 | 6.45 |
| f | 56.037 | 99.980 | 290.976 |
| W | 14.7 | 8.1 | 2.8 |
| Y | 14.24 | 14.24 | 14.24 |
| fB | 38.059 | 49.322 | 67.757 |
| L | 158.226 | 193.898 | 232.847 |
| d5 | 2.338 | 38.010 | 76.959 |
| d11 | 23.630 | 20.402 | 7.614 |
| d17 | 3.824 | 7.053 | 19.841 |
| d19 | 20.830 | 12.916 | 2.172 |
| d24 | 14.449 | 11.100 | 3.408 |

TABLE 30

LENS GROUP DATA

| Lens Group | 1st Surf. | Focal Length |
|---|---|---|
| 1 | 1 | 152.857 |
| 2 | 6 | −29.190 |
| 3 | 12 | 39.279 |
| 4 | 18 | −76.877 |
| 5 | 20 | 38.053 |
| 6 | 25 | −34.780 |

[Numerical Embodiment 11]

Figure 61:
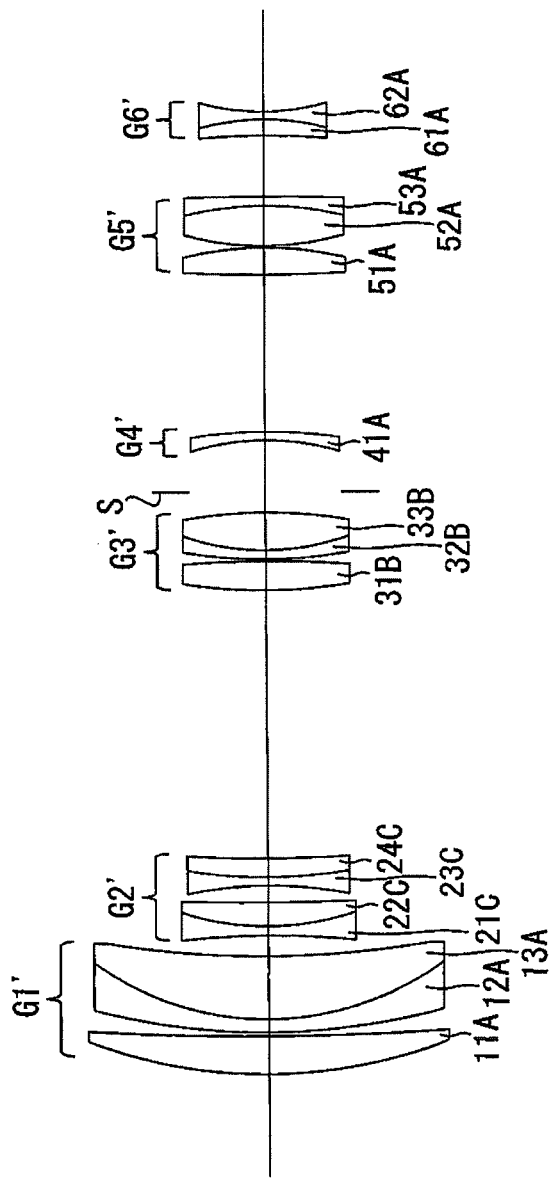
FIG. 61 shows a lens arrangement of an eleventh numerical embodiment of a zoom lens system, according to the present invention, at the short focal length extremity when focused on an object at infinity.
Figure 64:
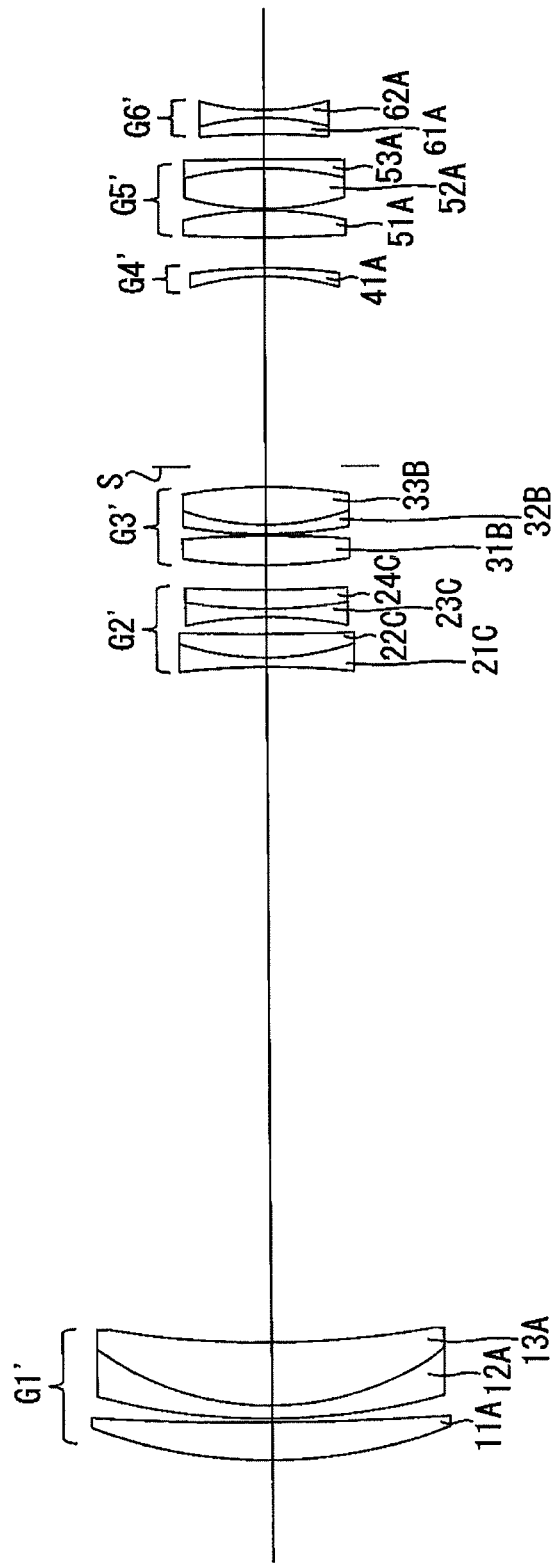
FIG. 64 shows a lens arrangement of the eleventh numerical embodiment of a zoom lens system, according to the present invention, at the long focal length extremity when focused on an object at infinity.

FIGS. 61 through 66D and Tables 31 through 33 disclose an eleventh numerical embodiment of the zoom lens system according to the present invention. FIG. 61 shows a lens arrangement of the zoom lens system at the short focal length extremity when focused on an object at infinity. FIGS. 62A, 62B, 62C and 62D show various aberrations that occurred in the zoom lens system of FIG. 61. FIGS. 63A, 63B, 63C and 63D show lateral aberrations that occurred in the zoom lens system of FIG. 61. FIG. 64 shows a lens arrangement of the zoom lens system at the long focal length extremity when focused on an object at infinity. FIGS. 65A, 65B, 65C and 65D show various aberrations that occurred in the zoom lens system of FIG. 64. FIGS. 66A, 66B, 66C and 66D show lateral aberrations that occurred in the zoom lens system of FIG. 64. Table 31 indicates the surface data. Table 32 indicates various lens system data. Table 33 indicates lens-group data.

The lens arrangement of the eleventh numerical embodiment is the same as that of the ninth numerical embodiment except for the following features:

(1) The second lens group G2' is configured of a biconcave negative lens element 21C, a positive meniscus lens element 22C having a convex surface on the object side, a biconcave negative lens element 23C, and a positive meniscus lens element 24C having a convex surface on the object side, in that order from the object side. The biconcave negative lens element 21C and the positive meniscus lens element 22C are cemented to each other. The biconcave negative lens element 23C and the positive meniscus lens element 24C are cemented to each other.

(2) The third lens group G3' is configured of a biconvex positive lens element 31B, a negative meniscus lens element 32B having a convex surface on the object side, and a biconvex positive lens element 33B, in that order from the object side. The negative meniscus lens element 32B and the biconvex positive lens element 33B are cemented to each other.

(3) The positive lens element 51A of the fifth lens group G5' is a biconvex positive lens element.

TABLE 31

SURFACE DATA

| Surf. No. | R | d | N(d) | v(d) |
|---|---|---|---|---|
| 1 | 66.810 | 4.968 | 1.61800 | 63.33 |
| 2 | 374.923 | 0.506 | | |
| 3 | 89.490 | 1.700 | 1.79952 | 42.22 |
| 4 | 39.229 | 8.270 | 1.48749 | 70.24 |
| 5 | 129.716 | d5 | | |
| 6 | −108.797 | 1.200 | 1.80400 | 46.58 |
| 7 | 36.380 | 3.142 | 1.84666 | 23.78 |
| 8 | 418.017 | 2.208 | | |
| 9 | −52.941 | 1.100 | 1.79952 | 42.22 |
| 10 | 66.015 | 2.480 | 1.84666 | 23.78 |
| 11 | 181.695 | d11 | | |
| 12 | 67.996 | 3.859 | 1.60300 | 65.44 |
| 13 | −138.171 | 0.214 | | |
| 14 | 62.542 | 1.200 | 1.90366 | 31.31 |
| 15 | 32.964 | 4.960 | 1.53775 | 74.70 |
| 16 | −63.402 | 2.700 | | |
| 17 (Diaphragm) | ∞ | d17 | | |
| 18 | −33.581 | 1.100 | 1.80400 | 46.58 |
| 19 | −66.971 | d19 | | |
| 20 | 185.732 | 3.540 | 1.74320 | 49.34 |
| 21 | −45.898 | 0.200 | | |
| 22 | 38.513 | 5.272 | 1.49700 | 81.55 |
| 23 | −45.292 | 1.200 | 1.91650 | 31.60 |
| 24 | −471.849 | d24 | | |
| 25 | −99.089 | 2.110 | 1.84666 | 23.78 |

TABLE 31-continued

| SURFACE DATA | | | | |
|---|---|---|---|---|
| Surf. No. | R | d | N(d) | ν(d) |
| 26 | −32.089 | 1.000 | 1.72916 | 54.68 |
| 27 | 31.171 | — | | |

Focal length fn of negative meniscus lens element 12A: −88.696

Partial dispersion ratio θgFn at short wavelength side of negative meniscus lens element 12A: 0.5672

Focal length fRp of positive meniscus lens element 61A: 55.255

Focal length fRn of biconcave negative lens element 62A: −21.541

TABLE 32

| VARIOUS ZOOM LENS SYSTEM DATA Zoom Ratio: 5.25 | | | |
|---|---|---|---|
| | Short Focal Length Extremity | Intermediate Focal Length | Long Focal Length Extremity |
| FNO. | 4.20 | 4.61 | 6.42 |
| f | 55.443 | 101.060 | 291.003 |
| W | 14.9 | 8.0 | 2.7 |
| Y | 14.24 | 14.24 | 14.24 |
| fB | 39.132 | 46.000 | 60.457 |
| L | 165.358 | 198.231 | 237.540 |
| d5 | 2.717 | 47.731 | 88.629 |
| d11 | 35.162 | 22.807 | 3.255 |
| d17 | 6.820 | 7.034 | 24.997 |
| d19 | 20.558 | 13.178 | 3.973 |
| d24 | 8.040 | 8.552 | 3.300 |

TABLE 33

| LENS GROUP DATA | | |
|---|---|---|
| Lens Group | 1$^{st}$ Surf. | Focal Length |
| 1 | 1 | 187.869 |
| 2 | 6 | −35.510 |
| 3 | 12 | 41.196 |
| 4 | 18 | −85.024 |
| 5 | 20 | 37.886 |
| 6 | 25 | −35.047 |

The numerical values of each condition for each embodiment are shown in Table 34. Note that since the ninth through eleventh numerical embodiments do not have a lens arrangement that is a precondition for satisfying conditions (5) through (7) (since a front sub-lens lens group and a rear sub-lens lens group of an intermediate lens group cannot be specified), the corresponding values for conditions (5) through (7) cannot be calculated.

TABLE 34

| | Embod. 1 | Embod. 2 | Embod. 3 | Embod. 4 |
|---|---|---|---|---|
| Condition (1) | −4.91 | −5.99 | −4.32 | −5.45 |
| Condition (2) | −4.18 | −5.39 | −3.91 | −4.55 |
| Condition (3) | 0.69 | 0.60 | 0.76 | 0.66 |
| Condition (4) | −3.01 | −2.99 | −2.55 | −2.81 |
| Condition (5) | 1.10 | 1.13 | 1.09 | 1.15 |
| Condition (6) | 1.25 | 5.06 | 2.30 | 1.43 |
| Condition (7) | 0.50 | 0.39 | 0.38 | 0.51 |
| Condition (8) | 2.95 | 3.25 | 2.62 | 3.09 |
| Condition (9) | 1.30 | 1.43 | 1.15 | 1.37 |
| Condition (10) | 1.802 | 1.848 | 1.802 | 1.845 |
| Condition (11) | −0.0066 | −0.0066 | −0.0058 | −0.0066 |
| Condition (12) | 44.20 | 44.20 | 42.22 | 44.20 |
| Condition (13) | −2.01 | −2.06 | −1.78 | −2.00 |
| Condition (14) | 0.57 | 0.63 | 0.51 | 0.60 |
| | Embod. 5 | Embod. 6 | Embod. 7 | Embod. 8 |
| Condition (1) | −5.99 | −5.19 | −5.50 | −5.14 |
| Condition (2) | −5.39 | −4.04 | −4.49 | −3.96 |
| Condition (3) | 0.60 | 0.62 | 0.60 | 0.63 |
| Condition (4) | −3.01 | −2.97 | −3.10 | −2.88 |
| Condition (5) | 1.16 | 1.12 | 1.30 | 1.12 |
| Condition (6) | 10.00 | 1.34 | 2.02 | 1.01 |
| Condition (7) | 0.37 | 0.52 | 0.45 | 0.51 |
| Condition (8) | 3.21 | 2.85 | 2.96 | 2.84 |
| Condition (9) | 1.41 | 1.25 | 1.29 | 1.25 |
| Condition (10) | 1.848 | 1.802 | 1.845 | 1.802 |
| Condition (11) | −0.0066 | −0.0066 | −0.0066 | −0.0066 |
| Condition (12) | 44.20 | 44.20 | 44.20 | 44.20 |
| Condition (13) | −1.87 | −2.00 | −2.03 | −1.99 |
| Condition (14) | 0.62 | 0.55 | 0.56 | 0.55 |
| | Embod. 9 | Embod. 10 | Embod. 11 | |
| Condition (1) | −4.40 | −5.24 | −5.29 | |
| Condition (2) | −3.92 | −4.39 | −5.36 | |
| Condition (3) | 0.36 | 0.42 | 0.63 | |
| Condition (4) | −2.41 | −2.89 | −2.57 | |
| Condition (5) | — | — | — | |
| Condition (6) | — | — | — | |
| Condition (7) | — | — | — | |
| Condition (8) | 2.32 | 2.73 | 3.39 | |
| Condition (9) | 1.15 | 1.20 | 1.48 | |
| Condition (10) | 1.804 | 1.841 | 1.802 | |
| Condition (11) | −0.0001 | −0.0058 | −0.0058 | |
| Condition (12) | 40.10 | 42.22 | 42.22 | |
| Condition (13) | −1.52 | −1.78 | −2.12 | |
| Condition (14) | 0.57 | 0.53 | 0.65 | |

As can be understood from Table 34, the first through eighth numerical embodiments satisfy conditions (1) through (14), and the ninth through eleventh numerical embodiments satisfy conditions (1) through (4) and conditions (8) through (14). Furthermore, as can be understood from the aberration diagrams, the various aberrations and lateral aberrations are relatively well corrected.

The technical scope of the invention pertaining to the present invention would not be evaded even if a lens element or lens group which has, in effect, no optical power were to be added to a zoom lens system that is included in the technical scope of the invention pertaining to the present patent application.

Although it would be easy to add a weak-powered dummy lens group as an attempt to evade the scope of the present invention, such an attempt would by no means evade the technical concept of the present invention; however, there is a certain amount of freedom in the number of lens groups that can be provided within the intermediate lens group (the same can be said for the other lens groups).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a positive first lens group, a negative second lens group, a positive intermediate lens group, and a negative image-side lens group, in that order from the object side, wherein upon zooming from the short focal length extremity to the long focal length extremity, a distance between said first lens group and said second lens group increases, and a distance between said second lens group and said intermediate lens group decreases, wherein said image-side lens group consists of two lens elements, and wherein the following conditions (1), (2) and (3") are satisfied:

$$-6.0<f1/f2<-4.3 \quad (1),$$

$$-5.4<f1/fIMG<-3.9 \quad (2),$$

and $$0.3<D2/fw<1.0 \quad (3"),$$

wherein f1 designates the focal length of said first lens group,
f2 designates the focal length of said second lens group,
fIMG designates the focal length of the image-side lens group,
D2 designates a distance along the optical axis between the surface closest to the image side on said second lens group and the surface closest to the object side on said intermediate lens group, at the short focal length extremity, and
fw designates the focal length of the entire zoom lens system at the short focal length extremity.

2. The zoom lens system according to claim 1, wherein upon zooming from the short focal length extremity to the long focal length extremity, said first lens group moves toward the object side.

3. The zoom lens system according to claim 1, wherein said first lens group comprises at least one positive lens element, and a negative meniscus lens element, in that order from the object side.

4. The zoom lens system according to claim 3, wherein the following conditions (11) and (12) are satisfied:

$$\theta gFn-(0.6440-0.001682\times vn)<0 \quad (11), \text{ and}$$

$$34<vn \quad (12), \text{ wherein}$$

θgFn designates the partial dispersion ratio at the short wavelength side of the negative meniscus lens element provided within the first lens group,
θgF=(ng−nF)/(nF−nC), wherein ng, nF and nC designate refractive indexes at the g-line, the F-line and the C-line, respectively, and
vn designates the Abbe number with respect to the d-line of the negative meniscus lens element provided within said first lens group.

5. The zoom lens system according to claim 3, wherein the following condition (13) is satisfied:

$$f1/fn<-1.5 \quad (13), \text{ wherein}$$

f designates the focal length of said first lens group, and
fn designates the focal length of the negative meniscus lens element provided within said first lens group.

6. The zoom lens system according to claim 1, wherein said image-side lens group comprises a focusing lens group which is moved in the optical axis direction during a focusing operation.

7. The zoom lens system according to claim 1, wherein said image-side lens group consists of one positive lens element and one negative lens element.

8. The zoom lens system according to claim 7 wherein the following condition (4) is satisfied:

$$-6.0<fRp/fRn<-1.5 \quad (4), \text{ wherein}$$

fRp designates the focal length of the positive lens element provided within said image-side lens group, and
fRn designates the focal length of the negative lens element provided within said image-side lens group.

9. The zoom lens system according to claim 1, wherein the following condition (8) is satisfied:

$$0.8<f1/fw<8.0 \quad (8), \text{ wherein}$$

f1 designates the focal length of said first lens group, and
fw designates the focal length of the entire zoom lens system at the short focal length extremity.

10. The zoom lens system according to claim 1, wherein the following condition (9) is satisfied:

$$0.6<f1/(fw-ft)^{1/2}<6.0 \quad (9), \text{ wherein}$$

f1 designates the focal length of said first lens group,
fw designates the focal length of the entire zoom lens system at the short focal length extremity, and
ft designates the focal length of the entire zoom lens system at the long focal length extremity.

11. The zoom lens system according to claim 1, wherein the following condition (10) is satisfied:

$$1.8<nd_{ave} \quad (10), \text{ wherein}$$

$nd_{ave}$ designates an average value of the refractive index at the d-line of all of the negative lens elements that are provided within said second lens group.

12. The zoom lens system according to claim 1, wherein said intermediate lens group comprises a positive front sub-lens lens group, an aperture diaphragm, and a positive rear sub-lens lens group, in that order from the object side.

13. The zoom lens system according to claim 12, wherein the following condition (5) is satisfied:

$$0.1<fSF/fSR<7.0 \quad (5), \text{ wherein}$$

fSF designates the focal length of said front sub-lens lens group, and
fSR designates the focal length of said rear sub-lens lens group.

14. The zoom lens system according to claim 12, wherein the following condition (6) is satisfied:

$$1.00<RF/RR<20.0, \text{ wherein } RF>0 \text{ and } RR>0,$$

wherein

RF designates the radius of curvature of the surface closest to the image side on said front sub-lens lens group, and
RR designates the radius of curvature of the surface closest to the object side on said rear sub-lens lens group.

15. The zoom lens system according to claim 12, wherein the following condition (7) is satisfied:

$$0.2<DS/fFR<1.0 \quad (7), \text{ wherein}$$

DS designates a distance along the optical axis between the surface closest to the image side on said front sub-lens lens group and the surface closest to the object side on said rear sub-lens lens group, and
fFR designates the combined focal length of said front sub-lens lens group and said rear sub-lens lens group at the short focal length extremity.

16. The zoom lens system according to claim 1, wherein said intermediate lens group comprises a positive third lens group, and said image-side lens group comprises a negative fourth lens group.

17. The zoom lens system according to claim 1, wherein said intermediate lens group comprises a positive third lens group and a positive fourth lens group; and said image-side lens group comprises a negative fifth lens group.

18. The zoom lens system according to claim 1, wherein said intermediate lens group comprises a positive third lens group, a negative fourth lens group and a positive fifth lens group, and said image-side lens group comprises a negative sixth lens group.

19. The zoom lens system according to claim 1, wherein the following condition (14) is satisfied:

$$0.1 < f1/ft < 1.0 \quad (14),$$ wherein f1 designates the focal length of said first lens group, and
ft designates the focal length of the entire zoom lens system at the long focal length extremity.

20. A zoom lens system comprising a positive first lens group, a negative second lens group, a positive intermediate lens group, and a negative image-side lens group, in that order from the object side,
wherein upon zooming from the short focal length extremity to the long focal length extremity, a distance between said first lens group and said second lens group increases, and a distance between said second lens group and said intermediate lens group decreases,
wherein said first lens group includes at least one positive lens element and a negative meniscus lens element, in that order from the object side, and
wherein the following conditions (1), (2) and (3") are satisfied:

$$-6.0 < f1/f2 < -4.3 \quad (1),$$

$$-5.4 < f1/fIMG < -3.9 \quad (2), \text{ and}$$

$$0.3 < D2/fw < 1.0 \quad (3''),$$ wherein f1 designates the focal length of said first lens group,
f2 designates the focal length of said second lens group,
fIMG designates the focal length of the image-side lens group,
D2 designates a distance along the optical axis between the surface closest to the image side on said second lens group and the surface closest to the object side on said intermediate lens group, at the short focal length extremity, and
fw designates the focal length of the entire zoom lens system at the short focal length extremity.

21. A zoom lens system comprising a positive first lens group, a negative second lens group, a positive intermediate lens group, and a negative image-side lens group, in that order from the object side,
wherein upon zooming from the short focal length extremity to the long focal length extremity, a distance between said first lens group and said second lens group increases, and a distance between said second lens group and said intermediate lens group decreases,
wherein said intermediate lens group comprises a positive front sub-lens group, an aperture diaphragm and a positive rear sub-lens group, in that order from the object side,
wherein said image-side lens group consists of two lens elements, and wherein the following conditions (1),(2),(3) and (6) are satisfied:

$$-6.0 < f1/f2 < -4.3 \quad (1),$$

$$-5.4 < f1/fIMG < -3.9 \quad (2),$$

$$0.3 < D2/fw < 3.0 \quad (3), \text{ and}$$

$$1.00 < RF/RR < 20.0 \ (RF>0 \text{ and } RR>0) \quad (6)$$

wherein
f1 designates the focal length of said first lens group,
f2 designates the focal length of said second lens group,
fIMG designates the focal length of said image-side lens group,
D2 designates a distance along the optical axis between the surface closest to the image side on said second lens group and the surface closest to the object side on said intermediate lens group, at the short focal length extremity,
fw designates the focal length of the entire zoom lens system at the short focal length extremity,
RF designates the radius of curvature of the surface closest to the image side on said front sub-lens lens group, and
RR designates the radius of curvature of the surface closest to the object side on said rear sub-lens lens group.

22. A zoom lens system comprising a positive first lens group, a negative second lens group, a positive intermediate lens group, and a negative image-side lens group, in that order from the object side,
wherein upon zooming from the short focal length extremity to the long focal length extremity, a distance between said first lens group and said second lens group increases, and a distance between said second lens group and said intermediate lens group decreases,
wherein said intermediate lens group comprises a positive front sub-lens group, an aperture diaphragm and a positive rear sub-lens group, in that order from the object side,
wherein said image-side lens group consists of two lens elements, and
wherein the following conditions (1),(2),(3) and (7) are satisfied:

$$-6.0 < f1/f2 < -4.3 \quad (1),$$

$$-5.4 < f1/fIMG < -3.9 \quad (2),$$

$$0.3 < D2/fw < 3.0 \quad (3), \text{ and}$$

$$0.2 < DS/KFR < 1.0 \quad (7)$$

wherein
f1 designates the focal length of said first lens group,
f2 designates the focal length of said second lens group,
fIMG designates the focal length of said image-side lens group,
D2 designates a distance along the optical axis between the surface closest to the image side on said second lens group and the surface closest to the object side on said intermediate lens group, at the short focal length extremity,
fw designates the focal length of the entire zoom lens system at the short focal length extremity,
DS designates a distance along the optical axis between the surface closest to the image side on said front sub-lens lens group and the surface closest to the object side on said rear sub-lens lens group, and fFR designates the combined focal length of said front sub-lens lens group and said rear sub-lens lens group at the short focal length extremity.

* * * * *